May 3, 1966  R. A. REISTER  3,249,326
ELECTRONIC CELESTIAL NAVIGATION CONTROL
Filed Sept. 6, 1960  10 Sheets-Sheet 1
Fig. 3
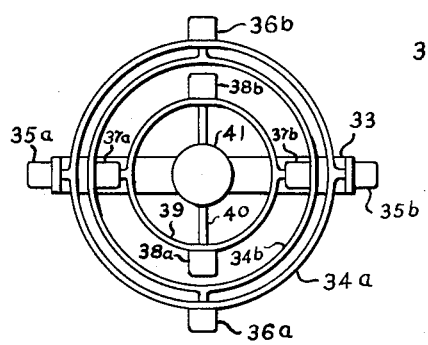
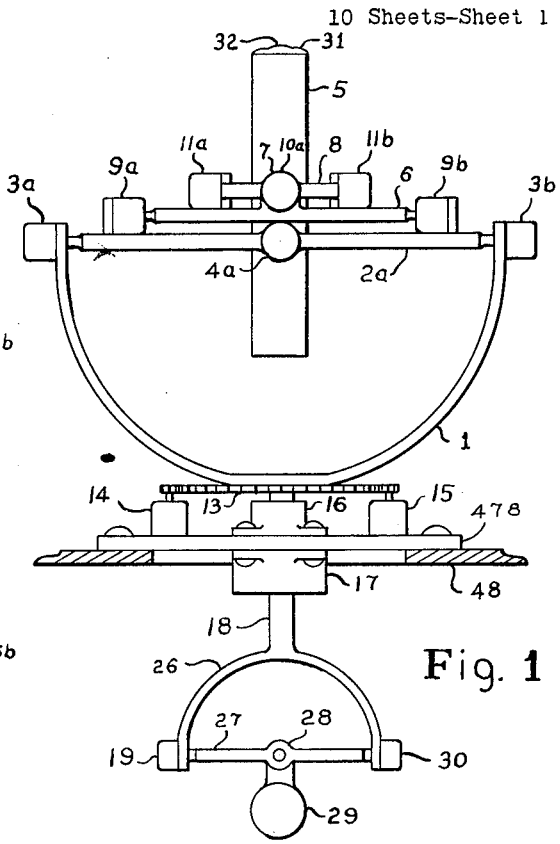
Fig. 1
Fig. 4
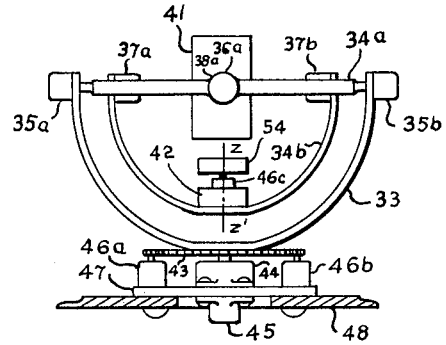
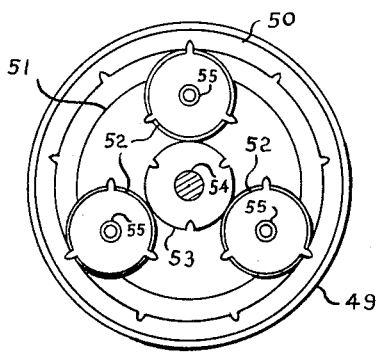
Fig. 5
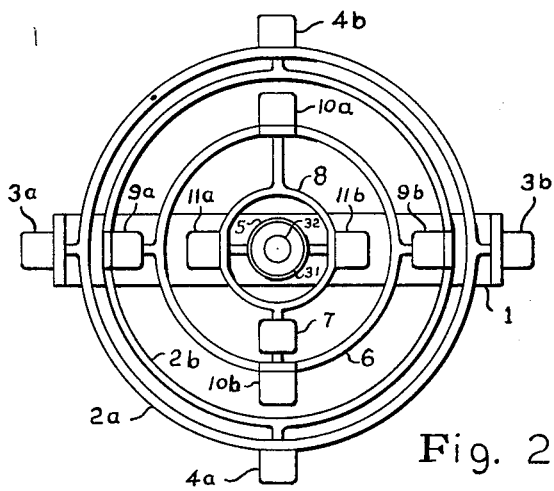
Fig. 2
INVENTOR.
R. A. Reister
BY INVENTOR.
R. A. Reister May 3, 1966  R. A. REISTER  3,249,326
ELECTRONIC CELESTIAL NAVIGATION CONTROL
Filed Sept. 6, 1960  10 Sheets-Sheet 3
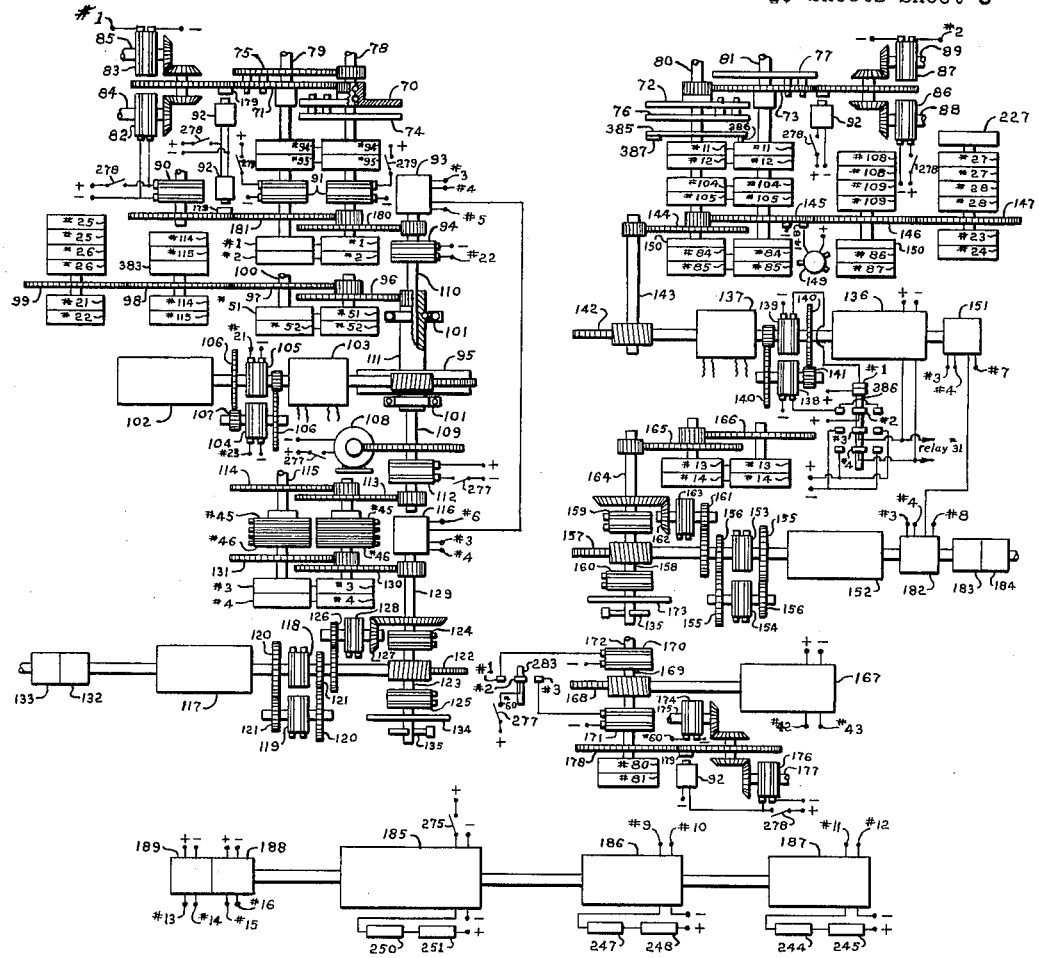
Fig. 7
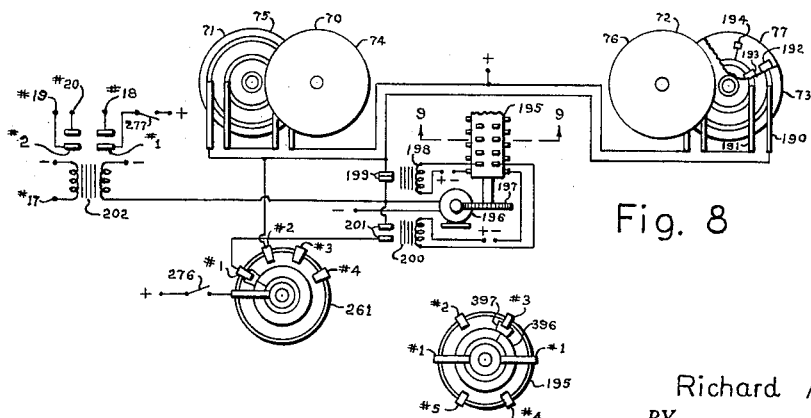
Fig. 8
Fig. 9
INVENTOR.
Richard A. Reister
BY
ATTORNEY May 3, 1966  R. A. REISTER  3,249,326
ELECTRONIC CELESTIAL NAVIGATION CONTROL
Filed Sept. 6, 1960  10 Sheets-Sheet 4

INVENTOR.
Richard A. Reister
BY
Sam J. Slotky
ATTORNEY

INVENTOR.
Richard A. Reister
BY
Sam J. Slotky
ATTORNEY

May 3, 1966  R. A. REISTER  3,249,326
ELECTRONIC CELESTIAL NAVIGATION CONTROL
Filed Sept. 6, 1960  10 Sheets-Sheet 6
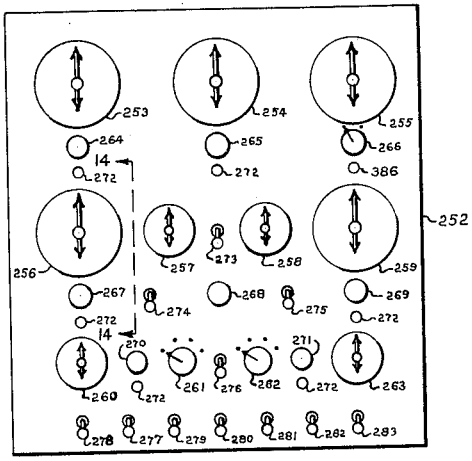
Fig. 13
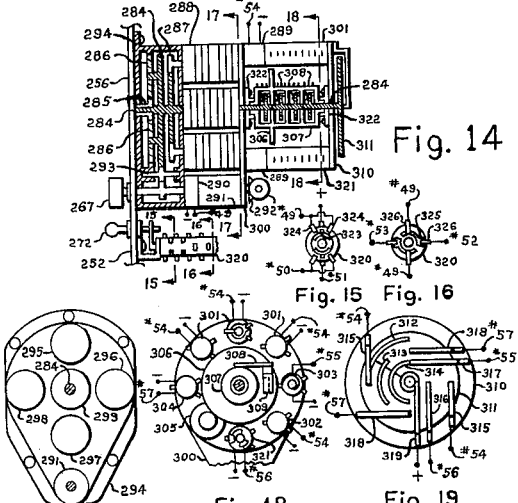
Fig. 14  Fig. 15  Fig. 16
Fig. 17  Fig. 18  Fig. 19
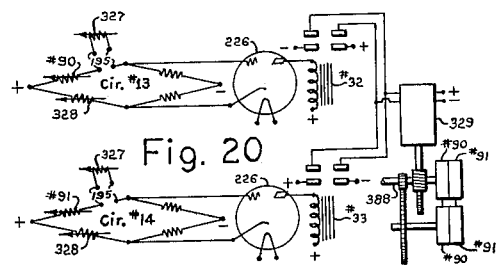
Fig. 20  Fig. 21  Fig. 22  Fig. 23
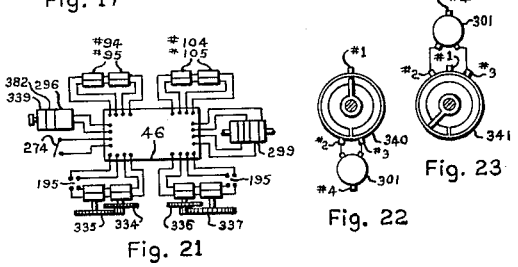
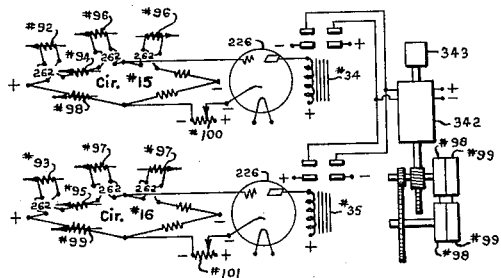
Fig. 24
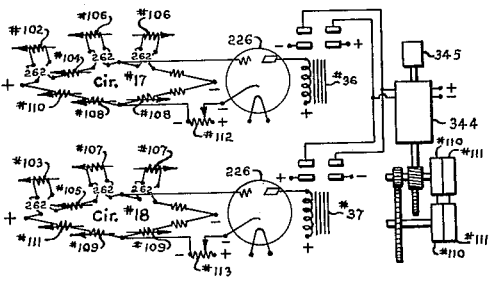
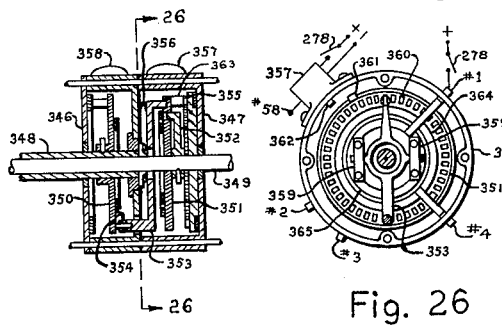
Fig. 25  Fig. 26
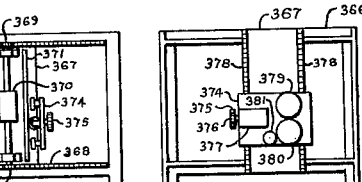
Fig. 27  Fig. 28
INVENTOR.
Richard A. Reister
BY
Sam J. Slotsky
ATTORNEY INVENTOR.
Richard A. Reister INVENTOR.
R. A. Reister

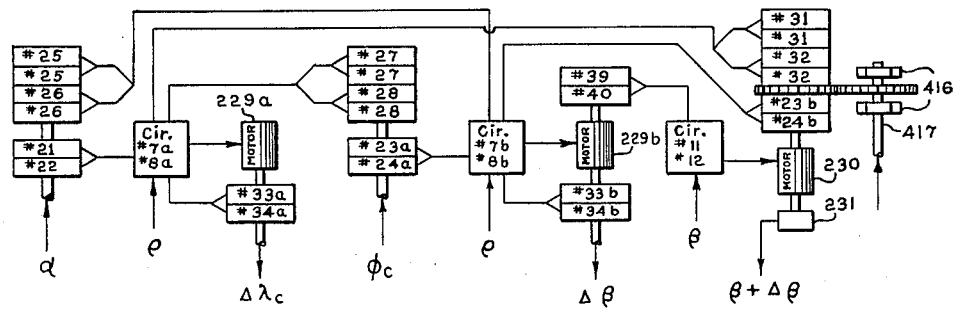
Fig. 31
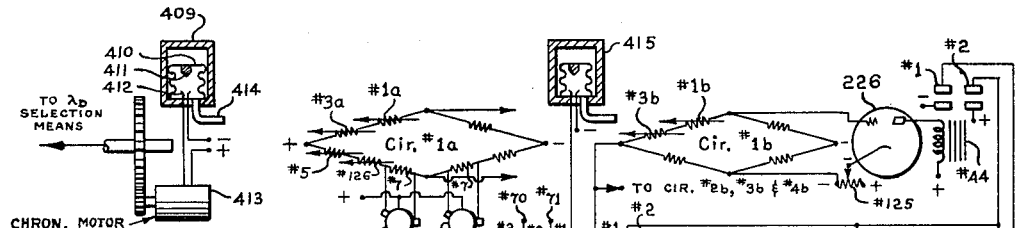
Fig. 32
Fig. 33
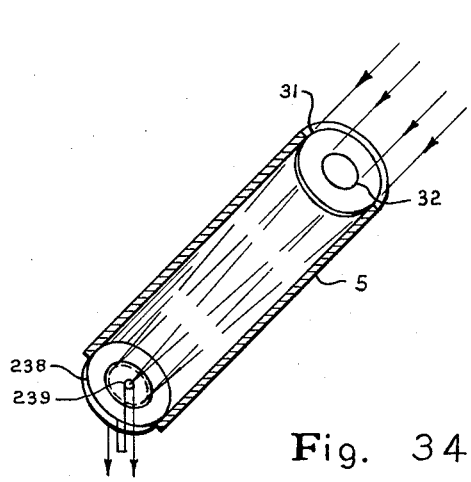
Fig. 34
To input of amplifier 237
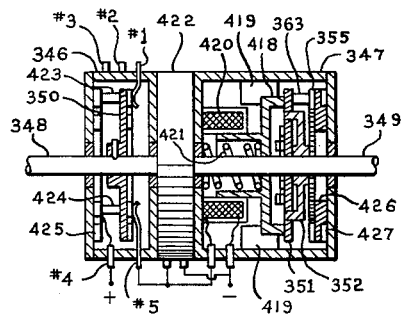
Fig. 35
INVENTOR.
R. A. Reister
BY INVENTOR.
R. A. Reister
BY United States Patent Office 3,249,326
Patented May 3, 1966

3,249,326
ELECTRONIC CELESTIAL NAVIGATION
CONTROL
Richard A. Reister, Sioux City, Iowa
(Rte. 1, Box 127, Summerfield, Fla.)
Filed Sept. 6, 1960, Ser. No. 56,624
13 Claims. (Cl. 244—77)

The present invention relates to automatic navigation and guidance systems for use in moving vehicles such as air or sea craft and more particularly to a navigation system utilizing a single automatic star follower and the earth's magnetic field as a reference through which a continuous indication of the longitude and latitude of the moving vehicle may be provided to an automatic guidance system, rendering it possible to direct a piloted or pilotless craft along an arbitrary or preassigned ground route to any objective whose longitude and latitude are known.

The specification and drawings of the present invention are a continuation in part of the earlier application Serial No. 545,415, filed on November 7, 1955, now abandoned.

In navigation systems requiring two stars simultaneously for navigation, the stars must be at a minimum of 45° apart in order to achieve sufficient accuracy and since maximum accuracy is achieved when the star is at the zenith of the observer, automatic navigation systems requiring two stars simultaneously for navigation may require as many as one hundred stars on a single journey, whereas the present invention may require only one or two or at most a relatively small number of stars. Also the present invention could conveniently utilize an astrodome which were flush with the outer surface of the craft rather than protruding into the airstream since stars could be selected for navigation which were relatively near the craft's zenith, whereas a navigation system requiring two stars simultaneously for navigation could not conveniently use such a flush astrodome due to the resulting restricted range of vision. A flush astrodome would be of practical value in a high speed aircraft or missile where protrusion of the astrodome in the airstream might create undesirable heating effects.

Briefly, the navigation system of the present invention is comprised primarily of a double gimbal mounted star follower rotatable about a vertical axis in the craft and a similarly double gimbal mounted magnetic seeking element rotatable about a vertical axis in the craft, the magnetic seeking element capable of aligning itself to the inclination of the earth's magnetic field in a north-south and east-west direction. A first gimbal system in the star follower serves as a vertical reference from which a second gimbal system in the star follower may align the star tracker with its selected star. A first gimbal system in the magnetic seeking element similarly serves as a vertical reference from which a second gimbal system in the magnetic seeking element may align the magnetic seeking element with the inclination of the earth's magnetic field at the craft's position. When the first gimbal system of the star follower is properly oriented with respect to true north and a true vertical, the angular position of the second gimbal system of the star follower indicates the latitude and longitude of the craft when properly differentiated with respect to Greenwich Meridian Time. The first gimbal system of the magnetic seeking element is also properly oriented with respect to true north and a true vertical, the angular position of the second gimbal system of the magnetic seeking element providing a measurement of the inclination of the earth's magnetic field in a north-south and east-west direction at the craft's position. A computer with a memory element is provided with known values of deviation of the earth's magnetic field from a true vertical in a north-south and east-west direction as a function of longitude and latitude and also deviation of magnetic north from true north as a function of longitude and latitude, a gyrosyn compass providing the computer with the direction of magnetic north within the craft. When the automatic star follower is aligned with a selected star at the craft's position, when the computer is provided with a measurement of inclination of the earth's magnetic field in a north-south and east-west direction as determined by the magnetic seeking element within the craft, and when the star follower provides the computer with the indicated longitude and latitude of the craft's position, the computer is then capable of properly orienting the first gimbal system of the star follower and magnetic seeking element with respect to true north and a true vertical, the second gimbal system of the star follower then indicating the craft's latitude and longitude when properly differentiated with respect to Greenwich Meridian Time.

Due to the nature of gyro-stabilized elements in the system, rolling, pitching, or yawing of the guided craft would have a negligible effect in creating spurious reactions in the system or errors in indicated position. Also, since the earth's gravity is unnecessary as a vertical reference and the system's accuracy is completely unaffected by accelreations of any kind, the present invention could be utilized for the automatic guidance of high speed aircraft or missiles and even aircraft or missiles leaving and re-entering the earth's atmosphere.

Electrical contact means are provided in the navigation system which activate solenoids when the star follower reaches a point approaching the limit of navigation for its selected star, the solenoids operating switching means to automatically orient the star follower with the next star selected for navigation.

A unique planetary gear utilizing smooth surfaced discs with a thin rubber coating as friction drive gears with a minimum number of very high precision teeth to maintain accurate orientation of the friction drive gears may be used to adjust the gimbals in the star follower and other positioning devices in the navigation and guidance systems, such a gear being intended to provide very smooth operation with a minimum of backlash and vibration in the star follower and to achieve very high positioning accuracy.

An automatic guidance system is employed in which a dead-reckoning computer is utilized to establish the craft's desired route, azimuth and speed selection means controlling the dead-reckoning computer. Wheatstone bridge circuits utilized to control the rudder and azimuth of the craft, similarly as in the azimuth control circuits of an auto-pilot, also directly differentiate between the longitude and latitude of the craft as determined by the navigation device and desired longitude and latitude as determined by the dead-reckoning computer, thus eliminating the need for differentiating means, a cosine multiplier, and coordinate transformer required in other guidance systems which convert the craft's longitude and latitude into rectangular coordinates parallel and perpendicular to the craft's route. Elimination of the cosine multiplier and coordinate transformer permits convenient use of a unique multiple turn linear variable resistance in the Wheatstone bridge guidance circuits to provide practically any desired degree of accuracy in the guidance system of the present invention.

The dead-reckoning computer thus maintains the craft on a desired route and an electrical switch is provided which either adjusts the speed of the dead-reckoning computer to the actual ground speed of the craft or adjusts the speed of the craft to the selected speed of the dead-reckoning computer at the option of the pilot. A computer is also provided which determines the correct azimuth to maintain a great circle route to a selected destination, and the computer may automatically adjust the azimuth control of the dead-reckoning computer to maintain such a great circle route at the option of the pilot. Means are also provided to automatically transmit the longitude and latitude values of a second selected destination to the azimuth computer when the craft reaches a first selected destination, thus enabling the craft to be automatically guided through a series of selected destinations.

Means are provided such that the dead-reckoning computer used for automatic guidance also properly orients the star follower temporarily in accordance with the craft's position as determined by the dead-reckoning computer while automatic transfer of navigation to a different star is being accomplished or when tracking of the star selected for navigation is temporarily interrupted by clouds or other obstructions, any error in the craft's position during interruption of the star's tracking being automatically corrected when the star follower is again aligned with the selected star. When the automatic guidance system is turned off for manual operation of an aircraft, such as at take-offs or landings, provision is also made whereby the azimuth and speed selection dials of the dead-reckoning computer are automatically adjusted to the craft's azimuth and true air speed whenever tracking of the star selected for navigation is temporarily interrupted by clouds or other obstructions, such that the star follower is accordingly oriented with its selected star at all times.

A unique type of compact multiple turn linear variable resistor is utilized in the Wheatstone bridge guidance circuits in which each revolution of a first linear variable resistor adjusts a second variable resistor in increments of resistance equal to the maximum resistance of the first resistor, the first and second resistors being connected in series to provide any desired degree of accuracy in the guidance system.

Provision is made for navigation and guidance of a craft leaving and re-entering the earth's atmosphere such that the normal Wheatstone bridge guidance circuits are automatically converted to homing circuits prior to the craft's re-entrance into the earth's atmosphere which merely home the craft on a selected destination, thus permitting the craft to skid considerable distances while maneuvering in the rarefied atmosphere without exceeding the limits of control of the guidance circuit. While the normal guidance circuits are converted to homing circuits, auxiliary positioning circuits are activated to maintain the longitude and latitude determined by the dead-reckoning computer identically equal to the longitude and latitude determined by the navigation system such that immediate conversion back to the normal guidance circuits can be achieved at any instant. When atmospheric density is sufficient for the craft's control surfaces to maintain the position of the craft within the designed limits of tolerance of the control system, an atmospheric pressure operated switch automatically restores the guidance circuits from the homing circuit to the normal Wheatstone bridge guidance circuits maintaining a straight line flight path to the selected destination.

Visual position indication means are provided which project the craft's position and route being maintained by the guidance system on any of a series of projected maps at the selection of the pilot. The azimuth selection dial of the dead-reckoning computer adjusts the projected route of the craft on the projected maps such that the pilot may merely adjusts the azimuth selection dial until the projected route intersects a desired destination on the selected map to achieve automatic guidance to the selected destination if the azimuth computer is not turned on to automatically determine the proper azimuth to a pre-set longitude and latitude.

Means are provided to conveniently set various functions into the automatic navigation and guidance system such as sidereal hour angle and declination of various stars to be used for navigation, longitude and latitude of selected destinations, desired speeds and altitudes at various stages of flight, etc., the values being conveniently set into the system or changed during flight at the push of a button. A series of push buttons establish and indicate digits of a desired quantity, a linear variable resistance connected into a positioning circuit being simultaneously adjusted by the push buttons to the desired quantity, a first and second selector switch being used to connect any desired function into the positioning circuit, whereupon the desired function is adjusted in accordance with the indicated quantity at the push of a button.

It is accordingly one of the objects of the present invention to provide a navigation system utilizing a single star and the Earth's magnetic field as a reference to determine a continuous indication of a craft's longitude and latitude, which is independent of the earth's gravity and is unaffected by accelerations of any kind.

Another object of the present invention is to provide an accurate, economical craft guidance system which will automatically guide a craft to a pre-determined destination or on any ground route conveniently at the selection of the pilot.

A further object is to correct errors in the navigation system due to refraction of light in the earth's atmosphere.

Another object is to provide automatic transfer of navigation to a different star whenever the limit of navigation by a selected star is approached.

A further object is to provide means for guiding the craft automatically through a series of destinations, and flight conditions such as speed, altitude, etc. which are pre-set into the control.

Another object is to provide at the selection of the pilot either automatic adjustment of the craft's throttle to maintain a desired ground speed or automatic adjustment of the guidance system to the actual ground speed of the craft at a constant throttle setting under all wind conditions.

A further object is to provide an electronic speed control for longitude and latitude motors in the dead-reckoning computer which automatically corrects for wear in the motors, varying resistance in the motor's brushes, varying loads on the motors, etc., so a selected ground route is accurately maintained without frequent repair or adjustment.

Another object is to provide a unique variable resistance of extreme accuracy and rapid resolution.

A further object is to provide accurate, economical gearing for accurate transmission of shaft positions.

Another object is to provide automatic guidance of a craft leaving and re-entering the earth's atmosphere.

A further object is to provide a series of maps of any scale which may be projected on a screen at the pilot's selection.

Another object is to automatically project the craft's position and ground route at any time on any of the projected maps, thus permitting convenient, rapid establishment of the craft's course to any selected position on the projected maps.

Other desirable features and advantages of the invention will appear more fully hereinafter from the following detailed description when taken in connection with the accompanying drawings illustrating one form of the invention. It is to be expressly understood, however, that the drawings are utilized for purposes of illustration only and are not to be taken as a definition of the limits of the invention, reference being had for this purpose to the appended claims.

In the drawings, wherein similar reference characters refer to like parts throughout the several views:

FIGURE 1 is a front view of the star tracking device.

FIGURE 2 is a top view of the apparatus of FIGURE 1.

FIGURE 3 is a top view of the magnetic inclination seeking element which determines the inclination of the earth's magnetic field in a north-south and east-west direction within the craft.

FIGURE 4 is a front view of the apparatus of FIGURE 3.

FIGURE 5 is a view of gearing providing accurate transmission of shaft positions.

FIGURE 7 is a view of further details of the navigation and guidance system.

FIGURE 8 is a view of a portion of the circuit and mechanism which establishes a series of destinations and flight conditions.

FIGURE 9 is a cross-sectional view of multi-pole, multi-position switch 195 in FIGURE 8.

FIGURE 13 is a view of a control panel.

FIGURE 14 is a cross-sectional view of azimuth selection dial 256 and its attached mechanisms.

FIGURE 15 is a cross-sectional view of switch 320 in FIGURE 14.

FIGURE 16 is another cross-sectional view of switch 320.

FIGURE 17 is a cross-sectional view of the mechanism in FIGURE 14 illustrating various variable resistors adjusted by azimuth selection dial 256.

FIGURE 18 is a cross-sectional view of the mechanism in FIGURE 14 illustrating various rotary relays operated by disc 311 upon adjustment of azimuth selection dial 256.

FIGURE 19 is a back view of disc 311 in FIGURE 14 which provides automatic adaptation of the guidance system to proper operation at any selected azimuth.

FIGURE 20 is an illustration of the circuit controlling the attitude of the craft with respect to the earth's surface.

FIGURE 21 is a back view of azimuth computer 46 illustrating connections to elements of the navigation and guidance system.

FIGURE 22 is a detail illustrating connections of rotary relay 301 of FIGURE 18 to one type of variable resistor.

FIGURE 23 is another detail illustrating connections of rotary relay 301 to another type variable resistor.

FIGURE 24 is an illustration of circuits used to indicate craft's position on a projected map.

FIGURE 25 is a cross-sectional view of variable resistors 346 and 347 providing high accuracy and rapid resolution.

FIGURE 26 is another cross-sectional view of variable resistor 347.

FIGURE 27 is a back view of the projection mechanism which indicates craft's position and ground route on a projected map.

FIGURE 28 is a front view of the mechanism of FIGURE 27.

FIGURE 31 is an illustration of a computer for correction of errors due to refraction of light in the earth's atmosphere.

FIGURE 32 is a detail providing for adjustment in longitude of a selected destination when the guided craft leaves the earths' atmosphere.

FIGURE 33 illustrates a modification of the guidance circuit of FIGURE 30, providing proper guidance of a craft upon entering the earth's atmosphere.

FIGURE 34 is a view of the interior of tracking telescope 5.

FIGURE 35 is an illustration of a modification of the variable resistors of FIGURE 25.

While the description herein considers the instant invention as applied to the problem of automatic craft navigation and guidance, it is to be understood that the present invention also relates to the novel features or principles of the instrumentalities described herein, whether or not such are used for the stated objects, or in the stated fields or combinations.

Although the principles illustrated and described in the present invention in determining a true vertical and true north reference apply particularly to the disclosed navigation system, it is to be expressly understood that the principles would apply equally well to any navigation system capable of determining a geographical position in longitude and latitude in which reference to a true vertical or true north completely unaffected by accelerations of any kind were either essential or desired. It is also to be expressly understood that one embodiment of apparatus responsive to signals from a star tracking element to align the tracking element with its selected star as disclosed in the present invention is for illustrative purposes only and that any apparatus responsive to signals from a tracking element to properly orient the tracking element with a selected celestial body could be utilized, as indicated in FIGURE 6.

The determination of continuous, instantaneous, exact geographical position, plus a precise true vertical and true north reference the accuracy of which is unaffected by acceleration of any kind is vitally important in the sighting of military equipment such as mobile artillery, tanks, mobile rocket launchers, and mobile ballistic missile launchers either at sea utilizing submarines or on land utilizing mobile equipment or in the air utilizing aircraft. The express purpose of this invention is to provide such information through reference to a single celestial body, so such information could be conveniently obtained as in the present invention during daylight hours by reference to the sun or at any time by reference to a single satellite orbiting in the plane of the earth's equator at a constant position with respect to the earth, the star tracking telescope being conveniently replaced by a signal seeking antenna tracking radio signals emanating from the described satellite.

*The navigation system*

Figure 6:
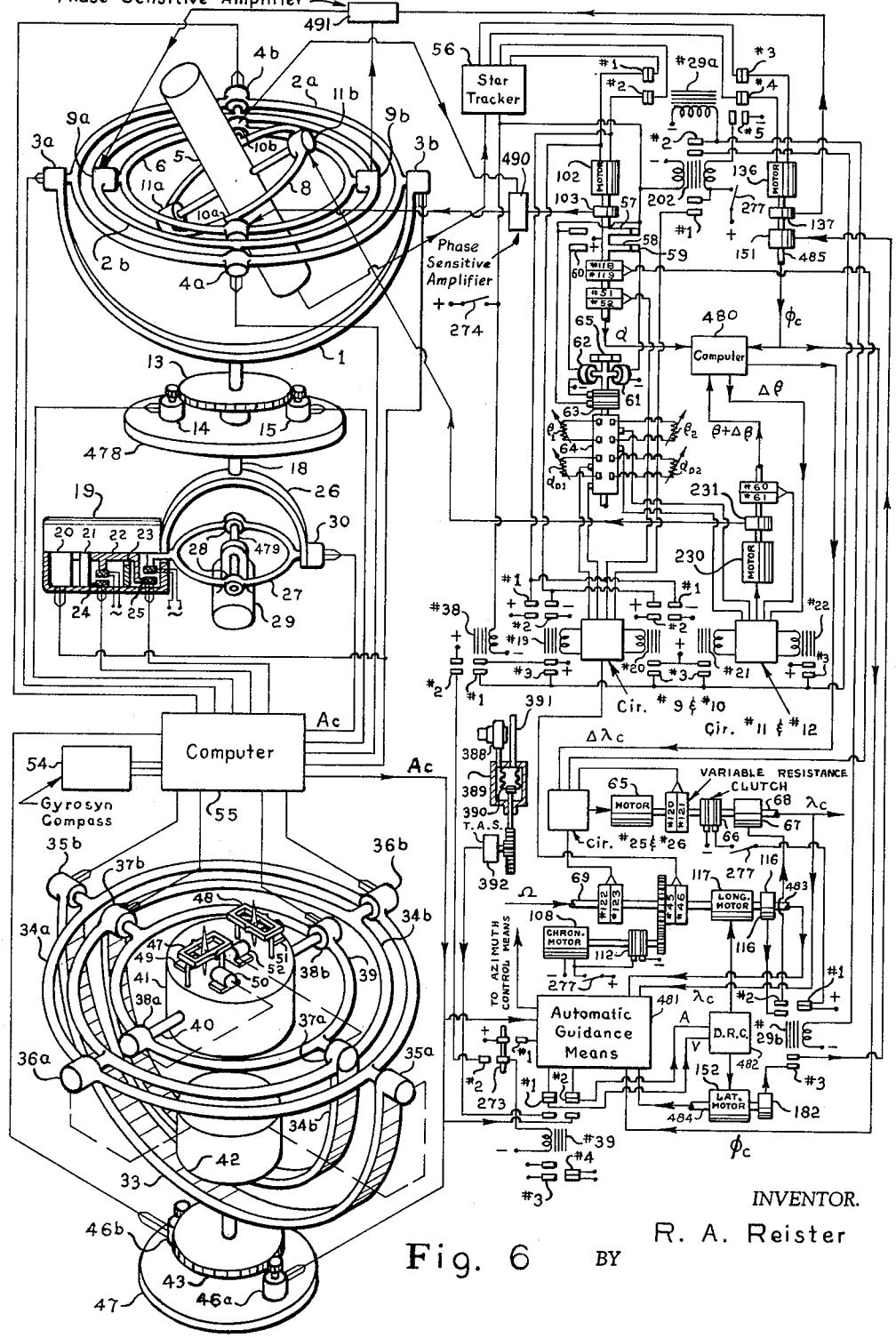
FIGURE 6 is a three dimensional view and block diagram illustrating the fundamental principle of the navigation mechanism and the relationship of the principal navigation components.
Figure 11:
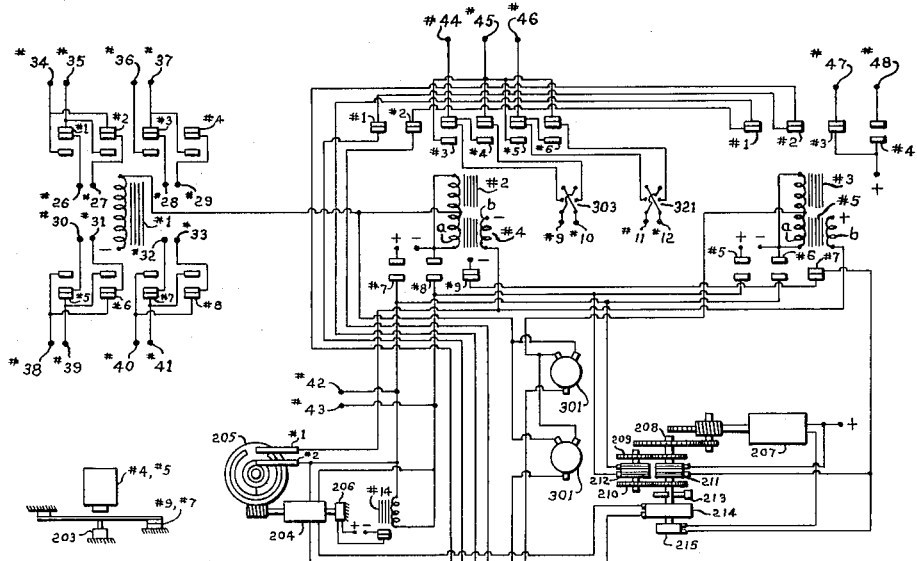
FIGURE 11 is a detail of relays #4 and #5 in FIGURE 10.

The basic principle of the navigation system is illustrated in FIGURE 6, where it is readily seen that the automatic star follower 5 is mounted in a double gimbal system supported by frame 1 rotatable about a first vertical axis 18 in the craft, a true-north seeking gyroscope 29 being gimbally attached to axis 18 to stabilize frame 1 with respect to true north. A first gimbal system with two degrees of rotational freedom about two mutually perpendicular axes provides a vertical reference platform, first outer gimbal ring 2a being rotatably mounted about a second axis within supporting frame 1, the second axis being perpendicular to the first vertical supporting axis 18, a second gimbal ring 2b being rotatably mounted about a third axis within the first gimbal ring 2a, the third axis being perpendicular to the second axis, the plane of the second gimbal ring 2b being oriented perpendicular to a true vertical through the center of the earth, and the third axis about which the second gimbal ring 2b rotates being aligned with true north. A second gimbal system with three degrees of rotational freedom about three mutually perpendicular axis is mounted within the first gimbal system platform to align the star follower 5 with a selected star, a third gimbal ring 6 being rotatably mounted about a fourth axis within the second gimbal ring 2b, the fourth axis being perpendicular to the third axis, a fourth gimbal ring 8 being rotatably mounted about a fifth axis within the third gimbal ring 6, the fifth axis being perpendicular to the fourth axis, and the star follower 5 being rotatably mounted about a sixth axis within the fourth gimbal ring 8, the sixth axis being perpendicular to the fifth axis and the optical axis of telescope 5 being perpendicular to the sixth axis. The angular position of star follower 5 in the fourth gimbal ring 8 is adjusted by the sixth axis to the declination of a selected star, the optical axis of star follower 5 being perpendicular to the plane of fourth gimbal ring 8 at 0° declination, the angular position of the third gimbal ring 6 and the fourth gimbal ring 8 then being adjusted by the star tracking apparatus to align the optical axis of the star follower 5 with a selected star.

Thus when the star follower 5 is aligned with its selected star and the second gimbal ring 2b is properly oriented with respect to a true vertical and true north as previously described, the fifth axis (about which the fourth gimbal ring 8 rotates) is aligned parallel to the earth's axis of rotation, the angular position of the fourth gimbal ring 8 with respect to the third gimbal ring 6 then indicating hour angle of the selected star which when properly differentiated with Greenwich Meridian Time provides the longitude of the craft, and the angular position of the third gimbal ring 6 with respect to the second gimbal ring 2b indicating the latitude of the craft since the angle of the earth's axis of rotation (represented by the third gimbal ring 6) with respect to a true vertical through the center of the earth (represented by the second gimbal ring 2b) indicates the latitude of the craft.

A theoretical example will serve to illustrate alignment of the fifth axis (about which the fourth gimbal ring 8 rotates) parallel to the earth's axis of rotation. Assume the craft to be at 0° latitude at the earth's equator, the declination of the star selected for navigation to be 0°, and time such that the star selected for navigation is at the craft's zenith. Then it is readily seen that the fifth axis, about which the fourth gimbal ring 8 rotates, would be aligned parallel to the earth's axis of rotation under normal conditions of operation where the gimbal system was properly oriented with respect to a true vertical and true north as previously described. It is also readily seen that movement of the craft east or west parallel to the earth's equator or north or south perpendicular to the earth's equator would not affect the alignment of the fifth axis with respect to the earth's axis of rotation such that the fifth axis (about which the fourth gimbal ring 8 rotates) would always remain parallel to the earth's axis of rotation as long as the star follower was aligned with the star selected for navigation and the gimbal system was properly oriented with respect to true north and a true vertical as previously described.

The magnetic seeking element for determining the inclination of the earth's magnetic field in a north-south and east-west direction within the craft is mounted in a double gimbal system supported by frame 33 rotatable about a further first vertical supporting axis within the craft, similarly as the star follower is mounted, as illustrated directly below the star follower in FIGURE 6. (For purposes of reference the vertical supporting axis of the magnetic inclination seeking element will be referred to as the first axis of the magnetic inclination seeking element to distinguish it from the first vertical supporting axis 18 of the star follower, further similarly designated axes and gimbal rings in the magnetic inclination seeking element being similarly referred to.) In the magnetic inclination seeking element, a first gimbal system with two degrees of rotational freedom about two mutually perpendicular axes provides a vertical reference platform, first outer gimbal ring 34a being rotatably mounted about a second axis within supporting frame 33, the second axis being perpendicular to the first vertical supporting axis of frame 33, a second gimbal ring 34b being rotatably mounted about a third axis within the first gimbal ring 34a, the third axis being perpendicular to the second axis, vertical seeking gyroscope 42 being attached to the second gimbal ring 34b in a suspended position below gimbal ring 34b as illustrated to stabilize the plane of the second gimbal ring 34b in a position perpendicular to a true vertical through the center of the earth, and the third axis about which the second gimbal ring 34b rotates being aligned with true north. A second gimbal system with two degrees of rotational freedom about two mutually perpendicular axes is mounted within the first gimbal system platform to align the magnetic seeking element 41 with the inclination of the magnetic lines of force of the earth, a third gimbal ring 39 being rotatably mounted about a fourth axis within the second gimbal ring 34b, the fourth axis being perpendicular to the third axis, and gyroscope 41 being rotatably mounted about a fifth axis 40 within the third gimbal ring 39, the fifth axis 40 being perpendicular to the fourth axis, and the spin axis of gyroscope 41 being perpendicular to the fifth axis 40. The spin axis of gyroscope 41 is aligned parallel or tangent to the magnetic lines of force of the earth by magnetic inclinometers 47 and 48, inclinometers 47 and 48 being mounted atop gyroscope 41 to respectively indicate the inclination of the earth's magnetic field in a north-south and east-west direction, photo-pickoff means 50 and 52 respectively creating signals responsive to the position of inclinometers 47 and 48 to torque gyroscope 41 until precession of gyroscope 41 aligns the spin axis of gyroscope 41 parallel or tangent to the lines of force of the earth's magnetic field. The angular position of the spin axis of gyroscope 41 with respect to the third gimbal ring 39 and the angular position of the third gimbal ring 39 with respect to the second gimbal ring 34b is then a measure of the deviation of the earth's magnetic field within the craft from the vertical reference of second gimbal ring 34b, the described deviation of the earth's magnetic field in a north-south and east-west direction from the vertical reference of gimbal ring 34b being supplied to computer 55.

Computer 55 employs memory elements to store the known deviation of the earth's magnetic field in a north-south and east-west direction with respect to a true vertical through the center of the earth as a function of longitude and latitude, the known values being obtained from a device constructed in a manner identically similar to the magnetic seeking device illustrated in FIGURE 6. The known deviation of magnetic north from true north as a function of longitude and latitude is also stored in a further memory element of computer 55, gyrosyn compass 54 providing computer 55 with the direction of magnetic north with respect to the craft at the craft's position. Thus when computer 55 is provided with the longitude and latitude of the craft as determined by the navigation device, computer 55 may determined the deviation of magnetic north from true north at the craft's indicated position and correspondingly properly orient frame 1 of the star follower and frame 33 of the magnetic inclination seeking element with respect to true north as previously described, computer 55 overriding true north seeking gyroscope 29. True north seeking gyroscope 29 thus serves as an auxiliary true north reference in the event of malfunction of computer 55 in addition to providing gyro stabilization of frame 1. Computer 55 similarly determines the deviation of the earth's magnetic field in a north-south and east-west direction with respect to a true vertical at the craft's indicated position and correspondingly properly orients the second gimbal ring 2b of the star follower with respect to a true vertical, the position of the second gimbal ring 34b of the magnetic inclination seeking element with respect to the craft serving as an intermediary reference from which computer 55 may properly orient the second gimbal ring 2b of the star follower in accordance with the difference between the observed deviation of the earth's magnetic field from a true vertical (as determined by the position of gimbal ring 34b with respect to the magnetic inclination seeking element) and the true deviation of the earth's magnetic field from a true vertical as determined by computer 55 at the craft's indicated position. Computer 55 may also override vertical seeking gyroscope 42 to adjust the second gimbal ring 34b of the magnetic inclination seeking element until the plane of the gimbal ring 34b is perpendicular to a true vertical, the position of the second gimbal ring 2b of the star follower then being slaved to the position of the second gimbal ring 34b of the magnetic inclination seeking element, vertical seeking gyroscope 42 serving as an auxiliary vertical reference in the event of malfunction of computer 55 in addition to providing gyro stabilization of the vertical reference. It may be noted that gyroscope 41 in the magnetic inclination seeking element gyro stabilizes the position of the magnetic inclinometers with respect to the earth's magnetic field and in addition gyro stabilizes the direction of frame 33 with respect to true north at all geographical locations of the craft except directly over the magnetic poles of the earth where the spin axis of gyroscope 41 would be aligned in a vertical position. Computer 55 and the torquer adjusting the direction of frame 33 about its vertical supporting axis would of course override this gyro stabilization effect to maintain frame 33 properly oriented with respect to true north, it being understood that the direction of frame 33 would be slaved to the direction of frame 1 in the star follower such that true north seeking gyroscope 29 would properly orient both frame 1 and frame 33 with respect to true north in the event of failure of computer 55.

A few theoretical examples will serve to illustrate the operation of computer 55 in properly orienting the gimbal systems with respect to a true vertical and true north.

I. Assume the craft to be at a longitude of 90° west at some latitude within the United States where the known deviation of magnetic north from true north is 5° east, the star selected for navigation being south of the craft's zenith. Then if the gimbal systems of the star follower and magnetic inclination seeking element are rotated *clockwise* from true north such that they are oriented to a direction in the craft *less* than 5° west of magnetic north (3° west for example), the longitude determined by the navigation device will be greater than 90° west, since the error in direction of the gimbal system would cause the fourth gimbal ring 8 in the star follower to rotate in the same direction as if the craft had traveled west in order to maintain the star follower 5 aligned with its selected star. Computer 55 would then determine the correct deviation of magnetic north from true north to be *greater* than 5° west at the increased indicated longitude and would accordingly adjust the gimbal systems in a *counter-clockwise* direction to properly correct the error in direction of the gimbal systems. Similarly if the gimbal systems were rotated *counter-clockwise* from true north such that the gimbal systems were oriented to a direction *greater* than 5° west of magnetic north (7° west for example) at the assumed position of the craft, the indicated longitude would be less than 90° west, computer 55 would determine the correct deviation of magnetic north from true north to be *less* than 5° west at the decreased indicated longitude and would accordingly adjust the gimbal systems in a *clockwise* direction to properly correct the error in direction of the gimbal systems. Thus it is seen that computer 55 would adjust the direction of the gimbal systems until the deviation of the gimbal systems from magnetic north equalled the deviation of magnetic north from true north, as determined by computer 55 at the indicated position of the craft, where the gimbal systems would be properly oriented with respect to true north. It is also seen that deviation of the gimbal systems from the null point at true north would result in a magnified correction signal from computer 55 due to the resulting error in indicated longitude, which would reduce the error in direction of the gimbal systems from the null point necessary to produce a corrective signal from computer 55, thus resulting in more precise orientation of the gimbal systems with respect to true north. Due to the gyro stabilization of the gimbal systems with respect to true north by true north seeking gyroscope 29, the rate of precession of true north seeking gyroscope 29 would be slower than the rate of adjustment of the fourth gimbal ring 8 with respect to the third gimbal ring 6 to maintain star follower 5 aligned with its selected star, therefore the error in indicated longitude would diminish to zero when the gimbal systems were properly oriented with respect to true north, and the magnified corrective signal from computer 55 would diminish to zero when the gimbal systems were properly oriented with respect to true north, thus preventing overshooting of the null point by computer 55 and preventing spurious corrections of the gimbal systems with respect to true north. Since frame 1 of the star follower is gyro stabilized in direction by true north seeking gyroscope 29, and frame 33 of the magnetic inclination seeking element is gyro stabilized in direction by gyroscope 41 as previously described, the direction of frame 33 being slaved to the direction of frame 1, there would always be a negligible error between the direction of frame 33 and frame 1, and any error which occurred in the direction of frame 33 would have a negligible effect in creating errors in the inclination of the earth's magnetic field as determined by the magnetic inclination seeking element.

II. Assume the craft to be at a longitude of 80° west at some latitude in the United States where the known deviation of magnetic north from true north is 5° west. Then if the gimbal systems are rotated *clockwise* from true north such that they are oriented to a direction in the craft greater than 5° east of magnetic north (7° east for example), the fourth gimbal ring 8 in the star follower will again be rotated in a direction as if the craft had moved west, causing an increase in indicated longitude. Computer 55 would then determine the correct deviation of magnetic north from true north to be *less* than 5° west at the increased indicated longtiude and would accordingly adjust the gimbal systems in a *counter-clockwise* direction to properly correct the error in direction of the gimbal systems. Rotation of the gimbal systems counter-clockwise from true north under the stated conditions would similarly result in a proper clockwise correction of the gimbal systems to true north. Thus it is seen that computer 55 properly orients the gimbal systems to true north regardless of whether the deviation of magnetic north is east or west of true north as indicated in Examples I and II.

III. Assume an aircraft to be at a latitude of 35° north and flying west at some position in the United States. Assume the craft rolled violently counter-clockwise so suddenly and quickly that the second gimbal ring 2b in the star follower was temporarily displaced *counter-clockwise* from a true vertical in a north-south plane. (Such a supposition is unlikely since the reaction time and speed of operation of the mechanism adjusting gimbal ring 2b would most likely be sufficient to cope with any situation so that such errors would be negligible.) It is plausible to assume that the rate of adjustment of the third gimbal ring 6 with respect to the second gimbal ring 2b in the star follower to maintain orientation of the star follower 5 with its selected star would be approximately equal to or slightly greater than the rate of adjustment of the first gimbal ring 2a with respect to frame 1. Thus any sudden error which occurred in the position of gimbal rings 2b and 2a would be half way corrected by the time star follower 5 was realigned with its selected star, at which point the position of gimbal ring 2a with respect to frame 1 and the position of gimbal ring 6 with respect to gimbal ring 2b would be adjusted to their correct positions at equal speed in maintaining star follower 5 aligned with its selected star, therefore the error in indicated latitude would be negligible at the time gimbal ring 2b was properly oriented with respect to a true vertical, and the maximum error in indicated latitude would be approximately one half the maximum deviation of gimbal ring 2b from a true vertical. In the stated deviation of gimbal ring 2b from a true vertical, gimbal ring 2b would be in a position as if the deviation of the earth's magnetic field in a north-south direction from a true vertical were *less* than that which actually occurred at the craft's true position. The error in position of gimbal ring 6 with respect to gimbal ring 2b would produce a decrease in indicated latitude, since gimbal ring 6 would be initially rotated with respect to gimbal ring 2b in a direction as if the craft had moved south in order to maintain star follower 5 aligned with its selected star. Computer 55 would then determine that the deviation of the earth's magnetic field in a north-south direction from a true vertical was *greater* at the decreased indicated latitude than that which actually occurred at the craft's true position since the earth's magnetic field rotates in a counter-clockwise direction in a north-south plane with southern movement, and computer 55 would consequently properly adjust gimbal ring 2b *clockwise* in a north-south plane to correct the error. It is also seen that deviation of gimbal ring 2b from a true vertical in a north-south plane would result in a magnified corrective signal from computer 55 due to the error in indicated latitude which would occur, and that the magnified corrective signal would diminish to zero when gimbal ring 2b were properly oriented to a true vertical, since the error in indicated latitude would be negligible at this point as previously described. Thus computer 55 would not overshoot the null point of gimbal ring 2b and spurious corrections of gimbal ring 2b would not occur, the temporary error in indicated latitude resulting under the stated conditions being only approximately half the initial error in position of gimbal ring 2b. Rotation of gimbal ring 2b clockwise from a true vertical in a north-south plane would of course similarly result in a proper counter-clockwise correction of gimbal ring 2b by computer 55.

IV. Assume an aircraft to be also flying north under the conditions stated in Example I and the craft rolled violently clockwise so quickly and suddenly that the second gimbal ring 2b in the star follower was temporarily displaced clockwise from a true vertical in an east-west plane. (Such a supposition is unlikely since the reaction time and speed of operation of the mechanism adjusting gimbal ring 2b would most likely be sufficient to cope with any situation so that such errors would be negligible.) Rotaton of the second gimbal ring 2b in the star follower from a true vertical under the stated conditions would produce a decrease in indicated longitude (equal approximately to one half the initial error in position of gimbal ring 2b similarly as in Example III), since the initial movement of the fourth gimbal ring 8 with respect to the third gimbal ring 6 to maintain star follower 5 aligned with its selected star would be as if the craft had moved east. Suppose the decrease in indicated longitude due to rolling of the craft clockwise were greater than the increase in indicated longitude due to the deviation of the gimbal systems from true north (in Example I), and that the resulting decrease in indicated longitude were of such magnitude that computer 55 determined that the correct deviation of magnetic north from true north was not only less than 5° west but less than the deviation of the gimbal systems from magnetic north in Example I (2° west for example). Computer 55 would then momentarily adjust frame 1 clockwise in the wrong direction to correct the error in direction of frame 1, however further divergent adjustment of frame 1 from a correct direction would be prevented due both to the resulting increase in indicated longitude which would occur from clockwise adjustment of frame 1 (as illustrated in Example I) and due to the resulting increase in indicated longitude which would occur from normal reorientation of gimbal ring 2b to a true vertical in an east-west plane by computer 55. Thus all components of error in the gimbal systems due to either deviation from true north or deviation from a true vertical would be properly corrected by computer 55. It may be noted that inclination of the earth's magnetic field in an east-west direction does not appreciably vary with longitude at the craft's stated position, therefore errors in indicated longitude resulting from deviation of gimbal ring 2b from a true vertical in an east-west plane would not produce magnified corrective signals from computer 55 as occurred in Examples I, II, and III. It is also to be noted that due to the very precise orientation of frame 1 with respect to true north and gyro stabilization of frame 1 as described in Example I, and due to the negligible errors which would occur from rolling of the craft as described in Example III, the combination of errors described in Example IV would not likely be of the magnitude described.

In the above Examples I and II, it may be similarly demonstrated that if the craft were in a geographical location directly between the north geographic pole and the north magnetic pole, selection of a star *south* of the craft's zenith for navigation would *tend* toward spurious divergent orientation of the gimbal systems from true north by computer 55, actual divergent orientation depending upon the magnitude of deviation of magnetic north from true north as determined by computer 55. (For instance in Example I, if computer 55 determined the correct deviation of magnetic north from true north under the stated conditions to be *less* than 5° west, computer 55 would be tending toward divergent orientation of the gimbal systems from true north, but actual divergent orientation of the gimbal systems would not be reached until computer 55 determined the correct deviation of magnetic north from true north to be less than 3° west under the stated conditions in Example I.) However, selection of a star *north* of the craft's zenith for navigation between the north geographic pole and the north magnetic pole would provide proper convergent orientation of the gimbal systems with respect to true north, similarly as illustrated in Examples I and II. This condition would prevail for some distance east or west of the stated geographical position until a line of demarcation was reached beyond which normal convergent orientation of the gimbal systems with respect to true north would be maintained by selection of a star *south* of the craft's zenith for navigation at all geographical locations *north* of the magnetic equator except as noted, similarly as illustrated in Examples I and II. Thus there would be an oval line of demarcation in the vicinity of the geographical and magnetic north poles inside of which proper convergent orientation of the gimbal systems with respect to true north would be achieved by selection of a star for navigation north of the craft's zenith. This would be no particular disadvantage, since destination selection means are provided in the present invention which automatically transfer navigation to different stars at selected destinations. It may be noted at the line of demarcation as described, variations in values of deviation of magnetic north from true north would be so slight on either side of the line that selection of a star for navigation either south or north of the craft's zenith would provide proper convergent orientation of the gimbal systems with respect to true north near the line of demarcation, such that proper operation of the navigation system would be easily achieved by the stated transfer of navigation to appropriate starts when the craft approached the line of demarcation. At geographical locations *south* of the magnetic equator, proper convergent orientation of the gimbal systems with respect to true north would be achieved by selection of a star *north* of the craft's zenith for navigation, except for a similar oval line of demarcation in the vicinity of the geographical and magnetic south poles within which star would be selected for navigation *south* of the craft's zenith. However, deviations of magnetic north from true north either side of the magnetic equator would probably be so slight that stars could be selected for navigation either south or north of the craft's zenith when the craft were at considerable distances either south or north of the magnetic equator such that the sun could be selected for proper navigation in the equatorial regions of the earth. The stated lines of demarcation could be easily determined from known deviations of magnetic north from true north as a function of longitude and latitude, similarly as illustrated in Examples I and II.

Proper convergent orientation of the gimbal systems with respect to a true vertical by computer 55 is not effected by geographical position or selection of stars, since movement of a craft south is always accompanied by rotation of the earth's magnetic field with respect to a true vertical in a north-south plane, the stated rotation always occurring in a counter-clockwise direction with such southern movement regardless of geographical location to provide resulting convergent orientation of gimbal ring 2b to a proper position with respect to a true vertical in a north-south plane, as illustrated in Example III. Inclination of the earth's magnetic field in an east-west direction does not appreciably vary with changes in longitude and latitude except near the magnetic poles east or west of the magnetic poles where rotation of the earth's magnetic field with respect to a true vertical in an east-west plane with changes in longitude would result in convergent orientation of gimbal ring 2b to a proper position with respect to a true vertical in an east-west plane, similarly as gimbal ring 2b is properly oriented with respect to a true vertical in a north-south plane as illustrated in Example III.

In the above Examples I and II, if the craft were located near the magnetic poles east or west of the magnetic poles, the resulting increase in indicated longitude due to rotation of the gimbal systems clockwise from proper orientation with respect to true north would cause computer 55 to rotate gimbal ring 2b clockwise from a true vertical in an east-west plane until the position of gimbal ring 2b was appropriate to an error in longitude somewhat less than the original error in longitude, since the earth's magnetic field would rotate counterclockwise from a true vertical in an east-west plane with increase in longitude. The resulting deviation of gimbal ring 2b from a true vertical and resulting slight reduction in error in longitude under the stated conditions would not affect proper orientation of the gimbal systems with respect to true north as described in Examples I and II.

In the above Examples I and II, if a star were selected for navigation east of the craft's zenith, rotation of the gimbal systems clockwise from proper orientation with respect to true north under the stated conditions would cause the fifth axis in gimbal ring 6 (about which the fourth gimbal ring 8 rotates in the star follower) to rotate clockwise in a north-south plane from a position parallel to the earth's axis of rotation, creating an initial decrease in indicated latitude, since the third gimbal ring 6 would be rotated with respect to the second gimbal ring 2b in a direction as if the craft moved south to maintain the star follower 5 aligned with its selected star. Computer 55 would then determine that the deviation of the earth's magnetic field in a north-south direction from a true vertical were greater at the decreased indicated latitude than that which actually occurred at the craft's position and would accordingly adjust gimbal ring 2b clockwise from a true vertical in a north-south plane until the deviation of the earth's magnetic field from a true vertical at the craft's actual position (as determined by the position of gimbal ring 2b with respect to the magnetic inclination seeking element 41) equalled the deviation of the earth's magnetic field from a true vertical as determined by computer 55 at the craft's position as indicated by the navigation device. Thus gimbal ring 2b would be rotated clockwise from a true vertical in a north-south plane until the position of gimbal ring 2b were appropriate to an error in indicated latitude somewhat less than the original error in latitude. Rotation of the gimbal systems counter-clockwise from true north under the stated conditions would similarly result in a slight increase in indicated latitude and would cause gimbal ring 2b to rotate counter-clockwise from a true vertical in a north-south plane. Selection of a star for navigation west of the craft's zenith under the stated conditions would reverse the errors in indicated latitude and reverse the direction of deviation of gimbal ring 2b from a true vertical in a north-south plane upon rotation of the gimbal systems from true north.

At geographical locations on the earth where the direction of the earth's magnetic field is nearer east or west than north or south and a star is selected for navigation east or west of the craft's zenith, the error in determined latitude resulting from deviation of the gimbal systems from true north is not only greater than the error in determined longitude, but the resulting error in deviation of magnetic north from true north as determined by computer 55 at the error in indicated position would also be more affected by errors in latitude than errors in longitude, therefore the resulting error in indicated latitude under the stated conditions would predominate to properly orient the gimbal systems with respect to true north, similarly as the resulting error in indicated longitude predominated to properly orient the gimbal systems with respect to true north in Examples I and II where the earth's magnetic field is in a north-south direction and a star is selected for navigation south of the craft's zenith. At geographical locations *west* of the North Magnetic Pole and *north* of the magnetic equator or *west* of the South Magnetic Pole and *south* of the magnetic equator, stars would be selected for navigation *west* of the craft's zenith to assure convergent orientation of the gimbal systems with respect to true north, since then deviation of the gimbal systems *clockwise* from true north would create an error in latitude to the *north* and computer 55 would determine that the deviation of true north from magnetic north at the indicated position was *greater* in a *counter-clockwise* direction than that which actually occurred at the craft's true position, resulting in *counter-clockwise* adjustment of the gimbal systems to proper orientation with respect to true north, similarly as illustrated in Examples I and II. Similarly at geographical locations *east* of the North Magnetic Pole and *north* of the magnetic equator or *east* of the South Magnetic Pole and *south* of the magnetic equator, stars would be selected for navigation *east* of the craft's zenith to assure convergent orientation of the gimbal systems with respect to true north, since then deviation of the gimbal systems *clockwise* from true north would create an error in latitude to the *south* and computer 55 would determine that the deviation of true north from magnetic north at the indicated position was *greater* in a *counter-clockwise* direction than that which actually occurred at the craft's true position, resulting in *counter-clockwise* adjustment of the gimbal systems to proper orientation with respect to true north, similarly as illustrated in Examples I and II.

It may be noted that since selection of stars south or north of the craft's zenith would create greater errors in indicated longitude than indicated latitude with deviation of the gimbal systems from proper orientation with respect to true north, that selection of stars south or north of the craft's zenith in accordance with the craft's geographical location (as previously described) would *minimize* or *eliminate* tendencies toward divergent orientation of the gimbal systems from true north by computer 55 (depending upon the direction of the earth's magnetic field with respect to true north at the craft's location) regardless of whether the stars selected for navigation were east or west of the craft's zenith in accordance with the craft's geographical location as previously described. Similarly proper selection of stars east or west of the craft's zenith in accordance with the craft's geographical location would *minimize* or *eliminate* tendencies toward divergent orientation of the gimbal systems from true north by computer 55 (depending upon the direction of the earth's magnetic field with respect to true north at the craft's location) regardless of whether the stars selected for navigation were north or south of the craft's zenith in accordance with the craft's geographical location. However, regardless of the craft's geographical location, stars could always be selected in a *proper* direction which would *positively* result in convergent orientation of the gimbal systems with respect to true north by computer 55.

Computer 55 also orients the position of gimbal ring 27, which supports true north seeking gyroscope 29 in a pendulum position below gimbal ring 27, until the spin axis of gyroscope 29 is aligned perpendicular to a true vertical, similarly as computer 55 orients the first gimbal ring 2a in the star follower, the plane of gimbal ring 27 then being parallel to the plane of gimbal ring 2a, pendulum axis 479 then being aligned parallel to the third axis about which the second gimbal ring 2b rotates, and the spin axis of gyroscope 29 being parallel to pendulum axis 479. Computer 55 properly positions a microsyn signal transmitter in positioning device 19 with respect to a true vertical, the microsyn signal transmitter being responsive to the position of gimbal ring 27 to create signals torquing the vertical supporting axis 18 of the star follower until gyroscope 29 precesses to a position where the pendulum axis 479 and spin axis of gyroscope 29 are perpendicular to a true vertical as determined by computer 55. Thus rotation of the gimbal systems from proper orientation with respect to true north causes deviation of gimbal ring 2b from a true vertical in a north-south plane as previously described and similarly causes deviation of gimbal ring 27 and pendulum axis 479 from a position perpendicular to a true vertical, rotation of the gimbal systems clockwise from true north causing clockwise rotation of gimbal ring 2b and gimbal ring 27 from a true vertical when a star is selected for navigation east of the craft's zenith, and rotation of the gimbal systems counter-clockwise from true north under the stated conditions causing counter-clockwise rotation of gimbal ring 2b and gimbal ring 27 from a true vertical. Selection of a star for navigation west of the craft's zenith would reverse the stated direction of deviation of gimbal rings 2b and 27 from a true vertical upon rotation of the gimbal systems from true north. The resulting torque of the earth's gravity upon pendulum suspended gyroscope 29 when the gimbal systems deviate from proper orientation with respect to true north would cause precession of gyroscope 29 to adjust frame 1 until the gimbal systems were again properly oriented with respect to true north. The direction of spin of gyroscope 29 could be made to accommodate selection of a star for navigation either east or west of the craft's zenith, however, computer 55 would also override the torque of the earth's gravity upon gyroscope 29 by torquing gimbal ring 27 through torquer 30 such that the gimbal systems would always be properly oriented with respect to true north by computer 55 regardless of whether stars were selected for navigation east or west of the craft's zenith in accordance with the direction of spin of gyroscope 29.

Obviously any conventional true north seeking gyroscope could simply be attached to gimbal ring 27 with its spin axis in the position of axis 479, signals from its pendulum operating a torquer to properly torque gimbal ring 27 upon deviation of the gimbal systems from true north, similarly as computer 55 operates torquer 30, computer 55 normally overriding the true north seeking gyroscope except in the event of malfunctioning of computer 55.

It may be noted that since deviation of magnetic north from true north decreases with increased distance from the magnetic poles of the earth, the variations in deviation of magnetic north from true north in the equatorial regions of the earth and in the Northern Hemisphere opposite from the North Magnetic Pole and in the Southern Hemisphere opposite from the South Magnetic Pole would be of small magnitude with changes in longitude and latitude, therefore in the stated regions of the earth computer 55 would most likely properly orient the gimbal systems with respect to true north and a true vertical regardless of whether stars were selected for navigation east, west, north, or south of the craft's zenith in accordance with the geographical location of the craft as previously described. However, destination selection means are provided in the present invention to automatically transfer navigation to different stars at pre-set geographical locations such that stars could always be automatically selected for navigation in a proper direction in accordance with the craft's geographical location to properly orient the gimbal systems with respect to true north and a true vertical.

Thus it is seen that it is the angular position of star follower 5 in relation to the angular position of magnetic inclination seeking element 41 (when properly differentiated with time) which actually determines the craft's longitude and latitude and the direction of true north and a true vertical, the described gimbal systems and computer 55 with associated components serving as computing means to determine the correct values, computer 55 properly orienting a vertical reference platform in the gimbal systems from the direction of the earth's magnetic field and determined geographical position, and the angle of star follower 5 with respect to the established vertical reference platform determining longitude and latitude when properly differentiated with time as previously described. Timing means to which the above described computing means is responsive in determining longitude and latitude will be described in detail later.

It is believed that the reaction time of modern star trackers and computers with memory elements would be sufficiently rapid to prevent errors in proper orientation of the gimbal systems with respect to true north and a true vertical, and that any momentary error which occurred in indicated position of the craft due to momentary errors in orientation of the gimbal systems would promptly be corrected before the guidance system reacted to adjust the craft to a spurious position, as will become apparent as the description proceeds. Also gyro stabilization of the magnetic inclination seeking element in a properly oriented position with respect to true north and a true vertical as previously described would provide an instantaneous course and attitude reference from which any craft or vehicle utilizing the navigation device could be stabilized to prevent errors in orientation of the gimbal systems due to inadvertent rolling, pitching, or yawing of the guided craft.

Since the magnetic inclination seeing element serves as a gyro-stabilized true north and true vertical reference from which to provide instantaneous course and attitude corrections preventing inadvertent rolling, pitching, or yawing of the guided craft, the craft itself would serve somewhat as a gyro stabilized platform to prevent errors in orientation of the gimbal systems of the star follower, and true north seeking gyroscope 29 further gyro stabilizes the gimbal systems of the star follower with respect to true north. It is obvious that the second gimbal ring 2b in the star follower could further be gyro stabilized with respect to a true vertical if desired by a gyroscope attached to gimbal ring 2b in a suspended position below gimbal ring 2b similarly as gyroscope 42 stabilizes the second gimbal ring 34b of the magnetic inclination seeking element and as was originally illustrated in the star follower of FIGURE 1 in patent application Serial No. 545,415, filed on November 7, 1955, now abandoned, of which the present invention is a continuation, signals from computer 55 or course providing precession of such a gyroscope through proper torquing of gimbal rings 2a and 2b of the star follower in FIGURE 6 to maintain gimbal ring 2b properly oriented with respect to a true vertical as previously described.

In FIGURES 1 and 2 semi-circular supporting frame 1 is mounted in an upright position in the craft by vertical shaft 18 in bearing 17 such that frame 1 may rotate in azimuth with respect to the craft. Bearing 17 is attached to circular mounting plate 478 permitting the navigation device to be lowered into an opening of the craft's structure 48 and fastened in place such that telescope 5 may track a celestial object. Gimbal rings 2a and 2b are bearing mounted in rotating frame 1 such that gimbal ring 2b may achieve a horizontal position with respect to the earth's surface. Devices 3a, 3b, 4a, and 4b are conventional torquers and microsyn signal generators permitting precision positioning of gimbal rings 2a and 2b from a remote source. Integral planetary gearing may be employed in the torquers and signal generators to increase the positioning accuracy, the torquers and signal generators then rotating a greater number of revolutions than the positioned gimbal rings. Gimbal ring 6 is bearing mounted in gimbal ring 2b, torquer 9a and signal generator 9b permitting precision positioning of gimbal ring 6 with respect to gimbal ring 2b. Gimbal ring 8 is similarly mounted to rotate with respect to ring 6, the axis of rotation of ring 8 being perpendicular to the rotating axis of ring 6. Torquer 10a and signal generator 10b permit precision positioning of ring 8 with respect to ring 6. In FIGURE 2 torquer 10a rotates gimbal ring 8 and the housing of combined torquer and signal generator 7 with respect to gimbal ring 6, torquer 7 then further rotating signal generator 10b with respect to the housing of torquer and signal generator 7, however in FIGURE 6 combined torquer and signal generator 7 is eliminated. Telescope 5 is bearing mounted in gimbal ring 8, torquer 11a and signal generator 11b permitting precision positioning of telescope 5 with respect to gimbal ring 8, the axis of rotation of telescope 5 being perpendicular to the axis of rotation of gimbal ring 8. Semi-circular yoke 26 is attached to shaft 18 and true-north seeking gyroscope 29 attached to yoke 26 through gimbals 27. Device 19 on yoke 26 orients the spin axis of pendulum suspended gyroscope 29 tangent to the craft's meridian in a manner to be described later such that gyroscope 29 acts as a true-north seeking gyroscope.

A true-north seeking gyroscope manufactured by Arma Corporation provides a gyroscope mounted on a two-axis stabilized platform with means to maintain the platform and spin axis of the gyroscope tangent to the craft's meridian in accordance with the latitude of the craft. A pendulum suspended below the platform deviates from a perpendicular position with respect to the platform and gyro spin axis due to the earth's rotation whenever the gyro spin axis is not aligned with true-north, and the deviation of the pendulum from such a perpendicular position creates signals torquing the gyroscope until the gyro spin axis is again aligned with true-north. The pendulum suspension of gyroscope 29 in FIGURE 6 similarly provides a torque on gyroscope 29 whenever the spin axis of gyroscope 29 is not aligned with true north, causing gyroscope 29 to precess until the gyro spin axis is aligned with true north. Obviously, gyroscope 29 could be replaced with any conventional true-north seeking gyroscope being manufactured if desired.

Thus true-north seeking gyroscope 29 may orient frame 1 with respect to true-north such that the axis of rotation of gimbal ring 8 is parallel to the earth's axis of rotation when the angle of telescope 5 with respect to gimbal rings 8 is adjusted to the declination of a star and the longitudinal or optical axis of telescope 5 is aligned with the selected star. The angle of gimbal ring 6 with respect to gimbal ring 2b then indicates the craft's latitude and the angle of gimbal ring 8 with respect to gimbal ring 6 indicates the craft's longitude when properly differentiated with time, as previously described. Positioning device 7 in FIGURE 2 provides for correction in longitude due to refraction of light by the earth's atmosphere directly in the star tracking device, the corrections in longitude being transmitted to positioning device 7 by a refraction computer to be described later.

The axis of rotation of gimbal ring 6 might be raised slightly above the axis of rotation of gimbal ring 2b and the axis of rotation of gimbal ring 8 raised slightly above the axis of rotation of gimbal ring 6 as illustrated in FIGURES 1 and 2 to provide an unobstructed line of sight for tracking telescope 5 through 180° of rotation in any direction. Counter weights might then also be attached to the affected axes to eliminate any unbalanced torques. However, the arrangement illustrated in FIGURE 1 would introduce some error due to refraction of light rays caused by the difference in density of external and internal air of the astrodome since there would be translation of the adjusting axes of telescope 5 from the center of curvature of the astrodome. In FIGURE 6 all adjusting axes of the tracking device intersect at a point on vertical supporting shaft 18 thus eliminating any translation of the adjusting axes of telescope 5 from the center of curvature of the astrodome.

The magnetic inclination seeking element and vertical reference mechanism is mounted to a manner somewhat similar to the navigation device as illustrated in FIGURES 3 and 4. Semi-circular supporting frame 33 is mounted in an upright position in the craft by a vertical shaft in bearing 44 such that frame 33 may rotate in azimuth with respect to the craft. Bearing 44 is attached to circular mounting plate 47 permitting the vertical reference device to be lowered into an opening in the craft's structure and fastened in place. It would be desirable that the structure of the craft supporting rotating frames 1 and 33 be as rigid as possible to maintain the supporting shaft of frame 33 preferably parallel to the supporting shaft of frame 1. Bearings 17 and 44 might also be attached to a common mounting plate maintaining the supporting shaft of frame 33 parallel to the supporting shaft of frame 1 and permitting precision alignment of the vertical reference device with the navigation device before installation in the craft. Gimbal rings 34a and 34b are bearing mounted in rotating fram 33 such that gimbal ring 34b may achieve a horizontal position with respect to the earth's surface. Vertical seeking device 42 is attached to a semi-circular yoke attached to gimbal ring 34b and operates conventional torquing devices 35a and 36a in a conventional manner to align gimbal ring 34b horizontal to the earth's surface. Vertical seeking device 42 may consist of two levels of the type disclosed in FIGURE 1 of Patent No. 2,367,465 granted to H. Kunzer on January 16, 1945, one level having its length perpendicular to the axis of rotation of gimbal ring 34a and the other level having its length perpendicular to the axis of rotation of gimbal ring 34b. Vertical seeking device 42 may also consist of a conventional vertical seeking gyroscope or any other conventional vertical seeking means. Devices 35b and 36b are conventional microsyn transmitters or precision position transducers capable of accurately transmitting the position of gimbal ring 34a and 34b to other devices. Gimbal ring 39 is bearing mounted in gimbal ring 34b, and magnetic inclination seeking device 41 is bearing mounted in gimbal ring 39 by shaft 40, shaft 40 being perpendicular to the axis of rotation of gimbal ring 39. Torquers 37a and 38a permit precision positioning of magnetic inclination seeking device 41 with respect to gimbal ring 39 and precision positioning of gimbal ring 39 with respect to gimbal ring 34b, precision position transducers 37b and 38b transmitting the position of gimbal ring 39 and magnetic inclination seeking device 41 to other devices.

The principle of the navigation system is further illustrated in FIGURE 6 where $\lambda_c$ represents the longitude of the craft, $\phi_c$ represents the latitude of the craft, $\alpha$ represents sidereal hour angle of the angle of gimbal ring 8 with respect to gimbal ring 6, $\beta$ represents the declination of the selected star, $\alpha_D$ represents the difference between the sidereal hour angle of the sun and a selected star, $\Delta\lambda_c$ represents the correction in longitude to compensate for refraction of light in the earth's atmosphere, $\Delta\beta$ represents the correction in declination to compensate for refraction of light in the earth's atmosphere, $\Omega$ represents the time in accordance with the longitude at the point of departure, D.R.C. represents dead-reckoning computer, A represents the azimuth supplied to the dead-reckoning computer, V represents the velocity supplied to the dead-reckoning computer, $A_c$ represents the azimuth of the craft's longitudinal axis, and T.A.S. represents the true air speed of the craft.

Device 54 may be a gyrosyn compass or any other conventional magnetic north seeking device capable of accurately determining and transmitting the direction of magnetic north to computer 55. The longitude and latitude of the craft as determined by the navigation device is also supplied to computer 55. Computer 55 determines the deviation of magnetic north from true north at the craft's position and operates torquer 30 coupled to gimbal ring 27 causing ture-north seeking gyroscope 29 to precess until frame 1 of the navigation device is properly oriented with respect to true north, gear 13 attached to shaft 18 operating precision position transducer 14 attached to mounting plate 478 to provide computer 55 with the position of frame 1 relative to the craft. Gyroscope 29 is pendulum suspended below gimbal ring 27 on axis 479 by bearings 28, axis 479 being at right angles to the axis of rotation of gimbal ring 27 and the spin axis of gyroscope 29 being parallel to axis 479. Since axis 479 and the axis of rotation of gimbal ring 2b are both horizontal to the earth's surface, yoke 26 is parallel to frame 1, axis 479 is parallel to the axis of rotation of gimbal ring 2b, and axis 479 and the axis of rotation of gimbal ring 2b are both aligned with true north.

Computer 55 may be similar to the Librascope AN—ASN–24 airborne digital computer which employs a magnetic drum as computer memory to store such data as magnetic variation as a function of heading, declination, and sidereal hour angle of stars to determine the true heading of the craft. The described computer or a computer with any other type of conventional memory unit might also be used to store the deviation of magnetic north from true north as a function of geographical position in longitude and latitude and thus properly orient frame 1 with respect to true north. Computer 55 also operates torquer 46a attached to mounting plate 47 to orient the magnetic inclination seeking element with respect to true north through gear 43 attached to the supporting shaft of frame 33 such that frame 33 is parallel to frame 1, precision position transducer 46b attached to mounting plate 47 being operated by gear 43 to provide computer 55 with the position of frame 33. It would be preferable that magnetic north seeking compass device 54 be attached to a mounting plate common to both the navigation device and the vertical reference device to eliminate errors due to deflection of the craft's structure.

Magnetic inclination seeking device 41 consists essentially of a gyroscope whose spin axis is aligned with the inclination of the earth's magnetic lines of force, any appropriate magnetic measuring means being utilized to determine the inclination of the earth's magnetic lines of force in a north-south and east-west direction to properly orient the gyro spin axis with the inclination of the earth's magnetic field, means being provided to measure and transmit the resulting angle of the gyro spin axis with respect to a true vertical in a north-south and east-west direction.

Magnetic inclination seeking device 41 contains a conventional gyroscope supported by shaft 40 in gimbal ring 39, the gyro spin axis being perpendicular to shaft 40. Magnetic inclinometer 47 is attached atop device 41 with its axis of rotation perpendicular to shaft 40 and magnetic inclinometer 48 is attached atop device 41 with its axis of rotation parallel to shaft 40 as illustrated such that inclinometer 47 determines the inclination of the earth's magnetic field in a north-south direction and inclinometer 48 determines the inclination of the earth's magnetic field in an east-west direction. The plane of the supporting frames of inclinometers 47 and 48 is perpendicular to the spin axis of gyroscope 41. Light source 49 consists of a conventional parabolic reflector or lens system attached atop device 41 to project parallel rays of light to precision optical transducer 50 such that inclinometer 47 intercepts the light rays to the center of transducer 50 when the inclinometer needle is parallel to the spin axis of gyroscope 41, the light rays being parallel to the axis of rotation of the inclinometer needle. Light source 51 projects parallel rays of light to precision optical transducer 52 in a similar manner such that inclinometer 48 intercepts the light rays to the center of transducer 52 when the inclinometer needle is parallel to the spin axis of gyroscope 41. Optical transducers 50 and 52 might consist of a simple semi-conductor cell developed by Electro-Optical System, Inc., 170 North Daisy Ave., Pasadena, California, called a radiation tracking transducer which is a photo-voltaic unit that can resolve the angular position of a source of visible or infrared radiation to better than 0.1 second of arc when used with a simple lens system producing an image of the radiation source on the photo-voltaic unit. The output of the optical transducer is a D.C. voltage whose polarity indicates whether the radiation source is to the right or left of the cell's centerline and whose magnitude is proportional to radiation source displacement from centerline. The manufacturer states that a radio-active source emitting particles in the range of 100 to 500 kev. might be attached to the lower tip of the inclinometer to serve as a radiation source replacing light sources 49 and 51. Otherwise the optical transducers would have to be responsive to the position of the shadow of the inclinometer needles falling upon their sensitive surfaces.

Optical pickoff means for the specific purpose of positioning an element in accordance with the position of a compass needle oriented by the earth's magnetic field as illustrated in FIGURE 6 of the present invention is similarly illustrated in FIGURE 15 and described on page 4, lines 9 to 29 inclusive of patent application Serial No. 382,400 on an Electronic Pilot Control, filed September 25, 1953, now abandoned, of which patent application Serial No. 545,415, now abandoned is a continuation, the present invention being a continuation-in-part of patent application Serial No. 545,415. In FIGURE 15 of patent application Serial No. 382,400 as described, a series of small photo-electric cells are located on a compass housing to coincide with the curved path of the compass needle tip, a light source also located on the compass housing to illuminate the photo-cells, the tip of the compass needle passing between the light source and the photo-cells to cast a shadow on the photo-cells. The photo-cells energize relays such that when the shadow of the compass needle tip falls on any one of the photo-cells, the relays provide signals properly orienting the compass housing to a desired position with respect to the compass needle. Since that is the express purpose of optical transducers 50 and 52 in FIGURE 6, it is obvious that either two or a series of tiny photo-cells could be located in each of optical tranducers 50 and 52 to match the path of the magnetic needle tips of inclinometers 47 and 48. Thus a series of relays with normally closed contacts would be respectively energized by the described series of photo-cells in optical transducers 50 and 52, the relays providing signals properly torquing gyroscope 41 whenever the shadow of the magnetic needle tips fell on any one of the photo-cells, causing gyroscope 41 to progressively precess to a proper position with respect to the inclinometer needles as previously described, the tiny photo-cells on one side of the center line of optical transducers 50 and 52 operating relays to produce a positive output voltage, and the tiny photo-cells on the other side of the center line of optical transducers 50 and 52 operating relays to produce a negative output voltage when the shadow of the inclinometer needle tips falls on any one of the photo-cells. The accuracy of the inclinometers would then be dependent upon the dimension of the photo-cells either side of the center line of optical transducers 50 and 52, the smaller the dimension, the greater the positioning accuracy, it being understood that the photo-cells on each side of the center line would be placed sufficiently close together to provide progressive precession of gyroscope 41 to a position where the shadow of the inclinometer needle tips would be at the center line of the optical transducers. Photo-cells of the voltaic type would probably be most practical for the described application, conventional amplification means being provided if necessary to operate the described relays.

Any optical pick-off means capable of accurately determining the position of the inclinometer needles could be used, gyroscopes 41, 42, and any other devices creating a magnetic disturbance being magnetically shielded to eliminate magnetic errors.

In FIGURE 6, the signal output of optical transducer 50 is then amplified by conventional means to operate torquer 38a causing magnetic north seeking gyroscope 41 to precess until its spin axis lies in an east-west plane inclined parallel or tangent to the earth's magnetic lines of force. The signal output of optical transducer 52 is similarly amplified to operate torquer 37a causing gyroscope 41 to precess until its spin axis lies in a north-south plane inclined parallel or tangent to the earth's magnetic lines of force. The memory element of computer 55 may then be utilized to store the known angle of magnetic north seeking device 41 with respect to gimbal ring 39 and the known angle of gimbal ring 39 with respect to gimbal ring 34b when the plane of gimbal ring 34b is perpendicular to a true vertical through the center of the earth and the axis of gimbal ring 34b is aligned with true north, the described known values being a function of the longitude and latitude of the craft and also a function of the altitude of the craft if the variations in altitude of the craft create an appreciable difference in such values. Since the memory element in computer 55 utilized for storing the deviation of magnetic north from true north as a function of longitude and latitude would be separate and distinct from the memory elements in computer 55 utilized for storing the deviation of the earth's magnetic field from a true vertical (in a north-south and east-west direction) as a function of longitude and latitude, the memory element storing the deviation of magnetic north from true north as a function of geographical location will be designated first computing means for purposes of reference, and the memory elements in computer 55 utilized for storing the deviation of the earth's magnetic field from a true vertical as a function of geographical location will be designated second computing means for purposes of reference.

The difference between the described known inclination of the earth's magnetic field with respect to a true vertical and the values supplied to computer 55 by precision position transducers 37b and 38b can then be added to or subtracted from the respective values supplied by precision position transducers 35b and 36b in a conventional manner by computer 55 such that computer 55 may properly orient the plane of gimbal ring 2b of the navigation device perpendicular to a true vertical through torquers 3a, 4a, and pick-offs 3b and 4b, gimbal ring 2a being properly oriented with respect to gimbal ring 34a and gimbal ring 2b being properly oriented with respect to gimbal ring 34b. Computer 55 might also utilize the described known inclination of the earth's magnetic field to operate the appropriate torquers to orient the plane of gimbal ring 34b in the magnetic inclination seeking element perpendicular to a true vertical rather than gimbal ring 34b being oriented by vertical seeking device 42, vertical seeking device 42 then being used as an auxiliary source of vertical reference in the event of a malfunction of computer 55, computer 55 then normally overriding vertical seeking device 42. Magnetic north seeking compass device 54 in FIGURE 6 might also utilize the described principle of optical pick-off means attached to a gimbal mounted compass housing to determine the position of a horizontal compass needle, the principle of optical pick-off means for such a compass being originally described and illustrated in FIGURE 15 of patent application Serial No. 382,400, now abandoned, filed September 25, 1953, as previously described. The signal output of such precision optical transducers could thus be amplified to operate a torquer rotating a vertical shaft supporting the gimbal mounted compass, similarly as torquer 46a rotates frame 33, to properly orient the compass housing with respect to magnetic north.

One preferred mounting of the described compass 54 with the described optical pick-off means is indicated in FIGURE 4, compass 54 being attached to device 42 with the compass housing mounted to rotate on axis Z, axis Z being perpendicular to the plane of gimbal ring 34b, and torquer 46c being provided to rotate the compass housing 54 with respect to device 42 on axis Z. Electromagnetic fields within the vicinity of compass 54 would of course be magnetically shielded to prevent errors in compass 54. The optical transducer of the magnetic compass 54 then operates torquer 46c to properly orient the compass housing with respect to magnetic north, and computer 55 operates torquer 46a to properly orient frame 33 with respect to true north as previously described, the necessary precision position transducer of course being provided in combination with torquer 46c on axis Z to provide computer 55 with the rotated position of compass housing 54 with respect to element 42 to indicate deviation of frame 33 from magnetic north. It would then be preferred that computer 55 maintain the plane of gimbal ring 34b perpendicular to a true vertical as previously described, thus obviously eliminating the need of a gimbal mounting of compass housing 54 on axis Z such that the horizontal plane of compass housing 54 would be always perpendicular to axis Z, gimbal ring 34b thus actually serving as the gimbal mounting for compass 54. Torquers 35a and 36a would have greater operating torque than torquers 37a and 38a to properly maintain the plane of gimbal ring 34b perpendicular to a true vertical, thus preventing torquers 37a and 38a from causing deviation of gimbal ring 34b from a true vertical in aligning gyroscope 41 with the magnetic lines of force of the earth, the gyroscope in vertical seeking device 42 providing gyro stabilization of gimbal ring 34b as previously described.

Since the gyroscope in magnetic inclination seeking element 41 provides azimuth stabilization of the magnetic inclination seeking device, and true north seeking gyroscope 29 provides further azimuth stabilization of the star follower, it is believed that further gyro stabilization of compass 54 on axis Z with respect to element 42 would be unnecessary, although it could be provided if desired.

In the mounting of true north seeking gyroscope 29, or any conventional true north seeking gyroscope as previously described, yoke 26 is attached to vertical supporting axis 18 in a position parallel to frame 1, the axis of rotation of gimbal ring 27 is perpendicular to axis 479, gimbal ring 27 is parallel to gimbal ring 2a, axis 479 is parallel to the axis of rotation of gimbal ring 2b, the spin axis of the true north seeking gyroscope is parallel to axis 479, and thus the spin axis of the true north seeking gyroscope is perpendicular to a true vertical when the gimbal systems of the star follower are properly oriented with respect to true north as preivously described.

Device 19 attached to yoke 26 provides for orientation of the spin axis of gyroscope 29 perpendicular to a true vertical. Computer 55 operates torquer 20 to properly orient precision position transducer 25 with respect to a true vertical, planetary reduction gear 21 providing precision orientation of shaft 22 supported by bearing 23 to adjust transducer 25, precision position transducer 24 providing computer 55 with the position of shaft 22 and transducer 25. Computer 55 then operates torquer 15 attached to mounting plate 478 to torque shaft 18 through gear 13, causing gyroscope 29 to precess until its spin axis is perpendicular to a true vertical whereupon the signal output of transducer 25 to computer 55 is zero. Thus gimbal ring 27 is maintained parallel to gimbal ring 2a to provide the proper deviation of gimbal ring 27 from a true vertical upon deviation of the gimbal systems and axis 479 from true north necessary for functioning of the true north seeking gyroscope as previously described. Torquer 30 has greater operating torque than torquer 15 to provide for precise orientation of frame 1 with respect to true north through computer 55 even though torquer 15 happened to be in operation at the time of adjustment.

Figure 29:
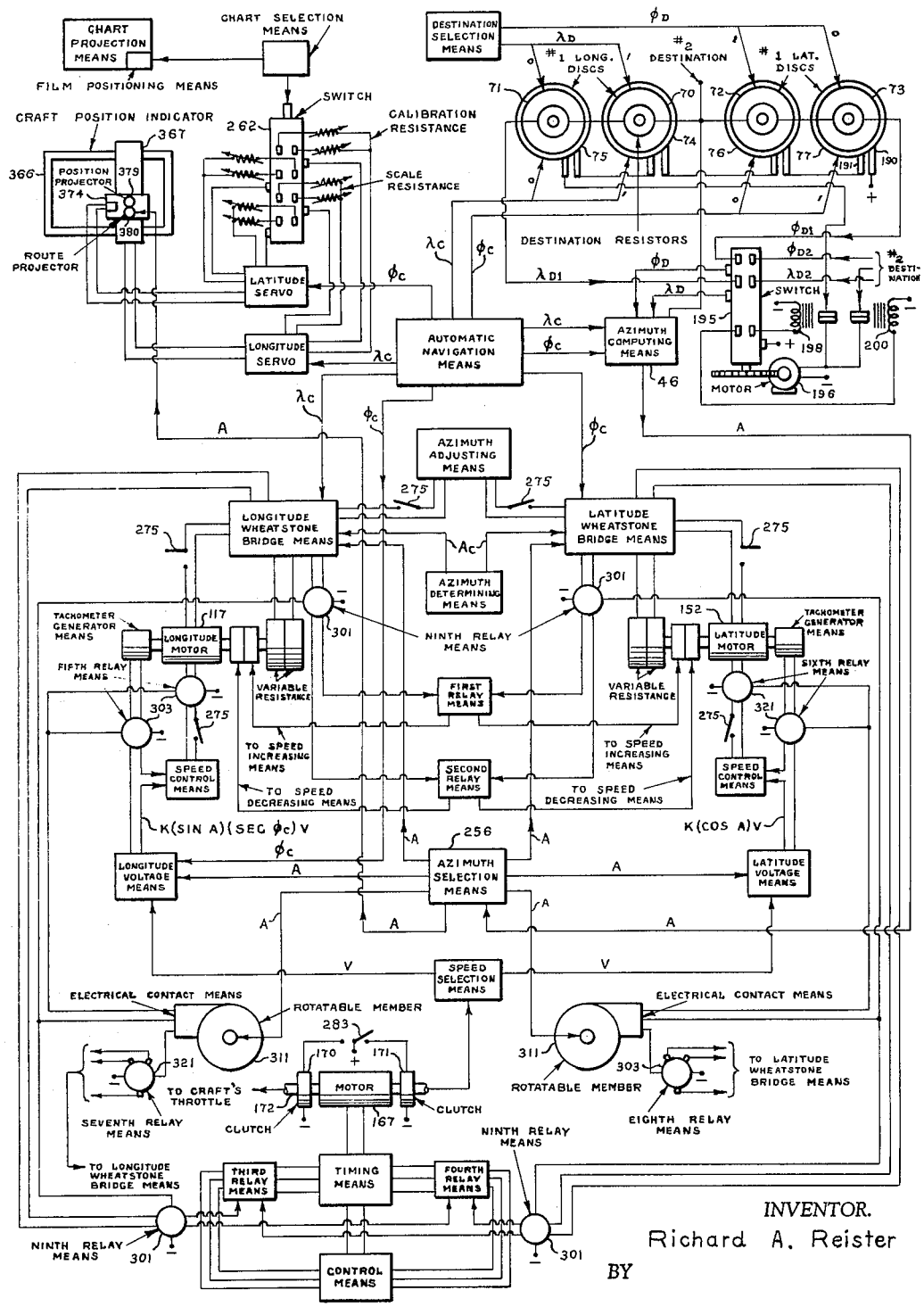
FIGURE 29 is a block diagram illustrating the fundamental principle of the guidance mechanism and the relationship of the principal guidance components.

In FIGURE 6 start tracking mechanism 56 may be any conventional device capable of orienting tracking device 5 with a selected star, motors 102 and 136 being operated by the signal output of radiation sensitive means in tracking device 5 to align the longitudinal axis of tracking device 5 with the selected stars, the signal output from radiation sensitive means in tracking device 5 enabling the tracking mechanism 56 to provide signal voltages through normally closed contacts of relay #29a to properly rotate motors 102 and 136 as indicated in FIGURE 6, motors 102 and 136 further operating syncros 103 and 137 to properly align tracking device 5 in accordance with the rotated position of motors 102 and 136. Relay #29a disconnects motors 102 and 136 from tracking mechanism 56 during automatic transfer of navigation to different stars as will be described later. Tracking device 5 might also be a conventional radio sextant tracking an artificial satellite emitting radio signals, the satellite orbiting in the plane of the earth's equator at a constant position with respect to the earth. Motor 102 operates microsyn signal transmitter 103 to rotate gimbal ring 8 with respect to gimbal ring 6 through microsyn signal generator 10b, a phase sensitive amplifier 490, and torquer 10a in a conventional manner, the phase sensitive amplifier comparing the phase of the signal outputs of microsyn signal tranmitter 103 and microyn signal generator 10b to provide signals operating torquer 10a to synchronize signal transmitter 103 and signal generator 10b, torquer 10a thus rotating gimbal ring 8 with respect to gimbal ring 6 in accordance with the rotated position of motor 102. Signal transmitter 103 and signal generator 10b may consist of the simple semiconductor optical transducer manufactured by Electro-Optical Systems, Inc. (previously described for optical pick-off of the magnetic inclinometers), such an optical transducer with linear characteristics being manufactured specifically for such purposes with a positioning accuracy of .1 second of arc. Obviously torquer 10a and signal generator 10b could be integrally combined in a single unit as is combined torquer and signal generator 7 in FIGURE 2. Suitable integral planetary gearing could also obviously be utilized such that torquer 10a, signal generator 10b, and signal transmitter 103 would rotate a greater number of revolutions than gimbal ring 8 and contact arms 57 and 58 in FIGURE 6, similarly as previously indicated for adjustment of gimbal rings 2a and 2b. (All other gimbal rings in the star tracker and magnetic inclination seeking element could of course be similarly adjusted.) The multiturn variable resistance illustrated in FIGURE 35 (or conventional multi-turn variable resistances) could also obviously be utilized as microsyn signal transmitter 103 and microsyn signal generator 10b in phase sensitive amplifier 490, phase sensitive amplifier 490 then consisting of a Wheatstone bridge positioning circuit similarly as circuit #1b of FIGURE 33, which synchronizes longitude motor 117 (of the dead-reckoning computer) with longitude motor 102 (of the navigation device) through adjustment of multi-turn variable resistances in circuit #1b by motors 102 and 117 under certain circumstances as described later. Motor 136 operates microsyn transmitter 137 to rotate gimbal ring 6 with respect to gimbal ring 2b in a similar manner through phase sensitive amplifier 491, microsyn signal generator 9b, and torquer 9a. Thus the rotated position of motors 102 and 136 are respectively an indication of the craft's longitude and latitude when the rotated position of motor 102 is properly differentiated with Greenwich Meridian Time. A preferred manner of determining indicated longitude and latitude from the rotated position of motors 102 and 136 is illustrated in FIGURE 7. Motor 102 normally rotates microsyn signal transmitter 103 and the housing of planetary gear 95 through electromagnetic clutch 105, electro-magnetic clutch 104 providing automatic gear shifting for rapid transfer of navigation to different stars. The worm gear drive on the housing of planetary gear 95 is merely illustrative, it being understood that any desired gear ratio drive of the planetary gear housing by motor 102 could be provided. Chronometer motor 108 provides differential operation of the planetary gear 95 such that the output shaft 110 of planetary gear 95 provides a true indication of longitude, output shaft 110 rotating inside supporting shaft 111 as illustrated. Supporting shaft 111 is attached to the housing of planetary gear 95 such that the variable resistors adjusted by shaft 111 through the illustrated gear drive are adjusted in accordance with the angle of gimbal ring 8 with respect to gimbal ring 6 in the start follower for use in a refraction computer and positioning circuit for automatic transfer of navigation to different stars. It is to be understood that the illustrated low gear ratio drive of the variable resistors is specifically for adjustment of a unique multiple turn linear variable resistor of extremely high accuracy provided in the present invention, and that suitable gear ratio drives of any desired operating speed could be provided for adjustment of conventional variable resistors to achieve any desired rate of adjustment of gimbal ring 8 with respect to gimbal ring 6. Variable resistors #1 and #2 adjusted by shaft 110 through electro-magnetic clutch 94 and the illustrated gear drive are utilized in a guidance circuit for automatic guidance of the craft, means being provided for automatic adjustment of variable resistors #1 and #2 to an initial starting position midway between maximum and minimum resistance, such that automatic guidance of the craft may be maintained through 180° of longitude in either an eastern or western direction. Shafts 78 and 79 are adjusted through electro-magnetic clutches 91 from the adjustment of variable resistors #1 and #2 such that the angular position of shafts 78 and 79 respectively indicate minutes and degrees of longitude. Variable resistors #94 and #95 adjusted by shafts 78 and 79 are utilized in a positioning circuit providing a visual display of the craft's position on a projected map. Discs 74 and 75 adjusted by shafts 78 and 79 are utilized to operate electrical contact means at a selected destination to activate any desired apparatus at the selected destination and particularly to energize motor 196 to adjust multi-position switch 195 as indicated in FIGURES 8 and 29 as described later, switch 195 providing automatic transfer of navigation to different stars and other functions at selected destinations as described later. During automatic transfer of navigation to different stars, electro-magnetic clutch 94 is disengaged and shafts 78 and 79 are adjusted by syncro 93 in accordance with the longitude determined by a dead-reckoning computer utilized for automatic guidance of the craft.

Motor 136 similarly normally rotates microsyn signal transmitter 137 and shaft 143 through electro-magnetic clutch 139, electro-magnetic clutch 138 providing automatic gear shifting for rapid transfer of navigation to different stars. Shafts 80 and 81 are adjusted by shaft 143 through the illustrated gear drive to respectively indicate minutes and degrees of latitude, shafts 80 and 81 adjusting variable resistors in a refraction computer, automatic guidance circuit, and positioning circuit for visual display of the craft's position on a projected map, in addition to adjustng discs 76 and 77 utilized to operate electrical contact means at a selected destination for the purpose of adjusting multi-position switch 195 in FIGURES 8 and 29 as previously mentioned and as later described in more detail. It is to be understood that the illustrated low gear ratio drive of the variable resistors is specifically for adjustment of a unique multiple turn linear variable resistor of extremely high accuracy provided in the present invention, and that suitable gear ratio drives of any desired operating speed could be provided for adjustment of conventional variable resistors to achieve any desired rate of adjustment of gimbal ring 6 with respect to gimbal ring 2b in the star follower.

Thus shaft 110 and shaft 143 in FIGURE 7 respectively provide an instantaneous indication of changes in longitude and latitude whenever the star tracking apparatus 56 in FIGURE 6 receives a signal from the star follower 5 to adjust motors 102 and 136. Corrections in longitude and latitude due to refraction of light rays in the earth's atmosphere or due to the proximity to earth of an artificial satellite utilized for navigation are accomplished directly in the star follower by adjustment in declination of the star follower 5 in gimbal ring 8 and by adjustment of syncro device 7 (in FIGURE 2) further controlling the indicated position of gimbal ring 8 with respect to gimbal ring 6 as determined by signal generator 10b, the stated adjustments being provided by a refraction computer in the present invention. Variations in refraction with small changes in longitude and latitude would be insignificant compared to the changes in longitude and latitude, therefore changes in refraction values would have an insignificant effect on the instantaneous indication of longitude and latitude by shafts 110 and 143. In reality, shafts 110 and 143 would indicate changes in longitude and latitude before the syncros adjusting gimbal ring 6 and 8 actually adjusted the star follower 5, thus allowing computer 55 time to simultaneously operate the syncros adjusting gimbal ring 2b with respect to a true vertical in accordance with the indicated longitude and latitude, such that the star follower 5 and gimbal ring 2b would be adjusted to their correct positions simultaneously to prevent spurious indications of longitude and latitude, as was described in Example III discussing operation of the navigation system.

Figure 10:
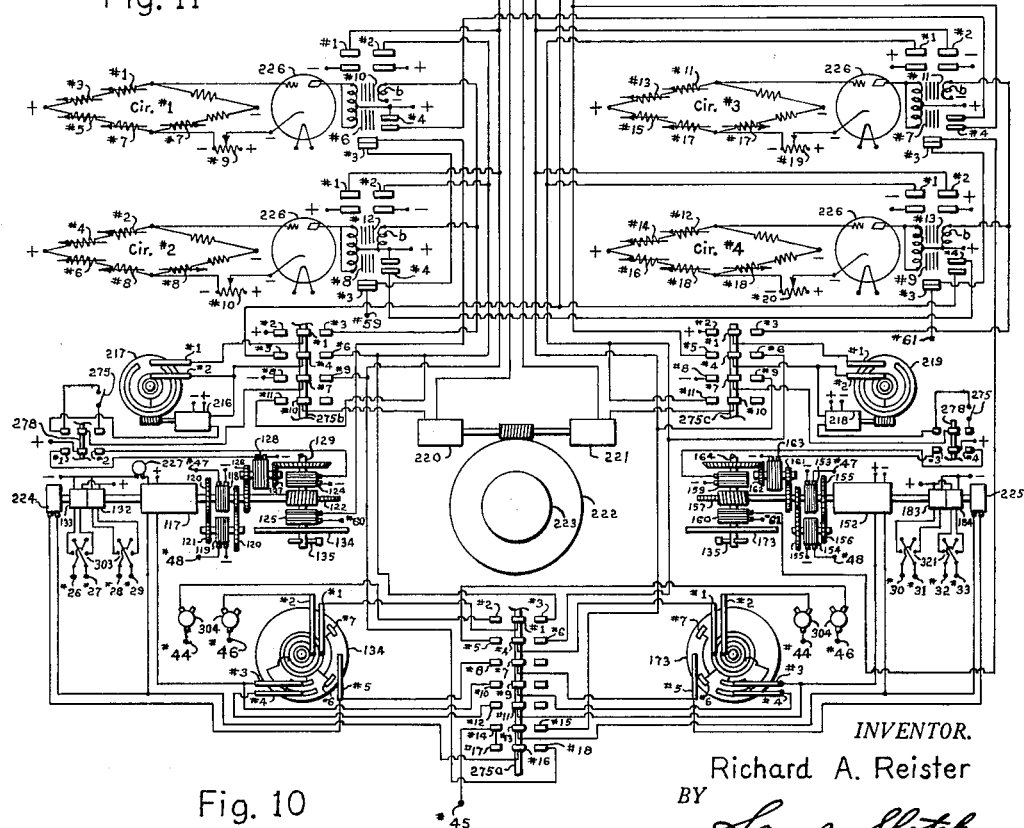
FIGURE 10 is an illustration of the guidance circuit which automatically corrects the craft's heading to eliminate drift from a selected ground route and adjusts the craft's velocity to a desired ground speed.
Figure 30:
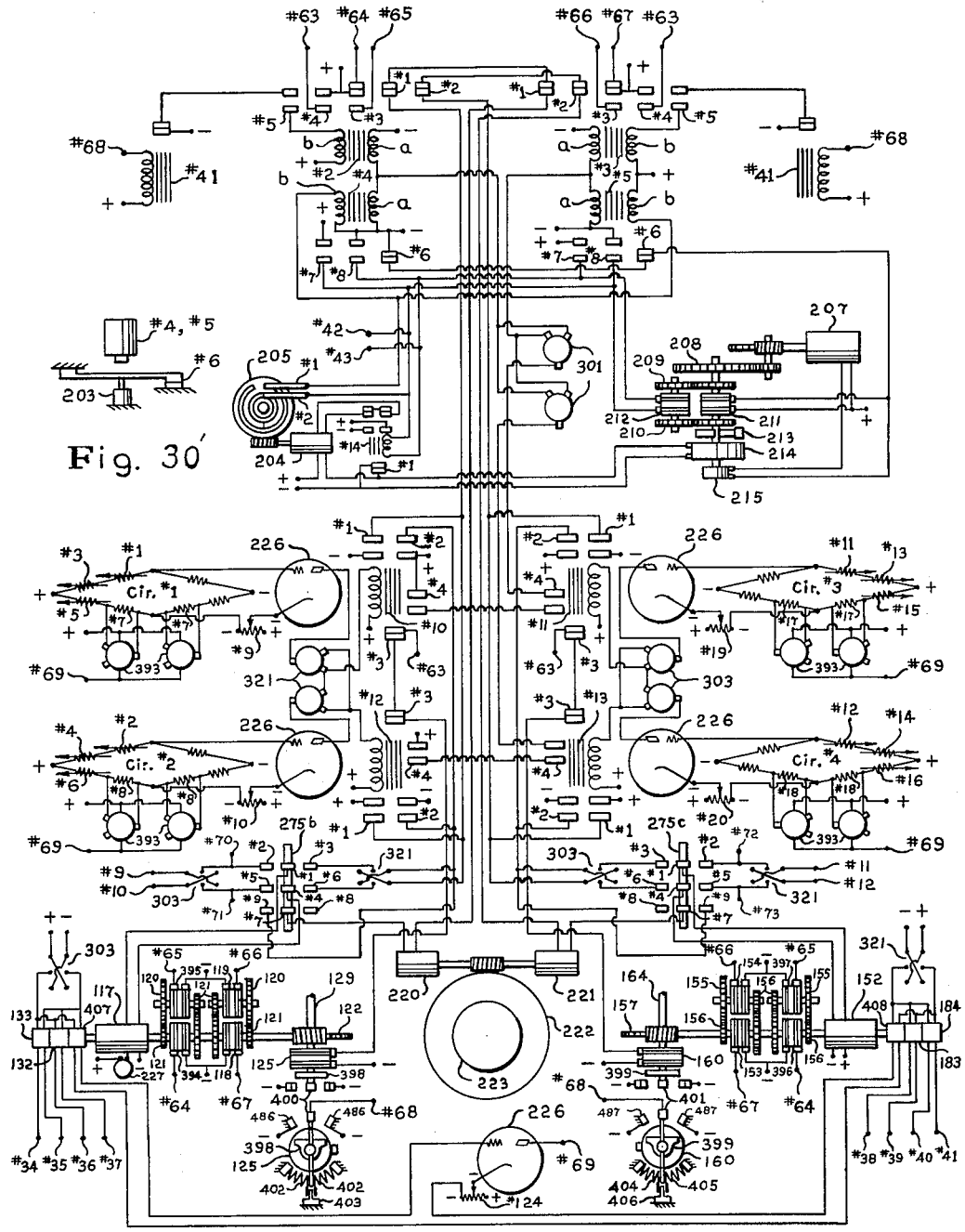
FIGURE 30 is an illustration of a modification of the guidance circuit of FIGURE 10.

The automatic guidance circuits illustrated in either FIGURE 10 or FIGURE 30 adjust the azimuth control 223 of a conventional auto-pilot to maintain the craft on a selected route, therefore the speed of adjustment of azimuth control 223 could be made appropriate such that errors in indicated longitude and latitude due to deviation of gimbal ring 2b from a true vertical could be corrected before the azimuth control 223 adjusted the craft to a spurious position. Also the gyro stabilized True North and true vertical reference provided by the magnetic inclination seeking element (or the star follower) in FIGURE 6 would provide the conventional auto pilot with an instantaneous course and vertical reference to prevent inadvertent yawing, rolling, or pitching of the craft which might cause deviation of gimbal ring 2b from a true vertical.

Motor 102 in FIGURE 6 also rotates contact arms 57 and 58, adjusts linear variable resistors #118 and #119 connected to positioning circuits #25 and #26, adjusts linear variable resistors #51 and #52 connected to positioning circuits #9 and #10, and provides refraction computer 480 with the sidereal hour angle of gimbal ring 8 with respect to gimbal ring 6. Motor 136 also provides refraction computer 480 and other components with the latitude of the craft as determined by the angle of gimbal ring 6 with respect to gimbal ring 2b. Multisection, multiposition switch 64 in FIGURE 6 provides for insertion of variable resistors into positioning circuits #9 and #10 pre-adjusted to the difference in sidereal hour angle from the Sun of various selected stars, and provides for insertion of variable resistors into positioning circuits #11 and #12 pre-adjusted to the declination of various selected stars, thus providing automatic transfer of navigation to different stars in a manner to be described.

When gimbal ring 8 approaches some pre-determined limit for practical navigation in a clockwise direction, contact arm 57 connected to a voltage source engages a contact to energize electro-magnetic clutch 63 and contact arm 58 engages contact 59 to energize solenoid 61, causing rotation of a shaft supported by bearing 65 to adjust multi-section, multi-position switch 64 to its next position in a clockwise direction. A lever is attached to the shaft supported by bearing 65, two curved arms concentric to the shaft attached to the extremity of the lever, one curved arm passing through the center of solenoid coil 61 and the other curved arm passing through the center of solenoid coil 62 such that energization of solenoid 61 or 62 causes rotation of the shaft but in opposite directions. A lever attached to the adjusting shaft opposite the torque arms to engage springs provides for return of the adjusting shaft to a neutral position when solenoids 61 and 62 are de-energized similarly as contact 400 is returned to a neutral position by springs 402 in FIGURE 30. When gimbal ring 8 approaches some pre-determined limit for practical navigation in a counter-clockwise direction, contact arm 57 engages a contact to energize electromagnetic clutch 63 and contact arm 58 engages contact 60 to energize solenoid 62, causing rotation of switch 64 to its next position in a counter-clockwise direction. Thus repeated energization of solenoids 61 or 62 advances switch 64 to a series of incremental positions in either a clockwise or counter-clockwise direction. Rotor sections of switch 64 are connected to positioning circuits #9, #10, #11, and #12 such that incremental positions of switch 64 connect a series of $\alpha_D$ variable resistors into circuits #9 and #10 and connect a series of $\beta$ variable resistors into circuits #11 and #12, the $\alpha_D$ resistors being pre-adjusted to the difference between the sidereal hour angle of the sun and various selected stars and the $\beta$ resistors being pre-adjusted to the declination of various stars.

The position of gimbal ring 8 with respect to gimbal ring 6 then adjusts variable resistors #118 and #119, causing positioning circuits #25 and #26 to correspondingly rotate motor 65 in a clockwise or counter-clockwise direction until variable resistors #120 and #121 properly balance circuits #25 and #26. Shaft 69 is initially adjusted to the local meridian hour angle with respect to the sun for the craft's known longitude at the point of departure to adjust linear variable resistors #122 and #123 connected to positioning circuits #25 and #26, navigation switch 277 then being turned on which connects a voltage source to electro-magnetic clutch 112 and chronometer motor 108 to maintain adjustment of resistors #122 and #123 in accordance with time through the gear drive as illustrated. Variable resistors #122 and #123 may be initially adjusted to minimum resistance at the start of the operation by appropriate adjustment of the resistor housing to provide maximum time of operation before positioning circuits #25 and #26 reach their limit of operation. Shaft 68 is initially adjusted to the craft's known longitude, and navigation switch 277 when turned on connects a voltage source to energize electro-magnetic clutch 66 such that shaft 68 is then differentially adjusted by the position of gimbal ring 8 with respect to gimbal ring 6 and the local time at the point of departure to properly indicate the craft's longitude. Shaft 485 is initially adjusted to the craft's known latitude, motor 65 and motor 136 then respectively providing the craft's longitude and latitude to automatic guidance means 481 as illustrated. Dead-reckoning computer 482 operates longitude motor 117 and latitude motor 152 in accordance with a selected azimuth and velocity to also provide automatic guidance means 481 with the craft's desired longitude and latitude at any instant, whereupon automatic guidance means 481 operates azimuth control means on the craft to maintain the craft's actual longitude and latitude in agreement with the craft's desired longitude and latitude. Longitude motor 117 and latitude motor 152 are initially adjusted to the craft's known longitude and latitude in a manner to be described later. Shaft 69 initially adjusts the housing of linear variable resistors #45 and #46 to the local meridian hour angle with respect to the sun for the craft's known longitude after which chronometer motor 108 through electro-magnetic clutch 112 maintains adjustment of the resistor housing in accordance with the local time at the point of departure as previously described, while longitude motor 117 adjusts the rotor of resistors #45 and #46 to differentially adjust resistors #45 and #46 in accordance with the craft's longitude and the local time at the point of departure, resistors #45 and #46 being connected to positioning circuits #9 and #10. The rotor of resistors #45 and #46 may be initially adjusted to a pre-determined position in a manner to be described such that variable resistors #45 and #46 in positioning circuits #9 and #10 serve to properly position star follower 5 in accordance with time and the craft's longitude as determined by the dead-reckoning computer 482 during transfer of navigation to a different star.

Positioning circuits #11 and #12 operate motor 230 to adjust microsyn signal transmitter 231 and linear variable resistors #60 and #61, resistors #60 and #61 balancing positioning circuits #11 and #12 when microsyn signal transmitter 231 adjusts tracking device 5 with respect to gimbal ring 8 in accordance with the selected declination connected into circuits #11 and #12 by switch 64. Refraction computer 480 is provided with the angle of gimbal ring 8 with respect to gimbal ring 6 by motor 102, the angle of gimbal ring 6 with respect to gimbal ring 2b by motor 136, and the angle of tracking device 5 with respect to gimbal ring 8 by motor 230. Computer 480 then provides positioning circuits #25 and #26 with the correction in longitude and provides positioning circuits #11 and #12 with the correction in declination to properly compensate for refraction of light in the earth's atmosphere in a manner to be described later.

Switch 64 is initially adjusted either manually or by automatic positioning means to a position connecting $\alpha_D$ variable resistors into circuits #9 and #10 adjusted to 0 difference in sidereal hour angle from the sun and connecting $\beta$ variable resistors into circuits #11 and #12 adjusted to the declination of the sun. Switch 274 in FIGURE 6 when turned on connects a voltage source to energize relay 202, closing normally open contacts #1 and #2 of relay 202. The closing of contact #1 of relay 202 connects a voltage source through navigation switch 277 as illustrated to activate positioning circuits #9 and #10, and the closing of contact #2 of relay 202 closes a circuit to relay #29a and relay #29b allowing relays #29a and #29b to be operated when either relay #38, #19, #20, #21, or #22 is energized, normally open contact #1 of relay #38 and normally open contacts #3 of relays #19, #20, #21, or #22 closing upon energization of the respective relays to connect a voltage source (through contact #2 of relay 202) energizing relays #29a and #29b. Energization of relay #29a closes normally open contact #5 of relay #29a to connect a voltage source energizing a secondary winding on relay 202 locking relay 202 in operation such that switch 274 may be temporarily closed and then opened and relay 202 will remain in operation. Energization of relay #29a further causes normally closed contacts #1, #2, #3, and #4 of relay #29a to open thus disconnecting motors 102 and 136 from the star tracking mechanism. Activation of positioning circuits #9 and #10 closes normally open contacts #1 and #2 of relay #19 or #20 connecting a direct current voltage source to respectively rotate motor 102 in a clockwise or counter-clockwise direction to properly align the longitudinal axis of tracking device 5 with the sun. Before placing the navigation system in operation, the components orienting frame 1 and the vertical reference system with respect to the earth's magnetic lines of force would be turned on first. Navigation switch 277 when turned on provides a voltage source to the appropriate components such as the star tracking mechanism, positioning circuits, etc., to properly maintain navigation, therefore to place the navigation system in operation, shaft 69 would be adjusted to some time in advance, switch 274 would be turned on as the pre-set time approached, switch 277 would be turned on at the pre-set time, after which switch 274 would be turned off.

Positioning circuits #9, #10, #11, and #12 upon operating motors 102 and 230 to properly adjust gimbal ring 8 and tracking device 5 respectively to the sidereal hour angle and declination of the sun (gimbal ring 6 having been previously adjusted to the latitude of the craft by motor 136) would become balanced whereupon relays #19, #20, #21, and #22 would all become de-energized to de-energize relays #29a and #29b, thus unlocking relay 202 and permitting the star tracking mechanism to track the selected star. The opening of contact #2 of relay 202 upon de-energization of relay 202 prevents further operation of relays #29a and #29b when positioning circuits #11 and #12 are making correction in declination to compensate for refraction of light in the earth's atmosphere except when transfer of navigation to a different star is being accomplished. When the practical limit of navigation by a selected star is reached, contact arms 57 and 58 would engage contacts as illustrated to energize relay 202 and adjust switch 64 as previously described thus causing automatic transfer of navigation to a different star. During transfer of navigation to a different star while the craft is in flight, energization of relay #29b causes normally closed contact #1 of relay #29b to open thus de-energizing electro-magnetic clutch 66, and causes normally open contacts #2 and #3 of relay #29b to close thus coupling shaft 483 of longitude motor 117 to longitude shaft 68 and coupling shaft 484 of latitude motor 152 to latitude shaft 485 to maintain navigation by means of dead-reckoning computer 482 while transfer of navigation to a different star is being accomplished. Device 116 on shaft 483 might be a fine positioning microsyn signal transmitter and device 67 on shaft 68 a fine positioning microsyn signal generator and torquer, a conventional phase sensitive amplifier operating the torquer in a conventional manner such that shaft 68 is coupled to rotate with shaft 483 at the instant of energization of relay #29b, conventional course positioning means being eliminated from position transducers 116 and 67. Thus transducer 67 responds to a signal from transducer 116 to couple shaft 68 to shaft 483 upon energization of relay #29b, similarly as microsyn signal generator 10b and torquer 10a on gimbal ring 6 in the star follower respond to microsyn signal transmitter 103 to couple gimbal ring 8 to motor 102. Devices 182 and 151 might be similar fine positioning transducers such that shaft 485 is coupled to rotate with shaft 484 upon energization of relay #29b. Contacts #2 and #3 of relay #29b could also energize conventional electromagnetic clutches to couple shaft 483 with shaft 68 and couple shaft 484 with shaft 485 upon energization of relay #29b, such that dead-reckoning computer 482 would maintain navigation during transfer of navigation to a different star. The differential adjustment of resistors #45 and #46 by longitude motor 117 and chronometer motor 108 would properly orient gimbal ring 8 with respect to gimbal ring 6 and the coupling of shaft 484 with shaft 485 would properly oriented gimbal ring 6 with respect to gimbal ring 2b in accordance with the position of the craft during automatic transfer of navigation to a different star. Any errors in navigation by dead-reckoning computer 482 during transfer of navigation to a different star would be automatically corrected upon de-energization of relays #29a and #29b when tracking device 5 then became precisely oriented with the selected star by tracking mechanism 56.

Figure 12:
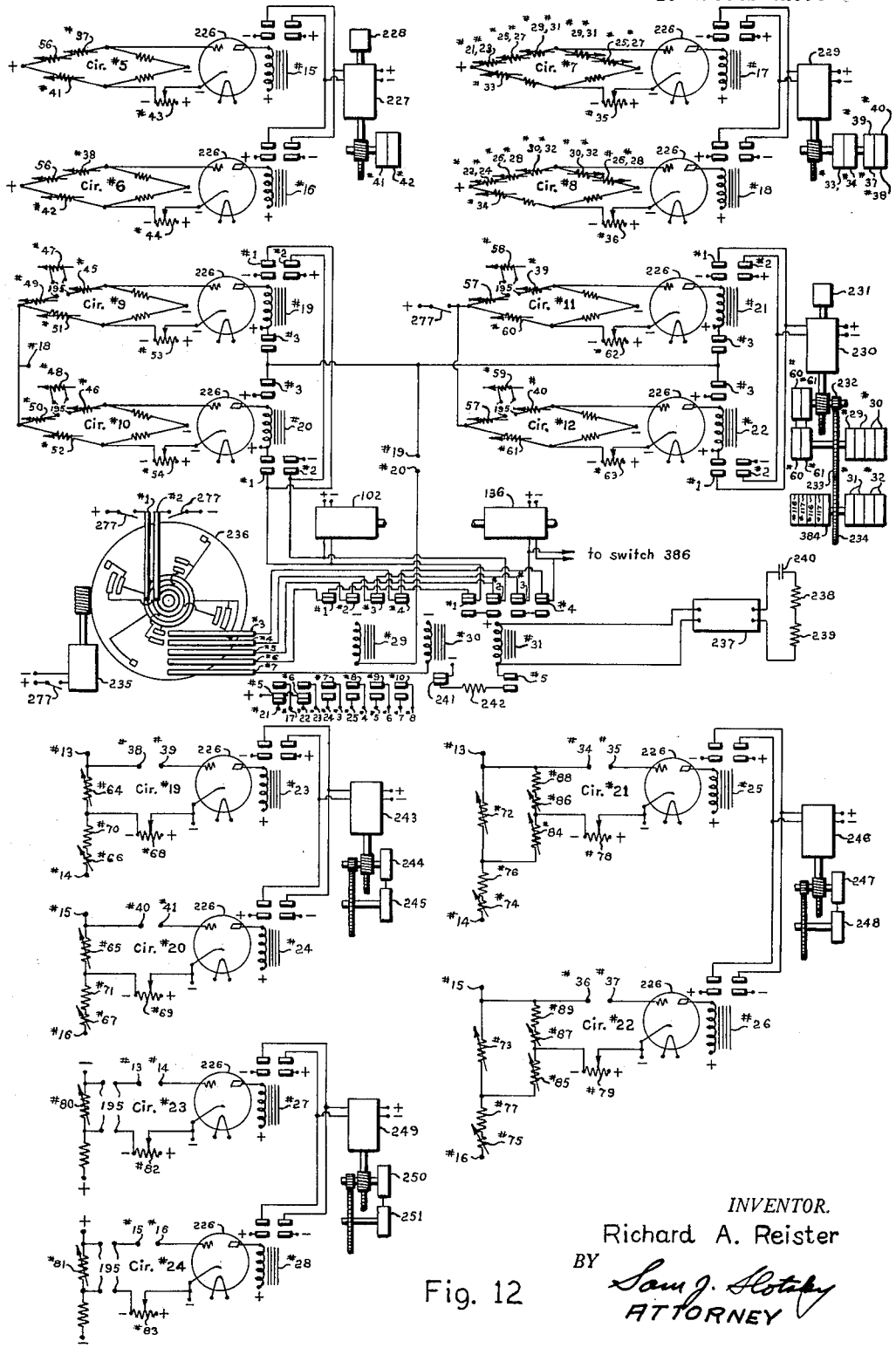
FIGURE 12 is an illustration including circuits for correction of refraction of light by the earth's atmosphere, circuit for star tracking mechanism, circuit for automatic transfer of navigation to different stars, and electronic speed control circuits of longitude and latitude motors in dead-reckoning computer.

Relay #29 in FIGURE 12 is energized and performs the same functions similarly as relays #29a and #29b in FIGURE 6 during automatic transfer of navigation to a different star. Movable double-pole double-throw contacts #5 and #6 of relay #29 are in addition connected to a voltage source to de-energize electro-magnetic clutches 105 and 94 and energize electro-magnetic clutch 104 in FIGURE 7 upon energization of relay #29 such that the illustrated automatic gear shifting provided by gears 107 and 106 in FIGURE 7 automatically increases the speed of rotation of microsyn signal transmitter 103 by motor 102 to increase the rate of adjustment of gimbal ring 8 with respect to gimbal ring 6 during automatic transfer of navigation to a different star, gear 106 being coupled to gear 107 upon energization of electro-magnetic clutch 104. (Terminals #21 and #22 of normally closed contacts #5 and #6 of relay #29 are respectively connected to electro-magnetic clutches 105 and 94 and terminal #23 of normally open contact #6 of relay #29 is connected to electro-magnetic clutch 104 as indicated in FIGURE 7. Terminal #17 of normally open contact #5 of relay #29 is connected to the secondary winding of relay 202 in FIGURE 9 as indicated, similarly as normally open contact #5 or relay #29a is connected to the secondary winding of relay 202 in FIGURE 6). Obviously the illustrated automatic gear shifting means could also be utilized to similarly increase the rate of adjustment of star follower 5 in gimbal ring 8 in accordance with a change in declination as controlled by positioning circuits #11 and #12 in FIGURES 6 and 12 during automatic transfer of navigation to a different star. Normally open single-pole single-throw contacts #7, #8, #9, and #10 of relay #29 electrically connect all necessary operating components of synchro 93 with synchro 116 and electrically connect all necessary operating components of synchro 151 with synchro 182 in FIGURE 7 upon energization of relay #29 such that longitude motor 117 and latitude motor 152 in the dead-reckoning computer maintain navigation during automatic transfer of navigation to a different star (electro-magnetic clutch 94 being de-energized to uncouple shaft 110 of planetary gear 95 upon energization of relay #29 as previously stated) similarly as previously illustrated and described in FIGURE 6, synchros 93, 116, 151, and 182 in FIGURE 7 being similar to and operated in the same manner as synchros 67, 116, 151, and 182 in FIGURE 6. An electro-magnetic clutch could be utilized to replace synchros 93 and 116 and an electro-magnetic clutch could be utilized to replace synchros 151 and 182 in FIGURE 7 similarly as was previously described for replacement of synchros 67, 116 and synchros 151, 182 in FIGURE 6.

A true air speed measuring device is shown diagramatically in FIGURE 6 as a pilot tube arrangement 391 with the open end facing the air stream and connected to the interior of a bellows 390 within a chamber 389 connected to a constant speed, motor-driven pump 388, of the centrifugal type. Such a pump will supply to the chamber 389 a static pressure which varies inversely with altitude or air density, so that the movement of the bellows instead of being responsive to indicated air speed, as is a standard air speed indicator, is responsive to true air speed. Such an arrangement is shown in the patent to Hanson, Serial No. 2,391,896, dated January 1, 1946. Movement of said bellows 390 turns a transmitter, such as a selsyn transmitter 392, which may be connected to a selsyn signal generator to operate torquing means adjusting any desired device in a conventional manner. Transmitter 392 might also be a non-linear or linear variable resistor, depending upon the characteristics of bellows 390, to properly indicate the true air speed. Any other conventional true air speed determining means might of course be similarly utilized, the described true air speed determining means merely serving to illustrate the principle of utilization of true air speed determining means in the ascribed function. Means, such as relays with normally closed contacts when de-energized, are provided within the tracking mechanism 56 to connect a voltage source energizing relays 202 and #38 when radiant energy to tracking device 5 from the object being tracked is temporarily interrupted, such as when the craft flies through dense clouds. Thus energization of relays 202 and #38 causes navigation to be maintained and tracking device 5 to be properly oriented in accordance with the craft's position by dead-reckoning computer 482, as previously described, when radiant energy to tracking device 5 is temporarily interrupted. Switch 273 when turned on connects a voltage source to the appropriate components in automatic guidance means 481 to maintain automatic guidance, including the auto-pilot system. When switch 273 is turned off, allowing manual operation of the craft's controls, such as at take-offs or landings, the energizing coil of relay #39 is connected to contact #2 of switch 273 in series with normally open contact #2 of relay #38 connected to a voltage source. Therefore when switch 273 is off and radiant energy to tracking device 5 is temporarily interrupted, energization of relay #38 further causes energization of relay #39 to transfer adjustment of the azimuth and velocity selection means of dead-reckoning computer 482 from automatic guidance means 481 respectively to computer 55 and true air speed transmitter 392. The azimuth and velocity selection means of dead-reckoning computer 482 might be adjusted by torque means operated by the signal output of a selsyn signal generator amplified through a conventional phase sensitive amplifier, the said azimuth and velocity selsyn signal generators being respectively connected to the movable contacts of double-throw contacts of relay #39 such as contacts #1 and #2, the normally closed contacts being respectively connected to azimuth and velocity selsyn transmitters in the automatic guidance system 481, the normally open contacts being respectively connected to an azimuth selsyn transmitter in computer 55 indicating the true azimuth of the craft and selsyn transmitter 392 indicating the true air speed of the craft. It is to be understood that an appropriate number of such double-throw contacts on relay #39 would be provided, contacts #1 and #2 being illustrative of the principle involved. Contacts such as #3 and #4 of relay #39 maintain proper operation of dead-reckoning computer 482 when automatic guidance means 481 is turned off by switch 273 and radiant energy to tracking device 5 is temporarily interrupted to energize relay #39 in a manner to be described later. Thus navigation would be maintained and tracking device 5 properly oriented with respect to a selected star when radiant energy to tracking device 5 was temporarily interrupted whether or not automatic guidance means 481 were in operation. In the event artificial satellites orbiting in the plane of the Earth's Equator at a constant position with respect to the Earth were utilized for navigation as previously described, day or night all weather navigation would of course be provided without interruption of radio signals from the described satellites to the tracking element, thus eliminating the need of the true air speed determining means and its ascribed function.

Some details of the navigation and guidance system showing adjustment of variable resistors are illustrated in FIG. 7. Motor 102 rotates selsyn transmitter 103 and the housing of planetary gear 95 through a worm gear drive as illustrated, selsyn transmitter 103 being electrically connected to selsyn signal generator 10b in FIGURE 2 to operate torquer 10a through a conventional phase sensitive amplifier, torquer 10a and selsyn signal generator 10b adjusting the position of gimbal ring 8 with respect to gimbal ring 6 through precision planetary reduction gearing such that the revolutions of troquer 10a and selsyn signal generator 10b are greater than the revolutions of gimbal ring 8 to increase the accuracy of positioning, as previously described. Planetary gear 95 may be similar to planetary gear 49 illustrated in FIGURE 5 where disk 51 is attached to a driven shaft (similar to shaft 110 in FIGURE 7) bearing mounted to rotate within housing 49 on the far side, gears 52 being bearing mounted on short shafts attached to disc 51 at 120° intervals as illustrated, gears 52 meshing with a driving gear 53 and a surrounding gear 50 attached to housing 49, gear 53 being attached to a driving shaft (similar to shaft 109 in FIGURE 7) bearing mounted to rotate within housing 49 on the near side. In FIGURE 7 the planetary gear housing 95 is also mounted to rotate on shaft 111 within bearings 101 as illustrated. Chronometer motor 108 rotates shaft 109 through a worm gear or reduction gear drive of proper ratio such that when the craft is stationary and tracking device 5 is tracking a selected star, shafts 111 and 109 rotate in opposite directions in accordance with the earth's rotation to maintain shaft 110 in a stationary position. Thus when the craft is moving, shaft 110 is differentially adjusted by shafts 109 and 111 to properly indicate the craft's longitude. Thus various resistors such as resistors #51, #52, #21, #25, #26, #114, and #115 may be adjusted by the rotation of shaft 111 through appropriate gear drives to properly indicate the position of gimbal ring 8 with respect to gimbal ring 6. Linear variable resistors #51 and #52 are of such a type that each revolution of gear 96 adjusts the resistors operated by gear 97 in increments of resistance equal to the maximum resistance of the resistors adjusted by gear 96 as the resistors adjusted by gear 96 pass from maximum to minimum or minimum to maximum resistance in a manner to be described later, the resistors adjusted by gear 96 being connected in series with the resistors adjusted by gear 97 to provide a linear variable resistance of very accurate resolution. Thus appropriate gear ratios could be provided between gear 96, 97, and the other driving gears such that shaft 100 would be rotated through some convenient angle, such as approximately 350°, while gimbal ring 8 rotated 180° with respect to gimbal ring 6, and gear 96 rotated thorugh 360° for each 1° change in the position of gimbal ring 8 with respect to gimbal ring 6, the angle of gear 96 then indicating the position of gimbal ring 8 in minutes of arc. A one to one gear ratio is provided between gears 97, 98, and 99 for purposes of illustration, although the resistors adjusted by gears 98 and 99 could of course simply be adjusted by gear 97 or shaft 100. Contact arms 57 and 58 in FIGURE 6 would then also be attached to shaft 100 to cause automatic transfer of navigation to different stars. Shaft 110 rotates gears 180 and 181 through electro-magnetic clutch 94, gears 180 and 181 adjusting linear variable resistors #1 and #2 similarly as gears 96 and 97 adjust resistors #51 and #52. Gears 180 and 181 also respectively rotate shafts 78 and 79 through electro-magnetic clutches 91, shafts 78 and 79 adjusting linear variable resistors #94 and #95 similarly as resistors #1 and #2 are adjusted. The gear ratio between shafts 78 and 79 is 360 to 1 such that shaft 79 indicates degrees of longitude and shaft 78 indicates minutes of longitude. Longitude motor 117 operated by dead-reckoning computer 482 rotates shaft 129 through worm gear drive 122, shaft 129 rotating gears 130 and 131 to adjust linear variable resistors #3 and #4 similarly as resistors #1 and #2 are adjusted. Gears 130 and 131 also rotate the housing of linear variable resistors #45 and #46, chronometer motor 108 rotating gear 113 and 114 through electro-magnetic clutch 112 to adjust the rotors of resistors #45 and #46 such that resistors #45 and #46 are differentially adjusted by longitude motor 117 and chronometer motor 108 as previously indicated in FIGURE 6, electrical connections to resistors #45 and #46 being made through brushes contacting slip rings on the resistor housing as illustrated in FIGURE 7. Resistors #1 and #2 are connected to the automatic guidance system to indicate the craft's actual longitude and resistors #3 and #4 are connected to the automatic guidance system to indicate the craft's desired longitude as determined by the dead-reckoning computer. Motor 136 rotates selsyn transmitter 137 and shaft 143 through worm gear drive 142, selsyn transmitter 137 being electrically connected to selsyn signal generator 9b in FIGURE 2 to operate torquer 9a adjusting gimbal ring 6 similarly as gimbal ring 8 is adjusted. Shaft 143 rotates shafts 80 and 81 through a gear drive as illustrated, the gear ratio between shafts 80 and 81 being 360 to 1 such that shaft 81 indicates degrees of latitude and shaft 80 indicates minutes of latitude. Shafts 80 and 81 adjust linear variable resistors #11, #12, #104, #105, #84, and #85 similarly as resistors #1 and #2 are adjusted, a one to one gear ratio being provided between gears 145, 146, and 147 such that the resistors adjusted by gears 146 and 147 are adjusted to degrees of latitude. Latitude motor 152 operated by deadreckoning computer 482 rotates shaft 164 through worm gear drive 157, shaft 164 rotating gears 165 and 166 to adjust linear variable resistors #13 and #14 similarly as resistors #11 and #12 are adjusted. Resistors #11 and #12 are connected to the automatic guidance system to indicate the craft's actual latitude and resistors #13 and #14 are connected to the automatic guidance system to indicate the craft's desired latitude as determined by the dead-reckoning computer.

When the automatic guidance system is turned off, variable resistors #3 and #4 are automatically adjusted equal to the resistance of variable resistors #1 and #2, and variable resistors #13 and #14 are automatically adjusted equal to the resistance of variable resistors #11 and #12 by the guidance circuit in FIGURE 30 in a manner to be described. Thus when variable resistors #1 and #2 in FIGURE 7 are initially adjusted midway between maximum and minimum resistance at the start of the operation, variable resistors #3 and #4 are also adjusted midway between maximum and minimum resistance by the guidance circuit in FIGURE 30, the housing of variable resistors #45 and #46 then being adjusted to a pre-determined position by the stated adjustment of variable resistors #3 and #4 such that adjustment of shaft 115 in FIGURE 7 to the local meridian hour angle with respect to the Sun at the initial known longitude of the craft properly adjusts the resistance of variable resistors #45 and #46 to properly align the star follower 5 with the Sun when a resistor properly adjusted to zero difference in sidereal hour angle from the Sun is inserted into positioning circuits #9 and #10 by switch 64 in FIGURE 6. Chronometer motor 108 in FIGURE 7 maintains adjustment of variable resistors #45 and #46 in accordance with the local time at the point of departure as previously described, variable resistors #45 and #46 in FIGURE 6 being similarly adjusted.

Variable resistors #1 and #2 in FIGURE 7 may be initially adjusted midway between maximum and minimum resistance at the start of the operation by switch 278 providing for energization of electro-magnetic clutch 90 and solenoid 92, switch 278 also operating motor means to adjust gear 181 through electro-magnetic clutch 90, solenoid 92 engaging lug 179 to halt adjustment of gear 181 when variable resistors #1 and #2 are adjusted midway between maximum and minimum resistance. A more preferred manner of initial adjustment of variable resistors #1, #2, #3, #4, #45, and #46 is described later.

Refraction computer

To compensate for refraction of light in the earth's atmosphere, the refraction computer illustrated in diagrammatic form in FIGURE 31 provides for a slight correction in rotation of the star follower 5 in a clockwise direction with respect to gimbal ring 8 in FIGURES 2 and 6 when gimbal ring 6 rotates counter-clockwise with respect to gimbal ring 2b from a position parallel with each other and vice versa, the corrections being a maximum when gimbal ring 8 is parallel to gimbal ring 6, and calibration circuits diminishing the corrections when gimbal ring 8 rotates either clockwise or counter-clockwise from this parallel position. The computer provides a slight correctional decrease in the indicated longitude when gimbal ring 8 rotates clockwise with respect to gimbal ring 6 from a position parallel with each other and vice versa, the corrections being a maximum when gimbal ring 6 is parallel to gimbal ring 2b, and calibration circuits diminishing the corrections when gimbal ring 6 rotates either clockwise or counter-clockwise from this parallel position. Rotation of the optical axis of the star follower 5 from a position perpendicular to the plane of gimbal ring 8 in adjustment to the declination of a star selected for navigation provides corrections in the position of star follower 5 with respect to gimbal ring 8 and calibration of the corrections in longitude similarly as the position of gimbal ring 6 with respect to gimbal ring 2b. Further calibration means decrease the refraction corrections with increase in altitude. Provision is made in the refraction computer of FIGURE 31 to similarly provide appropriate corrections in longitude and the position of star follower 5 with respect to gimbal ring 8 when star follower 5 is replaced with a signal seeking radio antenna aligned with a navigation satellite emitting radio frequency signals and orbiting in space in the plane or the earth's equator in a constant position with respect to the earth, the corrections being necessary due to the proximity of the satellite to the earth in comparison with the earth's diameter.

Wheatstone bridge positioning circuits #5 and #6 in FIGURE 12 are typical of the other Wheatstone bridge positioning circuits illustrated and utilized in a refraction computer. A direct current voltage source is applied to the input of the Wheatstone bridge circuits #5 and #6 as illustrated, the signal voltage output being applied to the grid and cathode of a conventional gas type tube 226 such that the gas ionizes at a critical bias voltage to provide a large surge in plate current, relays #15 and #16 being operated by the surge in plate current. A direct current voltage source is applied across potentiometers #43 and #44 to provide an adjustable bias voltage, the bias voltage being connected in series with the signal voltage output of circuits #5 and #6 and adjusted to the critical bias voltage of tubes 226 such that the signal voltage output of circuits #5 and #6 is zero when they are balanced. Positioning variable resistors #37 and #38 respectively increase and decrease in resistance together or vice versa upon adjustment to cause relay #15 to be energized when resistors #37 and #38 are adjusted in one direction of rotation from their null point and causing relay #16 to be energized when the resistors are adjusted in the other direction from their null point, the polarity of the input voltages to circuits #5 and #6 being the same. However, if the polarity of the input voltage to circuit #6 were reversed from the polarity of the input voltage to circuit #5, positioning resistors #37 and #38 would increase in resistance simultaneously and decrease in resistance simultaneously. The present state of art provides many different types of closed loop servo amplifier circuits which could obviously be utilized to operate relays #15 and #16 from the signal voltage output of Wheatstone bridge circuit #5 alone with elimination of circuit #6, and polarized relays are also available which may be operated either directly or through a pre-amplifier from the signal voltage output of Wheatstone bridge circuit #5 alone, the movable contact of the polarized relay being normally in a central null position from which it may be energized either in one direction or the opposite direction to provide the functions of both relays #15 and #16. It is to be understood that all pairs of Wheatstone bridge circuits or pairs of resistance networks similar to circuits #5 and #6, illustrated and described to provide signal output to thyratron tubes of the type 226 for operation of relays in the present invention, may utilize any appropriate closed loop amplifier circuit for similar operation of the same relay functions from a single identical Wheatstone bridge circuit or single identical resistance network similarly as described for circuit #5 alone. Energization of relay #15 closes normally open contacts to rotate motor 227 in one direction and energization of relay #16 closes normally open contacts to rotate motor 227 in the opposite direction, rotation of motor 227 adjusting variable resistors #41 and #42 to return circuits #5 and #6 to their null point, rotation of motor 227 further rotating selsyn transmitter 228 to adjust any desired device in accordance with the position of resistors #37 and #38. Resistors #41 and #42 are linear variable resistors, however resistors #37 and #38 could be either linear or non-linear depending upon the positioning requirements. Wheatstone bridge circuits #7 and #8 are similar to circuits #5 and #6 except that scale variable resistors #25, #26, #27, #28, #29, #30, #31, and #32 are provided in the bridge circuits as illustrated such that a given change in the resistance of positioning resistors #21, #22, #23, and #24 may produce a varying change in the position of motor 229, depending upon the adjustment of the scale variable resistances. The corresponding scale variable resistances in circuits #7 and #8 are always respectively equal in resistance to each other and increase or decrease in resistance simultaneously, for example the two resistors #25 in circuit #7 are always equal in resistance to each other and always equal in resistance to the two resistors #26 in circuit #8. Thus circuits #7 and #8 may serve as computer positioning circuits. FIGURE 31 is a diagram of one type of refraction computer utilizing computer circuits #7 and #8. The sidereal hour angle of gimbal ring 8 with respect to gimbal ring 6 in the navigation device adjusts positioning variable resistors #21 and #22 connected into circuits #7a and #8a as illustrated in FIGURES 7, 12, and 31, resistors #21 and #22 being adjusted midway between maximum and minimum resistance when gimbal ring 8 is parallel to gimbal ring 6 in FIGURES 2 and 6, circuits #7a and #8a controlling the position of motor 229a as illustrated to provide the correction in longitude to compensate for refraction of light in the earth's atmosphere. Motor 229a would thus rotate linear positioning variable resistors connected into positioning circuits #25 and #26 of FIGURE 6 such that the craft's indicated longitude would be slightly decreased below the normal indicated longitude as tracking device 5 approached the Eastern horizon and the craft's indicated longitude would be slightly increased above the normal indicated longitude as tracking device 5 approached the Western horizon. When utilizing the navigation device illustrated in FIGURE 2, motor 229a would rotate a selsyn transmitter electrically connected to selsyn signal generator and torquer 7 to correct the indicated longitude in a similar manner. The resistance of positioning variable resistors #21 and #22 varies in an appropriate manner to properly correct the craft's indicated longitude to compensate for refraction of light at all angles of gimbal ring 8 with respect to gimbal ring 6 at 0° latitude, 0° declination, at sea level. The craft's actual latitude or angle of gimbal ring 6 with respect to gimbal ring 2b in the navigation device adjusts positioning variable resistors #23a and #24a connected into circuits #7b and #8b as illustrated in FIGURES 7, 12, and 31, resistors #23a and #24a being adjusted midway between maximum and minimum resistance at 0° latitude, circuits #7b and #8b controlling the position of motor 229b as illustrated to provide the correction in declination to compensate for refraction of light in the earth's atmosphere. Motor 229b adjusts linear positioning variable resistors #39 and #40 connected into circuits #11 and #12 as illustrated in FIGURES 12 and 31, resistors #39 and #40 being adjusted midway between maximum and minimum resistance at 0° latitude, circuits #11 and #12 controlling the position of motor 230 to adjust tracking device 5 to the declination of a selected star as illustrated in FIGURES 6 and 12. Motor 229b thus adjusts resistors #39 and #40 such that tracking device 5 is rotated slightly counter-clockwise with respect to gimbal ring 8 when gimbal ring 6 rotates clockwise with respect to gimbal ring 2b and vice versa since a star at the north or south horizon would appear to be slightly above the horizon due to refraction of light in the earth's atmosphere. The resistance of positioning variable resistors #23a and #24a varies in an appropriate manner to properly correct the angle of declination to compensate for refraction of light at all angles of latitude when the declination of a selected star is zero and gimbal ring 8 is parallel to gimbal ring 6 at sea level.

The angle of gimbal ring 8 with respect to gimbal ring 6 would further affect the correction in declination, the angle of gimbal ring 6 with respect to gimbal ring 2b would further affect the correction in longitude, and the angle of tracking device 5 with respect to gimbal ring 8 would further affect both the correction in longitude and declination to compensate for refraction of light in the earth's atmosphere. Therefore the sidereal hour angle of gimbal ring 8 with respect to gimbal ring 6 adjusts scale variable resistors #25 and #26 connected into circuits #7b and #8b as illustrated in FIGURES 7, 12, and 31, resistance elements #25 and #26 being center-tapped such that resistors #25 and #26 have minimum resistance when gimbal ring 8 is parallel to gimbal ring 6 and resistors #25 and #26 appropriately increase in resistance when gimbal ring 8 is rotated 90° in either direction from the described parallel position, the correction in declination for any given latitude thus being a maximum when gimbal ring 8 is parallel to gimbal ring 6 and a minimum when gimbal ring 8 is rotated 90° in either direction from the described parallel position. Altitude scale variable resistances would be provided in the upper legs of circuits #7b and #8b similarly as scale variable resistors #25 and #26 are provided in the upper legs of circuits #7 and #8 of FIGURE 12, any conventional altimeter means adjusting the altitude scale variable resistors to a minimum resistance at 0 altitude and the altitude scale variable resistances appropriately increasing in resistance with altitude such that the correction in declination would be a maximum at sea level and would approach zero as the craft left the earth's atmosphere. Scale variable resistors #25 and #26 might be placed in the lower legs of circuits #7b and #8b rather than in the upper legs as illustrated, the extremities of resistor elements #25 and #26 being connected together then such that resistors #25 and #26 would have maximum resistance when gimbal ring 8 is parallel to gimbal ring 6 and would appropriately decrease in resistance to minimum resistance when gimbal ring 8 is rotated 90° in either direction from the described parallel position. The craft's latitude or angle of gimbal ring 6 with respect to gimbal ring 2b adjusts scale variable resistors #27 and #28 connected into circuits #7a and #8a as illustrated in FIGURES 7, 12, and 31, resistance elements #27 and #28 being center-tapped such that resistors #27 and #28 have minimum resistance at 0° latitude and appropriately increase to maximum resistance at 90° north or south latitude, the correction in the craft's indicated longitude thus being a maximum at 0° latitude and a minimum at 90° north or south latitude. Altitude scale variable resistances would be provided in the upper legs of circuits #7a and #8a and adjusted similarly as described for circuits #7b and #8b. In FIGURE 31 motor 230 further adjusts the rotors of positioning variable resistors #23b, #24b and the rotors of scale variable resistors #31 and #32, provision being made for rotation of the housing of resistors #23b, #24b, #31, and #32 for purposes of calibration. Positioning variable resistors #23b and #24b are similar to positioning variable resistors #23a and #24a and are similarly connected into circuits #7b and #8b, resistors #23b and #24b being adjusted midway between maximum and minimum resistance at 0° declination, however while resistors #23a and #24a might respectively increase in resistance with increasing latitude, resistors #23b and #24b would then respectively decease in resistance with increasing declination. Scale variable resistors #31 and #32 are connected into circuits #7a and #8a as illustrated in circuits #7 and #8 of FIGURE 12, the extremities of resistance elements #31 and #32 being connected together such that resistors #31 and #32 have maximum resistance at 0° declination and their resistance appropriately decreases to minimum resistance at 90° north or south declination. Thus resistors #23b, #24b, #31, and #32 respectively counteract or neutralize resistors #23a, #24a, #27, and #28 whenever the angle of declination equals the angle of latitude similarly as if both the latitude and declination were zero. It is to be understood that all resistors described as being connected into the various positioning circuits would be connected in series with each other similarly as illustrated in FIGURE 12. The present state of the art in computer design might also provide conventional components to resolve the angle of gimbal ring 6 with respect to gimbal ring 2b, the angle of gimbal ring 8 with respect to gimbal ring 6, and the angle of tracking device 5 with respect to gimbal ring 8 into the azimuth and altitude of the selected star, compute the angle of refraction for the determined altitude, and appropriately correct the declination and the craft's indicated longitude as illustrated in FIGURE 6 and indicated in FIGURE 2 by utilization of synchro device 7 as previously described.

In the event artificial satellites emitting radio signals were used as the navigation reference, the orbit of the satellites being in the plane of the earth's equator and the angular velocity of the satellites around the earth being equal to the angular velocity of the earth's rotation such that the satellites always remained in the same position relative to a pre-determined meridian at the earth's equator, the direction of radio signals from the navigation satellites to the earth would have the reverse effect on declination and the craft's indicated longitude that refraction of light in the earth's atmosphere would have due to the rather large radius of the earth in proportion to the proximity of the satellites to the earth. Thus a slight modification of the computer circuit of FIGURE 31 could be used when the navigation reference is a navigation satellite. Since the declination of the navigation staellites would always be zero, resistors #23b, #24b, #31, and #32 would be eliminated. Resistors #21 and #22 would be adjusted by the angle of gimbal ring 8 with respect to gimbal ring 6 similarly as previously described except that as tracking device 5 approached the eastern horizon, the craft's indicated longitude would be appropriately increased slightly above the normal indicated longitude and as tracking device 5 approached the western horizon, the craft's indicated longitude would be appropriately decreased slightly below the normal indicated longitude in accordance with the effect of the earth's radius on the trigonometric relationship with respect to the navigation satellite. Resistors #23a and #24a would be adjusted by the angle of gimbal ring 6 with respect to gimbal ring 2b similarly as previously described except that as gimbal ring 6 rotated clockwise with respect to gimbal ring 2b, tracking device 5 would be also rotated slightly clockwise with respect to gimbal ring 8 and vice versa to properly compensate for the effect of the earth's radius on the trigonometric relationship with respect to the navigation satellite. Resistors #25 and #26 would be adjusted identically as previously described except with appropriate variation to properly compensate for the effect of the position of gimbal ring 8 with respect to gimbal ring 6 on the correction in declination. Resistors #27 and #28 would also be adjusted identically as previously described except with appropriate variation to properly compensate for the effect of latitude on the correction in indicated longitude. Altitude scale variable resistance means adjusted by any conventional altimeter means might be connected into the lower legs of Wheatstone bridge circuits #7a, #8a, #7b, and #8b, the altitude scale variable resistors being adjusted to minimum resistance at 0 altitude and appropriately increasing in resistance with altitude to properly increase the correction in declination and indicated longitude as the altitude increased, however the effect of altitude would be negligible except in cases where the craft left the earth's atmosphere to a considerable distance in proportion to the earth's radius.

*The star follower*

"Electro-Optical Systems, Inc., manufacture an optical transducer consisting of a simple semi-conductor cell without any moving parts which can be used to determine direction to any object which radiates visible or infrared radiation when used with a simple lens system. The transducer is a photo-voltaic unit that can resolve the the angular position of a source of visible or infrared radiation along a single axis or two mutually perpendicular axes. The output is a D.C. voltage whose polarity indicates whether the radiation source is to the right or left of the cell's centerline and whose magnitude is proportional to radiation source displacement from centerline. The transducer can resolve the angular position of a radiation source to better than 0.1 second of arc (as previously described for optical pick-off of the magnetic inclinometers). Obviously such an optical transducer in conjunction with an appropriate simple lens system could simply be provided in tracking device 5 of FIGURE 6, the signal output of the optical transducer being supplied to the input of an appropriate servo amplifier provided in tracking device 56 to properly operate longitude and latitude tracking motors 102 and 136 in FIGURE 6.

One embodiment of a tracking device described in the present invention utilizes a principle whereby longitude motor 102 and latitude motor 136 are alternately rotated and each motor is alternately rotated in small increments first in one direction and then in the opposite direction by electrical pulsing means, optical focusing and radiation sensitive means being provided in star follower 5 to operate relay means quickly halting such pulses of rotation whenever they cause the star follower to move away from alignment with its selected star such that the star follower always progresses in a direction toward alignment with its selected star.

The interior of one embodiment of tracking device 5 is illustrated in FIGURE 34. Lens 32 is a circular convergent lens focusing radiant energy on a small diameter circular photo-electric cell 239 centrally located in the base of telescope 5, the diameter of the focused radiant energy field from lens 32 matching the diameter of photo-cell 239 at the plane of photo-cell 239. Lens 31 is an annular convergent lens, concentric to lens 32, focusing radiant energy in a thin circular band within the inner circumference of annular photo-electric cell 238, photo-cell 238 being located in the base of telescope 5 concentric to photo-cell 239. The outer diameter of the focused radiant energy field from lens 31 is slightly smaller than the inner diameter of photo-cell 238 at the plane of photo-cell 238. When the longitudinal axis of telescope 5 is aligned with a selected star, the focused radiant energy field of circular lens 32 is concentric to circular photo-cell 239 and the focused radiant energy field of annular lens 31 is concentric to annular photo-cell 238 such that movement of the longitudinal axis of telescope 5 away from alignment with a selected star causes a decrease in radiant energy on circular photo-cell 239 and an increase in radiant energy on annular photo-cell 238. Photo-cells 238 and 239 may be photo-conductive, voltaic, or emissive. The star follower is described in more detail in the patent application Serial No. 777,534 for a Radiant Energy Tracking Device, filed on November 10, 1958, now abandoned.

One embodiment of a star tracking mechanism is illustrated in FIGURE 12, although it is to be understood that any conventional star tracking apparatus could be utilized, the present state of art providing numerous devices for properly orienting a star follower with a selected star. In FIGURE 12, disc 236 is rotated by motor 235 to provide electrical pulses of energy alternately to direct current shunt wound motors 102 and 136 and alternately provide pulses of energy of opposite polarity respectively to each motor such that motors 102 and 136 rotate first in one direction and then in the opposite direction. A direct current voltage source is applied to brushes #1 and #2 making contact with slip rings on disc 236 electrically connected to commutator segments to alternately provide pulses of energy first to brushes #3 and #4 then to brushes #5 and #6. Brushes #3 and #4 are respectively connected in series with normally closed contacts #3 and #4 of relay #29 and in series with normally closed double-throw contacts #3 and #4 of relay #31 to the armature winding of motor 136. Brushes #5 and #6 are respectively connected in series with normally closed contacts #1 and #2 of relay #29 and in series with normally closed double-throw contacts #1 and #2 of relay #31 to the armature winding of motor 102. The movable contacts of contacts #1, #2, #3, and #4 on relay #31 are connected to the armature windings of motors 102 and 136 such that energization of relay #31 halts operation of motors 102 and 136 by rotating disc 236 and short circuits their armature windings as illustrated to electro-dynamically brake motors 102 and 136 to a quick halt. Since motors 102 and 136 alternately rotate gimbal ring 8 and gimbal ring 6 in the navigation device (through synchros 103 and 137 as previously described in detail), the longitudinal axis of tracking device 5 either moves toward or away from alignment with a selected star upon each pulse of motors 102 and 136. The signal output of photo-cells 238 and 239 are transformer or capacitively connected in series to the input of amplifier 237 operating relay #31, but with opposite polarity such that an increase in radiant energy on photo-cell 239 and a decrease in radiant energy on photo-cell 238 does not energize relay #31, but a decrease in radiant energy on photo-cell 239 and an increase in radiant energy on photo-cell 238 energizes relay #31. Normally open contact #5 of relay #31 closes upon energization of relay #31 to close an electrical circuit through resistor 242, the normally closed contacts 241 of relay #30 to ground or a negative terminal of the voltage source operating amplifier 237 such that any momentary energization of relay #31 locks relay #31 in operation. Commutator segments on rotating disc 236 electrically connected to the positive slip ring make contact with brush #7 to momentarily energize relay #30 immediately preceding each pulse of current to brushes #3, #4, #5, and #6. Thus when motors 102 and 136 cause the longitudinal axis of telescope 5 to move toward alignment with a selected star, their operation is not interrupted by relay #31 but when motors 102 and 136 cause the longitudinal axis of telescope 5 to move away from alignment with the selected star, energization of relay #31 quickly halts the motors, the locking of relay #31 in operation preventing vibratory action of relay #31 upon halting of the motors. Rotation of disc 236 then momentarily energizes relay #30 to unlock relay #31 preceding the next pulse of energy to motors 102 and 136 such that the cycle of operation progressively aligns the longitudinal axis of telescope 5 with the selected star. Energization of relay #29 during automatic transfer of navigation to a different star disconnects motors 102 and 136 from operation by rotating disc 236 as previously described and illustrated in FIGURE 6. It would be preferable that normally closed contacts of relay #29 also be provided and connected in series with the relay winding of relay #31 to prevent energization of relay #31 upon energization of relay #29 during automatic transfer of navigation to a different star.

If tracking telescope 5 were directed toward a group of stars, the longitudinal axis of telescope 5 would become aligned with the star from which a maximum intensity of radiation was received since deviation from such an alignment would cause a decrease in radiation intensity on photo-cell 239 and an increase in radiation intensity on photo-cell 238, lens 31 and photo-cell 238 providing a relatively wide angle of search to orient tracking device 5 with respect to the star from which a maximum intensity of radiation was received. Thus if radiant energy from a selected star of maximum radiation were interrupted for a considerable length of time, a large deviation from the selected ground path could occur while navigation was being maintained by the dead-reckoning computer, as previously described, and the tracking mechanism would be capable of re-aligning tracking telescope 5 with the selected star to accurately correct any error in navigation which had occurred. The described tracking mechanism would also be capable of tracking an artificial navigation satellite emitting radio signals, as previously described, any conventional directional receiving antenna capable of maximum signal output when aligned with the navigation satellite serving as tracking device 5, amplifier 237 amplifying the signal output of the receiving antenna to operate relay #31 as previously described, the navigation satellite transmitting an unmodulated radio signal and amplifier 237 consisting of conventional radio equipment to rectify and amplify the carrier wave received from the navigation satellite.

A planetary gear is illustrated in FIGURE 5 which might provide increased positioning accuracy economically when utilized with the torquers and selsyn signal generators of the navigation device, as previously described. The gear system utilizes the conventional principle of planetary gearing, however friction drive is utilized as the principal means of torque transmission with a minimum number of gear teeth of ultra precision accuracy maintaining accurate orientation of the respective gears. Driving shaft 54 rotates gear 53 to rotate disc 51 through gears 52, disc 51 being attached to the driven shaft, as previously described. A thin film of material with a high coefficient of friction on steel, such as rubber or synthetic rubber, is bonded to the driving surface of gears 52 as illustrated, the film of rubber coming in contact with the driving surface of gear 53 and surrounding gear 50. The driving surface of gears 50, 52, and 53 may be properly tapered such that translation of disc 51 and the driven shaft along the axis of the driven shaft increases or decreases the pressure between the driving surfaces of gears 50, 52, and 53. Driving shaft 54 and gear 53 are positioned axially in the planetary gear housing by tapered roller bearings, disc 51 and the driven shaft being positioned axially in the planetary gear housing by adjustable tapered roller bearings, internally or externally threaded adjusting nuts providing for axial adjustment of the adjustable tapered roller bearings in the gear housing to provide the proper pressure between the driving surfaces of the respective gears. Gears 52 are positioned axially by tapered roller bearings on the short shafts supporting gears 52 on disc 51. Axial adjustment of the tapered roller bearings supporting gears 52 and shaft 54 would probably be unnecessary except to eliminate wobble and end play. A minimum number of ultra precision cogs are provided on gears 52 to engage matching ultra precision recesses in gears 50 and 53 to accurately maintain orientation of the respective gears. The surfaces of the driving or orienting cogs and recesses would not necessarily be tapered axially although they could be very slightly tapered axially to eliminate backlash through axial adjustment of disc 51 and the driven shaft as previously described. A thin film of rubber might also be bonded to the driving surfaces of gears 50 and 53 although it probably would be unnecessary.

*Destination setting means*

An embodiment of destination setting means utilizes a principle whereby destination setting discs are rotatably mounted on longitude and latitude indicating shafts of the navigation system, means being provided to adjust the destination setting discs to the longitude and latitude of a selected destination in degrees and minutes, similar discs being attached to the longitude and latitude indicating shafts of the navigation system with electrical contact means between adjacent pairs of discs to provide an electrical pulse of energy to activate any desired apparatus when the craft arrives at a pre-selected destination. Disc 74 in FIGURE 7 is attached to shaft 78 while disc 75 is attached to shaft 79 and driven at a 360 to 1 gear ratio by shaft 78, the position of discs 74 and 75 then corresponding to the longitude of the craft in minutes and degrees respectively. Disc 70 is mounted on shaft 78 by roller bearings as illustrated to rotate freely, disc 71 being mounted in an identical manner on shaft 79 with a 360 to 1 gear ratio between discs 70 and 71. Shaft 85 adjusts discs 71 and 70 through electro-magnetic clutch 83 and the illustrated gear drive to the longitude of some destination as described later, it being understood that the gear drive could be applied directly to disc 71 as illustrated or directly to disc 70 in a similar manner. Discs 76 and 77 are attached to shafts 80 and 81, their position corresponding to the latitude of the craft in minutes and degrees respectively. Discs 72 and 73 are mounted by roller bearings on shafts 80 and 81 to rotate freely, as illustrated for disc 70, and their position adjusted to the latitude of some destination respectively in minutes and degrees through shaft 89, electro-magnetic clutch 87 and the illustrated gear drive similarly as discs 70 and 71. A detail of discs 73 and 77 is shown in FIGURE 8. Brushes 190 and 191 make contact with slip rings on the face of disc 73 which in turn are connected to brushes 192 and 193 attached to the opposite face of disc 73. Brush 193 makes contact with a slip ring on the face of disc 77, the slip ring being electrically connected to commutator segment 194 on disc 77. Thus when brush 192 makes contact with commutator segment 194 on the face of disc 77, an electrical circuit is closed between brushes 190 and 191. Discs 72, 76, 70, 74, 71, and 75 are constructed in an identical manner. The brushes of the longitude and latitude discs may be connected in series respectively but in parallel collectively as illustrated in FIGURE 8 so a selected destination may be established on either the longitude or latitude discs at which some device is automatically operated, or all the discs may be connected in series as illustrated in FIGURE 29 so a selected destination must be established on both the longtitude and latitude discs. Provision is made for automatic adjustment of multi-section, multi-position switch 195 when the craft arrives at a pre-set destination. A voltage source is connected in series with the brushes of the destination setting discs and in series with normally closed contacts 199 of relay 198 to operate motor 196 when the craft arrives at a pre-set destination, motor 196 then adjusting switch 195 through an appropriate gear drive to the next incremental position where a voltage source connected to the rotor of one section of switch 195 energizes relay 198 to halt operation of motor 196. Any number of sets of similar destination discs may be provided to operate motor 196 through additional relays similar to relay 198 such that switch 195 is rotated through a series of incremental positions as the craft arrives at a series of pre-set destinations.

In FIGURE 8, energization of relay 202 and adjustment of switch 195 upon arrival at a selected destination provides automatic transfer of navigation to a different star similarly as energization of relay 202 and adjustment of switch 64 provide automatic transfer of navigation to a different star in FIGURE 6. Relay #29 in FIGURE 12 is energized and performs the same functions similarly as relay #29a and #29b in FIGURE 6 and in addition de-energizes electro-magnetic clutches 105 and 94 in FIGURE 7 and energizes electro-magnetic clutch 104 in FIGURE 7 during automatic transfer of navigation to a different star such that motor 102 rotates selsyn transmitter 103 through speed increasing gears 106 and 107 to provide rapid transfer of navigation to a different star, as previously described. Terminals #19 and #20 of normally open contacts #2 of relay 202 in FIGURE 9 are connected respectively to terminals #19 and #20 in FIGURE 12 to provide the previously described operation of the various relays as illustrated in FIGURE 6. Thus switch 195 in FIGURE 8 may be utilized to automatically transfer navigation to a proper star at a selected destination to achieve convergent orientation of the gimbal systems of the star follower with respect to true north and a true vertical by computer 55 as previously discussed. Obviously appropriate contacts of switch 195 could also be utilized to properly reverse torquing of gimbal ring 27 by conventional true north seeking gyroscope means in FIGURE 6 at a selected destination where navigation was transferred from a star west of the craft's zenith to a star east of the craft's zenith or vice versa to achieve convergent orientation of the gimbal systems of the star follower with respect to true north and a true vertical by computer 55 as previously described, the proper torquing of gimbal ring 27 then providing proper operation of the true north seeking gyroscope under the stated conditions as previously described. Obviously switch 195 in FIGURE 8 could also be used in combination with switches similar to switch 64 in FIGURE 6 to provide both automatic transfer of navigation to a different star at a selected destination and to provide automatic transfer of navigation to a different star at predetermined limits of adjustment of gimbal ring 8 with respect to gimbal ring 6. Switch 195 in FIGURE 8 may also be connected to automatic guidance means to provide automatic guidance through a series of pre-set destinations and flight conditions as described later.

*The guidance system*

In the guidance system, any navigation system capable of determining a craft's actual position with respect to a reference point at any instant may be used in conjunction with any appropriate dead-reckoning computer responsive to azimuth and speed selection means to establish a craft's desired route and position with respect to said reference point at any instant, and any guidance system may be used capable of differentiating between the craft's actual position and desired position to maintain the craft on the route established by the dead-reckoning computer and coordinate the speed selection means of the dead-reckoning computer with the actual speed of the craft along the selected route, however it is believed that the dead-reckoning computer and guidance means described in the present invention would be preferred.

In one embodiment of a dead-reckoning computer used for automatic guidance, azimuth and speed selection means adjust the voltage output of longitude and latitude voltage means in accordance with the selected azimuth, selected speed, and the craft's latitude. Tachometer generators operated by longitude and latitude motors of the dead-reckoning computer produce a similar voltage output, control means adjusting the speed of the longitude and latitude motors until the voltage output of the longitude and latitude tachometer generators respectively equal the voltage output of the longitude and latitude voltage means, the rotation of the longitude and latitude motors then properly indicating the craft's desired longitude and latitude in accordance with the selected speed and azimuth.

When the ground velocity of the craft along a selected route is not equal to the speed selected by the dead-reckoning computer, longitude and latitude Wheatstone bridge guidance circuits adjusting the azimuth of the craft to maintain the craft on a selected route further activate gear reduction or gear increasing means to proportionately reduce or increase the rate of adjustment of longitude and latitude variable resistors operated by the dead-reckoning computer in the guidance circuits until the guidance circuits are again balanced. The guidance circuits simultaneously activate other speed adjustment means under the stated conditions which either adjust the speed selection means of the dead-reckoning computer or the craft's throttle in increments of adjustment whose magnitude is inversely proportional to the time interval between adjustments. That is, if a long time interval occurs between activations of the speed adjusting means, indicating a small deviation of the craft's actual velocity from the desired velocity, a small correction in speed is made. If a short time interval occurs between successive activations of the speed adjusting means, indicating a large deviation of the craft's actual velocity from the desired velocity, a large correction in speed is made. Thus a minimum number of corrections in the craft's velocity are required.

The principle of the automatic guidance system is illustrated in the block diagram of FIGURE 29, where $\lambda_D$ represents the longitude of a selected destination and $\phi_D$ represents the latitude of a selected destination in addition to the other symbols previously described in FIGURE 6. Longitude and latitude Wheatstone bridge means provide the basic means of directly differentiating between a craft's actual location as determined by automatic navigation means and a craft's desired location as determined by dead-reckoning computer means. Automatic navigation means provide the longitude Wheatstone bridge means with the craft's actual longitude and provide the latitude Wheatstone bridge means with the craft's actual latitude, variable resistance means being respectively adjusted in said longitude and latitude Wheatstone bridge circuits by the craft's longitude and latitude. The dead-reckoning computer means consists essentially of a longitude motor 117 and latitude motor 152, means being provided to properly adjust the operating speed of said longitude and latitude motors in accordance with a selected azimuth and velocity, variable resistance means in said longitude and latitude Wheatstone bridge circuits being respectively adjusted by said longitude and latitude motors to properly establish the craft's desired position at any instant. Azimuth selection means to control said dead-reckoning computer means and azimuth determining means determining the azimuth of the craft's longitudinal axis further adjust variable resistance means in said longitude and latitude Wheatstone bridge circuits such that the longitude and latitude circuits are properly balanced at a zero signal output when the azimuth of the craft's longitudinal axis is properly adjusted to maintain the craft on a route established by said dead-reckoning computer means, the signal output of the longitude and latitude circuits operating azimuth adjusting means to properly adjust the azimuth of the craft's longitudinal axis.

Longitude motor 117 and latitude motor 152 each operate direct current tachometer generator means as indicated, the voltage output of the tachometer generator means being directly proportional to the speed of the respective longitude and latitude motors. Longitude voltage means are provided responsive to speed selection means, azimuth selection means, and the actual latitude of the craft as determined by the automatic navigation means such that the voltage output of the longitude voltage means is directly proportional to the sine of the selected azimuth, the secant of the craft's latitude, and the ground velocity of the craft along the selected route as established by said speed selection means. The voltage output of the longitude voltage means is connected in series with the voltage output of the longitude tachometer generator means but with opposing polarity such that the difference in potential between the longitude voltage means and the longitude tachometer generator means may be used to operate speed control means regulating the speed of the longitude motor. Thus when the voltage output of the longitude tachometer generator means is greater than the voltage output of the longitude voltage means, the speed control means is activated to reduce the operating speed of the longitude motor until the voltage output of the longitude tachometer generator means equals the voltage output of the longitude voltage means and vice versa. Latitude voltage means are provided responsive to said speed selection means and said azimuth selection means such that the voltage output of the latitude voltage means is directly proportional to the selected ground velocity along the selected route and the cosine of the selected azimuth. The operating speed of the latitude motor is controlled by the latitude voltage means similarly as the operating speed of the longitude motor is controlled by the longitude voltage means. Therefore longitude motor 117 and latitude motor 152 adjust their respective linear variable resistances to properly indicate the craft's desired longitude and latitude at any instant for a selected azimuth and selected ground speed.

When the ground speed of the craft along a selected route is greater than that selected by the speed selection means, the longitude and latitude Wheatstone bridge means conjunctively operate the first relay means of FIGURE 29 which activate speed increasing means, such as identical gear increasing means, to respectively increase the rotational speed of the variable resistance means indicating the craft's desired longitude and latitude until either the longitude or latitude Wheatstone bridge means are balanced at a zero signal output. When the ground speed of the craft along a selected route is less than that selected by the speed selection means, the longitude and latitude Wheatstone bridge means conjunctively operate the second relay means of FIGURE 29 which activate speed decreasing means, such as identical gear reduction means, to respectively decrease the rotational speed of the variable resistance means indicating the craft's desired longitude and latitude until either the longitude or latitude Wheatstone bridge means are balanced at a zero signal output.

The longitude and latitude Wheatstone bridge means further conjunctively energize the third relay means of FIGURE 29 under said conditions energizing said first relay means, and conjunctively energize the fourth relay means of FIGURE 29 under said conditions energizing said second relay means. Energization of said third relay means under said conditions activates timing means providing a pulse of current to motor 167 such that motor 167 either increases the speed selected by the speed selection means through electro-magnetic clutch 171 or reduces the craft's throttle setting through electro-magnetic clutch 170 depending upon the position of single-pole, double-throw manually operated switch 283 which operates either of said electro-magnetic clutches as indicated. Energization of said fourth relay means under said conditions similarly activates said timing means providing a pulse of current to motor 167 either decreasing the speed selected by the speed selection means or advancing the craft's throttle setting depending upon the position of said switch 283. Thus if a constant ground speed is desired, switch 283 is placed in a position to adjust the craft's throttle, and if a constant throttle setting is desired, switch 283 is placed in a position to adjust the speed selection means of the automatic guidance system in FIGURE 29. Energization of said third or fourth relay means under said conditions further adjusts control means regulating the duration of said pulse of current provided by said timing means such that the incremental adjustment of the speed selection means or the craft's throttle by motor 167 is inversely proportional to the time interval between successive energizations of said third or fourth relay means. When constant speed switch 283 is turned off, clutch 171 is engaged to properly adjust said speed selection means to the actual speed of the craft along the selected route and when constant speed switch 283 is turned on, clutch 170 is engaged to properly adjust the craft's throttle such that the craft's ground speed along the selected route is maintained constant at the speed selected by said speed selection means.

Guidance switch 275 when turned on operates longitude motor 117 and latitude motor 152 through their respective speed control means, and activates the azimuth adjusting means adjusting the craft's longitudinal axis to operation by the longitude and latitude Wheatstone bridge means as indicated. Guidance switch 275 when turned off disconnects the longitude and latitude motors from operation by their respective speed control means, disconnects the azimuth adjusting means from operation by the longitude and latitude Wheatstone bridge means, and respectively connects longitude motor 117 and latitude motor 152 to respective operation by the longitude and latitude Wheatstone bridge means to maintain the longitude and latitude Wheatstone bridge means balanced at a zero signal output ready for immediate automatic guidance when guidance switch 275 is turned on.

Azimuth selection means 256 adjusts the position of rotatable member 311 in accordance with the selected azimuth, electrical contact means responsive to the position of rotatable member 311 operating the fifth, sixth, seventh, eighth, and ninth relay means of FIGURE 29 to automatically adapt the automatic guidance system to proper operation at any selected azimuth. Assume the degrees of azimuth to be represented by four quadrants such that quadrant #1 represents the azimuth between north and east, quadrant #2 represents the azimuths between east and south, quadrant #3 represents the azimuths between south and west, and quadrant #4 represents the azimuths between west and north. The fifth relay means with double-pole, double-throw contacts are therefore operated such that longitude motor 117 rotates in one direction at a selected azimuth in the first and second quadrants and motor 117 rotates in the opposite direction at a selected azimuth in the third and fourth quadrants, the fifth relay means further reversing the polarity of the tachometer generator means operated by longitude motor 117 to maintain constant polarity of their voltage output regardless of the direction of rotation of longitude motor 117. The sixth relay means with double-pole, double-throw contacts are similarly operated such that latitude motor 152 rotates in one direction at a selected azimuth in the first and fourth quadrants and motor 152 rotates in the opposite direction at a selected azimuth in the second and third quadrants, the sixth relay means further reversing the polarity of the tachometer generators operated by latitude motor 152 to maintain constant polarity of their voltage output regardless of the direction of rotation of latitude motor 152. The seventh and eighth relay means automatically adapt the longitude and latitude Wheatstone bridge means to properly operate the azimuth adjusting means at all selected azimuths as will be described in more detail later. The ninth relay means automatically reverse the operation of the first and second relay means and reverse the operation of the third and fourth relay means at appropriate azimuths to provide proper operation of the various components at all selected azimuths as will be described in more detail later.

Azimuth computing means 46 in FIGURE 29 determines the correct azimuth to maintain a direct route, such as a great circle route, from the craft's location to a selected destination and adjusts azimuth selection means 256 accordingly to the proper azimuth at any instant to maintain such a direct route, the automatic navigation means providing azimuth computer 46 with the craft's actual longitude and latitude, and destination selection means providing azimuth computer 46 with the longitude and latitude of a selected destination. Azimuth computing means 46 may be any conventional computer capable of determining the proper azimuth to maintain a direct route from one position to another. For example in FIGURE 2 of Patent No. 2,444,933 granted to R. E. Jasperson on July 13, 1948, ring 20 is adjusted to the longitude of the craft, slider 21 is adjusted on ring 20 to the latitude of the craft, ring 32 is adjusted to the longitude of a selected destination, slider 38 is adjusted on ring 32 to the latitude of a selected destination, and selsyn transmitter 42 then indicates the proper azimuth at any instant to maintain a great circle route from the craft's position to the selected destination. It is obvious that ring 20 and slider 21 in Patent No. 2,444,933 could be properly positioned in accordance with the longitude and latitude of the craft as determined by any automatic navigation system. The Librascope AN/ASN-24 airborne digital navigation computer might also be used to determine the proper azimuth to maintain a great circle route from the craft's position to a selected destination. The destination setting device as previously described in the automatic navigation system of the present invention may also be used for automatic guidance of the craft to a selected destination as illustrated in FIGURE 29. Longitude destination discs 70 and 71 are respectively adjusted in minutes and degrees to the longitude of the destination by destination selection means, disc 70 adjusting a linear longitude destination variable resistor and disc 71 further adjusting a longitude destination variable resistor in increments of resistance equal to the maximum resistance of the resistance adjusted by disc 70 at each revolution of disc 70 when the resistance adjusted by disc 70 passes from maximum to minimum resistance or from minimum to maximum resistance, the resistance adjusted by disc 70 being connected in series to the resistance adjusted by disc 71, similarly as later described for resistors #11 and #12 in FIGURE 7, to provide a linear destination variable resistance of very accurate rsolution. Latitude destination discs 72 and 73 are similarly adjusted respectively in minutes and degrees to the latitude of a destination, discs 72 and 73 similarly adjusting similar latitude destination variable resistances similarly connected in series as indicated. The described longitude and latitude destination variable resistances may then be respectively connected into longitude and latitude Wheatstone bridge positioning means of azimuth computer 46 by multi-section, multi-position switch 195, the longitude and latitude Wheatstone bridge positioning means properly positioning any desired computing component in azimuth computer 46. Any number of additional sets of similar longitude and latitude destination discs may be provided to respectively adjust similar longitude and latitude destination variable resistances similarly connected to azimuth computer 46 by switch 195, computer 46 being connected to the rotor elements of switch 195 such that each position of switch 195 connects an appropriate set of longitude and latitude destination variable resistances to computer 46. Thus when the craft reaches each selected destination, motor 196 rotates switch 195 to the next incremental position, as previously described, to connect destination variable resistances to azimuth computer 46 adjusted to the next selected destination such that the craft is automatically guided through a series of preselected destinations.

FIGURES 10 and 30 illustrate two preferred embodiments of the longitude and latitude Wheatstone bridge guidance circuits indicated in FIGURE 29. Circuits #1 and #2 are longitude Wheatstone bridge circuits and circuits #3 and #4 are latitude Wheatstone bridge circuits operating relays similarly as previously described for circuits #5, #6, #7, and #8 of FIGURE 12. Linear variable resistors #1 and #2 are adjusted to the actual longitude of the craft as determined by the automatic navigation means and linear variable resistors #3 and #4 are adjusted to the desired longitude of the craft as determined by the dead-reckoning computer, resistors #1 and #4 increasing in resistance while resistors #2 and #3 decrease in resistance or vice versa. If the polarity of the voltage input to circuit #2 were reversed from that of circuit #1, resistors #1 and #2 would increase in resistance while resistors #3 and #4 decreased in resistance or vice versa. Linear variable resistors #11 and #12 are adjusted to the actual latitude of the craft as determined by the automatic navigation means and linear variable resistors #13 and #14 are adjusted to the desired latitude of the craft as determined by the dead-reckoning computer, resistors #11 and #14 increasing in resistance while resistors #12 and #13 decrease in resistance or vice versa. If the polarity of the voltage input to circuit #4 were reversed from that of circuit #3, resistors #11 and #12 would increase in resistance while resistors #13 and #14 decreased in resistance or vice versa. Resistors #5, #6, #15, and #16 are each differentially adjusted by the azimuth determining and azimuth selection means such that resistors #5, #6, #15, and #16 are each adjusted midway between maximum and minimum resistance when the azimuth of the craft's longitudinal axis equals the selected azimuth. Thus when the actual position of the craft is not on the route determined by said dead-reckoning computer means, the longitude and latitude Wheatstone bridge circuits become unbalanced to create a signal output energizing relays #10, #11, #12, or #13 to adjust the azimuth of the craft's longitudinal axis until the Wheatstone bridge circuits are again balanced at a zero signal output whereupon the craft returns to the route established by the dead-reckoning computer means. Energization of relay #10 or #12 closes normally open contacts #1 and #2 of the respective relays to operate motor 220, energization of relay #10 rotating motor 220 in one direction and energization of relay #12 rotating motor 220 in the opposite direction. Energization of relay #11 similarly rotates motor 221 in one direction and energization of relay #13 rotates motor 221 in the opposite direction, however energization of relays #10 and #13 rotate motors 220 and 221 in the same direction to properly adjust the azimuth control 223 of a conventional auto-pilot through the worm gear drive 222 as illustrated. Energization of relays #11 and #12 similarly rotate azimuth control 223 in the opposite direction from that caused by energization of relays #10 and #13. Thus when the craft deviates from a selected route, the resulting increase in the craft's longitude above the desired longitude and decrease in the craft's latitude below the desired latitude, or vice versa, properly corrects the azimuth of the craft's longitudinal axis. When the craft deviates from a selected north or south route, it is seen that the craft's actual longitude would differ greatly from the craft's desired longitude whereas the craft's actual latitude would differ negligibly from the craft's desired latitude, therefore calibration resistors #7 and #8 in longitude circuits #1 and #2 are adjusted to a minimum resistance and calibration resistors #17 and #18 in latitude circuits #3 and #4 are adjusted to a maximum resistance in response to the azimuth selection means at a north or south selected azimuth. Thus adjustment of resistors #5, #6, #15, and #16 by the craft's longitudinal axis has a maximum effect on longitude circuits #1 and #2 and a minimum effect on latiude circuits #3 and #4 at a north or south selected azimuth such that both longitude and latitude Wheatstone bridge circuits become properly balanced. Similarly it is seen that when the craft deviates from a selected east or west route, the craft's actual latitude would differ greatly from the craft's desired latitude whereas the craft's actual longitude would differ negligibly from the craft's desired longitude, therefore calibration resistors #7 and #8 are correspondingly adjusted to a maximum resistance and calibration resistors #17 and #18 are adjusted to a minimum resistance in response to the azimuth selection means at an east or west selected azimuth. Calibration resistors #7 and #8 are always respectively equal in resistance to each other and calibration resistors #17 and #18 are always respectively equal in resistance to each other, the calibration resistors in FIGURE 10 being directly adjusted by the azimuth selection means in a manner to be described later. In FIGURE 30 longitude motor 117 rotates direct current tachometer generator 407 and latitude motor 152 rotates direct current tachometer generator 408, the voltage output of tachometer generators 407 and 408 being directly proportional to their rotational speed. The armature winding of tachometer generator 407 is connected in series with the armature winding of tachometer generator 408 but with opposing polarity, the combined signal voltage output of tachometer generators 407 and 408 being connected in series with the voltage output of bias potentiometer #124 and connected to the grid and cathode of tube 226 as illustrated, a direct current voltage source being applied to potentiometer #124 which is adjusted to the critical bias of tube 226. Terminal #69 of the energizing coil of rotary relays 393 is electrically connected to terminal #69 of tube 226 and a voltage source connected to energize rotary relays 393 when the gas in tube 226 vomes ionized at a critical bias voltage. Normally open contacts of rotary relays 393 close upon energization to short circuit fixed calibration resistances #7 and #8, and normally closed contacts of rotary relays 393 open upon energization to disconnect a short circuit of fixed calibration resistances #17 and #18. Thus when the speed of latitude motor 152 is greater than the speed of longitude motor 117, such as at a north or south selected azimuth, rotary relays 393 are energized to short circuit calibration resistors #7 and #8 so that resistors #7 and #8 have minimum resistance and resistors #17 and #18 have maximum resistance as previously indicated. Similarly when the speed of longitude motor 117 is greater than the speed of latitude motor 152, such as at an east or west selected azimuth, rotary relays 393 are de-energized to short circuit calibration resistors #17 and #18 so that resistors #17 and #18 have minimum resistance and resistors #7 and #8 have maximum resistance as previously indicated. Other functions and advantages of the described embodiment will become apparent as the description proceeds.

In FIGURE 30, circuit #1 may energize either relay #10 or #12 through one section of rotary relay 321 with single-pole, double-throw contacts, and circuit #2 may also energize either relay #10 or #12 through another section of rotary relay 321 with single-pole, double-throw contacts, the movable contacts of relay 321 being respectively connected to tubes 226 of circuits #1 and #2 as illustrated such that circuit #1 is connected to operate relay #10 when circuit #2 is connected to operate relay #12 and circuit #1 is connected to operate relay #12 when circuit #2 is connected to operate relay #10. In a similar manner circuit #3 may energize either relay #11 or #13 through one section of rotary relay 303 with single-pole, double-throw contacts, and circuit #4 may energize either relay #11 or #13 through another section of rotary relay 303 with single-pole, double-throw contacts as illustrated such that circuit #13 is connected to operate relay #11 when circuit #4 is connected to operate relay #13 and circuit #3 is connected to operate relay #13 when circuit #4 is connected to operate relay #11. At a selected azimuth in the first or third quadrant, relay 321 is energized by rotatable member 311 in FIGURE 29 to provide energization of relay #10 by circuit #1 when the craft is off course in a clockwise direction from the selected azimuth, energization of relay #10 adjusting azimuth control 223 to adjust the azimuth of the craft's longitudinal axis in a counter-clockwise direction, and at a selected azimuth in the second or fourth quadrant relay 321 is de-energized to provide energization of relay #10 by circuit #2 when the craft is off course in a clockwise direction from the selected azimuth. At a selected azimuth in the first or second quadrant, relay 303 is energized by rotatable member 311 in FIGURE 29 to provide energization of relay #13 by circuit #4 when the craft is off course in a clockwise direction from the selected azimuth, energization of relay #13 adjusting azimuth control 223 to adjust the azimuth of the craft's longitudinal axis in a counter-clockwise direction, and at a selected azimuth in the third or fourth quadrant relay 303 is de-energized to provide energization of relay #13 by circuit #3 when the craft is off course in a clockwise direction from the selected azimuth. To achieve the operation as described, longitude resistor #1 and latitude resistor #11 would both decrease in resistance as the craft traveled at a selected azimuth in the first quadrant.

In FIGURE 10 the previously described operation of relays #10, #11, #12, and #13 is achieved by utilizing single-pole, double-throw sections of rotary relay 321 to respectively reverse electrical connections to the ends of resistor elements #1, #2, #3, and #4 in longitude circiuts #1 and #2, and by utilizing single-pole, double-throw sections of rotary relay 303 to respectively reverse electrical connections to the ends of resistor elements #11, #12, #13, and #14 as indicated in FIGURE 22 where contact #1 is the rotor connection of the respective variable resistors, contact #4 is the movable contact of relay 321 or relay 303, and contacts #2 or #3 are the ends of the respective resistor elements connected to the double-throw contacts of relay 321 or 303 such that contacts #1 and #4 serve as the electrical connections to the respective variable resistors. In FIGURE 10 to achieve the operation as previously described, longitude resistor #1 and latitude resistor #11 would also both decrease in resistance as the craft traveled at a selected azimuth in the first quadrant, and the maximum resistance of variable resistors #1, #2, #11, and #12 would be respectively equal to the maximum resistance of variable resistors #3, #4, #13, and #14, the said variable resistors all being initially adjusted midway between maximum and minimum resistance in a manner to be described, such that the combined resistance of resistors #1 and #3, resistors #2 and #4, etc. would remain constant upon reversing of electrical connections to the ends of the respective resistor elements by relays 321 and 303. The previously described operation of relays 321 and 303 in FIGURE 30 in this regard would probably be more satisfactory since operation of the relays would have no effect on the resistance in Wheatstone bridge circuits #1, #2, #3, and #4 due to variations in resistance of the contacts of relays 321 and 303.

Longitude motor 117 may be operated by longitude circuits #1 and #2 in FIGURE 30 when multi-pole, double-throw guidance switch 275 is turned off, contacts #1 and #2 of relays #10 and #12 being connected to the armature winding of motor 117 respectively through double-pole, double-throw reversing contacts of relay 321, contacts #1, #3 of switch 275b, and contacts #4, #6 of switch 275b, as illustrated, such that operation of motor 117 by relays #10 and #12 maintain circuits #1 and

2 balanced at a zero signal output, energization of relay #10 rotating motor 117 in one direction and energization of relay #12 rotating motor 117 in the opposite direction. When operation of relay 321 reverses the operation of relays #10 and #12, as previously described, relay 321 then correspondingly reverses the direction of rotation of motor 117 by relays #10 and #12 to properly balance circuits #1 and #2 at all selected azimuths when guidance switch 275 is turned off. Latitude motor 152 may similarly be operated by latitude circuits #3 and #4 when guidance switch 275 is turned off, contacts #1 and #2 of relays #11 and #13 being connected to the armature winding of motor 152 respectively through double-pole, double-throw reversing contacts of relay 303, contacts #1, #3 of switch 275c, and contacts #4, #6 of switch 275c, as illustrated, such that operation of motor 152 by relays #11 and #13 maintain circuits #3 and #4 balanced at a zero signal output, energization of relay #11 rotating motor 152 in one direction and energization of relay #13 rotating motor 152 in the opposite direction. When operation of relay 303 reverses the operation of relays #11 and #13, as previously described, relay 303 then correspondingly reverses the direction of rotation of motor 152 by relays #11 and #13 to properly balance circuits #3 and #4 at all selected azimuths when guidance switch 275 is turned off. Thus circuits #1, #2, #3, and #4 are maintained in a balanced condition ready for immediate use in automatic guidance by switch 275. Contacts #7 of switch 275b and 275c are respectively connected to motors 220 and 221 such that motors 220 and 221 are disconnected from operation by circuits #1, #2, #3, and #4 when switch 275 is turned off. It is to be understood that the worm gear drive 222 is merely illustrative of providing rotation of azimuth control 223 by motors 220 and 221 and any appropriate conventional gearing, such as planetary or spur reduction gearing, could provide rotation of azimuth control 223 by motors 220 and 221 such that azimuth control 223 of the auto-pilot could be adjusted manually when guidance switch 275 is turned off. When guidance switch 275 is turned on, longitude motor 117 is operated by speed control means through double-pole, double-throw reversing contacts of relay 303, contacts #1, #2 and contacts #4, #5 of switch 275b, latitude motor 152 is operated by speed control means through double-pole, double-throw reversing contacts of relay 321, contacts #1, #2 and contacts #4, #5 of switch 275c, and motors 220 and 221 are operated by the longitude and latitude Wheatstone bridge circuits through contacts #7, #9 of switch 275 as previously described and indicated in FIGURE 29.

At a selected azimuth in the first quadrant, when the craft travels at a ground speed greater than the selected speed, relays #10 and #11 are both energized to conjunctively energize relays #3 and #5 in FIGURE 30, a voltage source being connected to normally open contact #4 of relay #10 in series with normally open contact #4 of relay #11 in series with single-pole, double-throw contacts of rotary relay 301 to a primary energizing coil a of relays #3 and #5. Normally open contact #5 of relay #3 closes upon energization of relay #3 to connect a voltage source to secondary energizing coil b of relay #3 through the normally closed contact of relay #41, thus locking relay #3 in operation. A voltage source is connected to the movable contact of single-pole, double-throw contact #3 of relay #3 to de-energize electro-magnetic clutches 118 and 153 and energize electro-magnetic clutches 119 and 154 upon operation of relay #3, terminal #67 of the normally closed contact #3 being connected to clutches 118 and 119, and terminal #66 of the normally open contact #3 being connected to clutches 119 and 154 as illustrated. Thus energization of relay #3 increases the rotational speed of shaft 129 by motor 117 through speed increasing gears 120 and 121 and increases the rotational speed of shaft 164 by motor 152 through speed increasing gears 155 and 156, the gear increasing ratio of gears 120 and 121 being identical to the gear increasing ratio of gears 155 and 156, shafts 129 and 164 respectively adjusting resistors #3, #4, #13, and #14 in circuits #1, #2, #3, and #4. Shaft 129 may further rotate contact 400 through electro-magnetic clutch 125, and shaft 164 may rotate contact 401 through electro-magnetic clutch 160, contacts 400 and 401 being respectively attached to the extremity of a short arm attached to a short shaft supported by bearings 398 and 399 as illustrated. A short arm opposite contact 400 engages the two springs 402 resting against stop 403 such that contact 400 is positioned midway between the two contacts 486 when clutch 125 is not energized, and a short arm opposite contact 401 similarly engages the two springs 405 resting against stop 406 such that contact 401 is positioned midway between the two contacts 487 when clutch 160 is not energized as illustrated. Normally open contact #4 of relay #3 closes upon energization of relay #3 to connect a voltage source to terminal #63, terminal #63 being connected to normally closed contact #3 of relay #10 in series with normally closed contact #3 of relay #12 to clutch 125, terminal #63 being also connected to normally closed contact #3 of relay #11 in series with normally closed contact #3 of relay #13 to clutch 160 such that when the increased rotational speed of shafts 129 and 164 resulting from energization of relay #3 balances either circuit #1 or #3, the closing of contacts #3 of relay #10 or #11 respectively energizes either clutch 125 or 160 to respectively rotate either contact 400 or contact 401 to respectively engage contacts 486 or 487 to energize relay #41, contacts 400 and 401 being connected to terminal #68 of relay #41 and contacts 486 and 487 being connected to the voltage source energizing relay #41. Energization of relay #41 unlocks relay #3 to return shafts 129 and 164 to their normal speed of rotation, thus the described rotation of contact 400 or 401 serves to precisely balance either circuit #1 or #2 at a zero signal output depending upon the relative rotational speed of shaft 129 with respect to shaft 164 at the selected azimuth, the shaft with the greater rotational speed balancing its related circuit first, the unlocking of relay #3 further allowing contacts 400 and 401 to return to their normal midway position between contacts 486 and 487.

At a selected azimuth in the first quadrant, when the craft travels at a ground speed less than the selected speed, relays #12 and #13 are both energized to conjunctively energize relays #2 and #4 in FIGURE 30, a voltage source being connected to normally open contact #4 of relay #12 in series with normally open contact #4 of relay #13 in series with single-pole, double-throw contacts of rotary relay 301 to a primary energizing coil a of relays #2 and #4. Normally open contact #5 of relay #2 closes upon energization of relay #2 to connect a voltage source to secondary energizing coil b of relay #2 through the normally closed contact of relay #41, thus locking relay #2 in operation. A voltage source is connected to the movable contact of single-pole, double-throw contact #3 of relay #2 to de-energize electro-magnetic clutches 394 and 396 and energize electro-magnetic clutches 395 and 397 upon operation of relay #2, terminal #64 of the normally closed contact #3 being connected to clutches 394 and 396, and terminal #65 of the normally open contact #3 being connected to clutches 395 and 397 as illustrated. Thus energization of relay #2 decreases the rotational speed of shaft 129 by motor 117 through speed decreasing gears 120 and 121 and decreases the rotational speed of shaft 164 by motor 152 through speed decreasing gears 155 and 156, the gear decreasing ratio of gears 120 and 121 being identical to the gear decreasing ratio of gears 155 and 156. Normally open contact #4 of relay #2 closes upon energization of relay #2 to connect a voltage source to terminal #63, thus causing energization of either clutch 125 or 160 upon balancing of either circuit #2 or #4, the resulting rotation of contact 400 or 401 energizing relay

41 to unlock relay #2 to return shafts 129 and 164 to their normal speed of rotation when either circuit #2 or #4 is precisely balanced at a zero signal output similarly as previously described for circuits #1 and #3. Due to the previously described operation of relays 303, 321, and the direction of rotation of motors 117 and 152 at various selected azimuths, rotatable member 311 in FIGURE 29 energizes relay 301 in FIGURES 29 and 30 at any selected azimuth in the first and third quadrants such that circuits #1 and #3 in FIGURE 30 may conjunctively operate relays #3 and #5 and circuits #2 and #4 may conjunctively operate relays #2 and #4 at any selected azimuth in the first and third quadrants, whereas circuits #1 and #3 may conjunctively operate relays #2 and #4 and circuits #2 and #4 may conjunctively operate relays #3 and #5 at any selected azimuth in the second and fourth quadrants when the ground speed of the craft deviates from the selected speed.

Energization of relay #4 or #5 closes normally open contacts #7 and #8 of relay #4 or #5 in FIGURE 30 to connect a direct current voltage source energizing relay #14 thus operating the double-pole, double-throw contacts of relay #14 to rotate motor 204, the armature of motor 204 being connected to the movable contacts, a direct current voltage source being connected to the normally open contacts, and the normally closed contacts of the described double-pole, double-throw contacts being connected together to short circuit the armature of motor 204 as illustrated to provide electro-dynamic braking of motor 204 when relay #14 is de-energized. Motor 204 rotates disc 205 through any appropriate gear drive, brush #2 making contact with the slip ring electrically connected to the 350° commutator segment on disc 205 and brush #1 making contact with the commutator segment upon rotation of disc 205. Brush #2 of disc 205 is connected to contact #7 of relay #4 and contact #8 of relay #5, energization of relay #4 thus connecting the positive terminal of a direct current voltage source to brush #2 and energization of relay #5 connecting the negative terminal of the direct current voltage source to brush #2. Brush #1 of disc 205 is connected to one terminal of a secondary energizing coil b of relays #4 and #5, the other terminal of the secondary energizing coil of relay #4 being connected to the negative terminal of the direct current voltage source and the other terminal of the secondary energizing coil of relay #5 being connected to the positive terminal of the direct current voltage source. Thus energization of relay #4 or #5 causes rotation of disc 205 through one revolution to respectively lock relay #4 or #5 in operation when brush #1 makes contact with the commutator segment on disc 205. Contacts #7 and #8 of relays #4 and #5 are further connected to terminals #42 and #43 to provide a timed pulse of current to motor 167 in FIGURE 29, energization of relay #5 rotating motor 167 in one direction to either increase the speed selection means or decrease the craft's throttle depending upon the position of switch 283, and energization of relay #4 rotating motor 167 in the opposite direction to either decrease the speed selection means or increase the craft's throttle, the duration of the pulse of current to motor 167 depending upon the time brush #1 remains in contact with the commutator segment on disc 205. A voltage source is connected to normally closed contact #6 of relay #4 in series with normally closed contact #6 of relay #5 to motor 207 and electro-magnetic clutch 211 such that motor 207 adjusts variable resistor 214 from minimum to maximum resistance through the worm gear drive, gear 208, and clutch 211 when both relays #4 and #5 are de-energized, limit switch 215 disconnecting motor 207 when variable resistor 214 is adjusted to maximum resistance. A hydraulic damping piston and cylinder 203 is attached to the middle of contact arm #6 of relays #4 and #5 as illustrated in FIGURE 30' to retard the movement of contacts #6. Contacts #7 and #8 of relays #4 and #5 are further connected to electro-magnetic clutch 212 such that energization of relay #4 or #5 energizes clutch 212 to maintain the adjustment of variable resistor 214 through gears 209 and 210 as illustrated thus preventing spiral spring 213 from adjusting variable resistor 214 to minimum resistance when contacts #6 open to de-energize clutch 211, the described hydraulic damping action of contacts #6 allowing contacts #7 and #8 to close before contacts #6 open upon energization of relay #4 or #5. Upon completion of one revolution by disc 205, relay #4 or #5 is unlocked whereupon the opening of contacts #7 and #8 de-energizes clutch 212 thus allowing spiral spring 213 to adjust variable resistor 214 to minimum resistance before hydraulically damped contacts #6 close to energize clutch 211. A direct current voltage source is connected to variable resistor 214 in series with the field winding of motor 204 as illustrated, normally closed contacts #1 of relay #14 short circuiting variable resistor 214 when relay #14 is de-energized to provide maximum electro-dynamic braking of motor 204. Thus the operating speed of direct current shunt wound motor 204 operating under low load conditions as illustrated is controlled by the adjustment of resistor 214, motor 204 having minimum speed when resistor 214 is adjusted to minimum resistance and maximum speed when resistor 214 is adjusted to maximum resistance due to the effect of resistor 214 on the back E.M.F. developed by motor 204. Therefore when a long time interval occurs between successive operations of relay #4 or #5, such as when the ground speed of the craft very nearly equals the selected speed, the described adjustment of variable resistor 214 to maximum resistance provides a minimum adjustment of the speed selection means or the craft's throttle by motors 204 and 167, and when a short time interval occurs between successive operations of relay #4 or #5, such as when the ground speed of the craft deviates greatly from the selected speed, the described adjustment of variable resistor 214 to near minimum resistance provides a maximum adjustment of the speed selection means or the craft's throttle, the adjustment of variable resistance 214 being appropriate such that the increment of adjustment of the speed selection means or the craft's throttle is inversely proportional to the time interval between successive operations of relay #4 or #5. Variable resistor 214 might be connected in series with the voltage source to the normally open contacts of the double-pole, double-throw contacts of relay #14 rather than in series with the field winding of motor 204, resistor 214 then being adjusted to maximum resistance by spiral spring 213 upon de-energization of clutches 211 and 212 and adjusted to minimum resistance by motor 207 upon energization of clutch 211, or a combination of two such previously described variable resistances could be connected respectively in series with the armature and field windings of motor 205.

Normally closed contact #1 of relay #2 is connected in series with normally closed contact #1 of relay #3 to motor 220 and normally closed contact #2 of relay #2 is connected in series with normally closed contact #2 of relay #3 to motor 221 such that energization of relay #2 or #3 when the ground speed of the craft deviates from the selected speed disconnects azimuth adjusting motors 220 and 221 from respective operation by the longitude and latitude circuits. The apparatus of FIGURE 10 is somewhat similar to the apparatus of FIGURE 30, however energization of relays #2 and #4 in FIGURE 10 reverses the direction of rotation of longitude motor 117 and latitude motor 152 rather than activating gear reduction means to decrease the rotational speed of shafts 129 and 164, terminals #44 and #45 of double-pole, double-throw reversing contacts #3 and #4 being connected to the armature of motor 117 through contacts of rotatable discs 134 and 173, and terminals #45 and #46 of double-pole, double-throw reversing contacts #5 and #6 being connected to the armature of motor 152 through contacts of rotatable discs 134 and 173. Relay #1 reverses the polarity of tachometer generators rotated by motors 117 and 152 upon reversal of motors 117 and 152 by relay #2. Rotating discs 217 and 219 in FIGURE 10 further provide precise balancing of circuits #1, #2, #3, and #4 at a zero signal output when guidance switch 275 is turned off, however it is not believed that this additional feature warrants the increase in apparatus. If the ionizing voltage of tubes 226 were slightly greater than the deionizing voltage, adjustable bias resistors #9, #10, #19, and #20 in FIGURES 10 and 30 could be properly adjusted to the deionizing voltage to provide precise balancing of the longitude and latitude Wheatstone bridge circuits at a 0 signal voltage output without the need of rotating discs 134, 173, 217, 219, and locking windings *b* of relays #10, #11, #12, and #13 in FIGURE 10 and without the need of rotating contacts 400 and 401, locking winding *b* of relays #2 and #3, and relay #41 in FIGURE 30.

The dead-reckoning computer

The fundamental principle of the dead-reckoning computer having been previously described in the discussion of the automatic guidance system of FIGURE 29, details of one embodiment of a dead-reckoning computer are illustrated in FIGURES 7 and 12. In FIGURE 7 direct current, shunt wound motor 185 rotates direct current generators 186, 187, and direct current tachometer generators 188 and 189, terminals #9 and #10 of the armature winding of generator 186 providing current to the armature winding of direct current longitude motor 117, and terminals #11 and #12 of the armature winding of generator 187 providing current to the armature winding of direct current latitude motor 152 in FIGURES 10 and 30. In circuit #23 of FIGURE 12, a first resistance combination consists of variable resistor #80 in series with a fixed resistance, and in circuit #24 a second resistance combination consists of variable resistor #81 in series with a fixed resistance, a constant direct current voltage source being respectively connected across said first and second resistor combinations with reversed polarity as illustrated. The fixed resistances in said first and second resistor combinations may be respectively approximately equal to the maximum resistance of resistors #80 and #81, actual values of the resistances being selected to provide a suitable current flow through said first and second resistor combinations for the selected operating voltages. Linear potentiometers could be substituted for non-linear variable resistors #80 and #81, the fixed resistances then being eliminated and the adjustable tap of the potentiometer providing the signal voltage output. Speed selection means adjust variable resistors #80 and #81 such that the signal voltage developed by resistors #80 and #81 is directly proportional to the selected speed, the signal voltage developed by resistor #80 always being equal to the signal voltage developed by resistor #81. Speed selection dial 259 of FIGURE 36 may adjust variable resistors #80 and #81 directly through shaft 175 in FIGURE 7, clutch 174 and the illustrated gearing actually being unnecessary, and motor 167 may also adjust variable resistors #80 and #81 or the craft's throttle through clutch 170 or clutch 171 depending upon the position of constant speed switch 283 as previously described. In FIGURE 7, navigation switch 277 is illustrated as providing the voltage source to the movable contact of single-pole, double-throw constant speed switch 283, however it is obvious that it would be more appropriate for automatic guidance switch 273 to be substituted for automatic navigation switch 277 in this respect. In circuits #23 and #24, the signal voltage developed by resistors #80 and #81 are respectively connected in series with the bias voltage developed by potentiometers #82 and #83 and respectively in series with the armature winding of tachometer generators 188 and 189 to the grid and cathode of tubes 226 as illustrated, the armature of tachometer generator 188 being connected to terminals #13 and #14 and the armature of tachometer generator 189 being connected to terminals #15 and #16. The negative armature terminal of tachometer generator 188 is connected to terminal #13, and the positive armature terminal of tachometer generator 189 is connected to terminal #15 such that tubes 226 are near the critical ionizing voltage developed by potentiometers #82 and #83 when the voltage output of tachometer generators 188 and 189 respectively equal the signal voltage output of variable resistors #80 and #81. A constant direct current voltage source energizes the field windings of tachometer generators 188 and 189 such that the voltage output of tachometer generators 188 and 189 is directly proportional to the speed of motor 185. Thus when the speed of motor 185 is greater than that selected by the speed selection means, relay #27 is energized to rotate motor 249 to decrease the resistance of variable resistors 250 and 251 connected in series with the field winding of motor 185, such that the speed of motor 185 is decreased, and when the speed of motor 185 is less than that selected by the speed selection means, relay #28 is energized to rotate motor 249 to increase the resistance of variable resistors 250 and 251 until the speed of motor 185 is properly increased. The signal voltage developed by resistors #80 and #81 and similar resistors of similar resistor combinations may be automatically connected respectively into circuits #23 and #24 by sections of switch 195 of FIGURE 8 at selected destinations as indicated in FIGURE 12, rotor contacts of switch 195 being connected to circuits #23 and #24 such that each position of switch 195 connects a different set of variable resistors respectively into circuits #23 and #24 which are pre-adjusted to respective selected speeds to provide selected craft speeds automatically at selected destinations. The rotor contacts of further multi-pole, double-throw contacts of switch 283 may also be connected to circuits #23 and #24 with the rotor contacts of switch 195 then being connected through switch 283 to circuits #23 and #24 when constant speed switch 283 is turned on, switch 283 then connecting variable resistors #80 and #81 respectively into circuits #23 and #24 whenever constant speed switch 283 is turned off such that the craft's actual ground speed is properly indicated on speed selection dial 259 whenever switch 283 is turned off and the pre-adjusted speed resistors selected by switch 195 are connected into circuits #23 and #24 when switch 283 is turned on.

In circuit #19 of FIGURE 12, a third resistor combination consists of linear variable resistor #64 in series with fixed resistance #70 in series with non-linear variable resistor #66, and in circuit #20 a fourth resistor combination consists of linear variable resistor #65 in series with fixed resistance #71 in series with non-linear variable resistor #67. The armature of tachometer generator 188 is connected to terminals #13 and #14 as previously described to provide a current flow through said third resistor combination, and the armature of tachometer generator 189 is connected to terminals #15 and #16 as previously described to provide a current flow through said fourth resistor combination. The maximum resistance of linear variable resistors #64 and #65 are respectively approximately 5/4 the resistance of fixed resistors #70 and #71, non-linear variable resistors #66 and #67 being tapped resistors of small resistance, the actual value of the various resistances being selected to provide a suitable current flow through said third and fourth resistor combinations for the selected operating voltages. Azimuth selection means adjust variable resistors #64, #65, #66, and #67 in a manner to be described later such that the signal voltage developed by resistors #64 and #65 are each directly proportional to the selected speed and the cosine of the selected azimuth, the signal voltage developed by resistor #64 always being equal in magnitude but of opposite polarity to the signal voltage developed by resistor #65. The signal voltage developed by resistors #64 and #65 are respectively connected in series with the adjustable bias voltage developed by potentiometers #68 and #69 and respectively in series with the armature winding of tachometer generators 183 and 184 to the grid and cathode of tubes 226 as illustrated, the armature of tachometer generator 183 in FIGURE 30 being connected to terminals #38 and #39 in circuit #19 and the armature of tachometer generator 184 in FIGURE 30 being connected to terminals #40 and #41 in circuit #20. The negative armature terminal of tachometer generator 183 is connected to terminal #38 and the positive armature terminal of tachometer generator 184 is connected to terminal #40 such that tubes 226 are near the critical ionizing voltage developed by potentiometers #68 and #69 when the voltage output of tachometer generators 183 and 184 respectively equal the signal voltage output of variable resistors #64 and #65. A constant direct current voltage source energizes the field windings of tachometer generators 183, 184, and 408 through double-pole, double-throw reversing contacts of relay 321 such that the voltage output of tachometer generators 183, 184, and 408 is directly proportional to the speed of latitude motor 152, the polarity of the voltage output of tachometer generators 183, 184, and 408 being maintained constant upon reversal of motor 152 by relay 321. Thus when the speed of latitude motor 152 is greater than that appropriate for the selected speed and azimuth, relay #23 in FIGURE 12 is energized to rotate motor 243 to increase the resistance of variable resistors 244 and 245 connected in series with a constant direct current voltage source to the field winding of generator 187 in FIGURE 7, such that the speed of latitude motor 152 is decreased, and when the speed of latitude motor 152 is less than that appropriate for the selected speed and azimuth, relay #24 is energized to rotate motor 243 to decrease the resistance of variable resistors 244 and 245 until the speed of latitude motor 152 is properly increased.

In circuit #21 of FIGURE 12, a fifth resistor combination consists of linear variable resistor #72 in series with fixed resistance #76 in series with non-linear variable resistor #74, and in circuit #22 a sixth resistor combination consists of linear variable resistor #73 in series with fixed resistance #77 in series with non-linear variable resistor #75. The fifth and sixth resistor combinations are respectively identical to the previously described third and fourth resistor combinations except that azimuth selection means adjust variable resistors #72, #73, #74 and #75 in a manner to be described later such that the signal voltage developed by resistors #72 and #73 are each directly proportional to the selected speed and the sine of the selected azimuth, the signal voltage developed by resistor #72 always being equal in magnitude but of opposite polarity to the signal voltage developed by resistor #73. In circuit #21 a seventh resistor combination consists of linear variable resistor #84 in series with non-linear variable resistor #86 in series with fixed resistance #88, and in circuit #22 an eighth resistor combination consists of linear variable resistor #85 in series with non-linear variable resistor #87 in series with fixed resistance #89. The signal voltage output of variable resistor #72 is connected across the described seventh resistor combination and the signal voltage output of variable resistor #73 is connected across the described eighth resistor combination. The maximum resistance of linear variable resistors #84 and #85 is respectively approximately twenty times the resistance of fixed resistances #88 and #89, non-linear variable resistors #86 and #87 being tapped resistors of small resistance, the actual value of the various resistances being selected to provide a suitable current flow through said seventh and eighth resistor combinations for the selected operating voltages. In circuit #21 a ninth resistor combination consists of non-linear variable resistor #86 in series with fixed resistance #88, and in circuit #22 a tenth resistor combination consists of non-linear variable resistor #87 in series with fixed resistance #89. The craft's latitude adjusts variable resistors #84, #85, #86, and #87 in a manner to be described later such that the signal voltage developed by said ninth and tenth resistor combinations are each directly proportional to the selected speed, the sine of the selected azimuth, and the secant of the craft's latitude, the signal voltage developed by said ninth resistor combination always being equal in magnitude but of opposite polarity to the signal voltage developed by said tenth resistor combination. The signal voltage developed by the ninth and tenth resistor combinations are respectively connected in series with the adjustable bias voltage developed by potentiometers #78 and #79 and respectively in series with the armature winding of tachometer generators 133 and 132 to the grid and cathode of tubes 226 as illustrated, the armature of tachometer generator 133 in FIGURE 30 being connected to terminals #34 and #35 in circuit #21 and the armature of tachometer generator 132 in FIGURE 30 being connected to terminals #36 and #37 in circuit #22. The negative armature terminal of tachometer generator 133 is connected to terminal #34, and the positive armature terminal of tachometer generator 132 is connected to terminal #36 such that tubes 226 are near the critical ionizing voltage developed by potentiometers #68 and #69 when the voltage output of tachometer generators 133 and 132 respectively equal the signal voltage developed by the ninth and tenth resistor combinations. A constant direct current voltage source energizes the field windings of tachometer generators 133, 132, and 407 through double-pole, double-throw reversing contacts of relay 303 such that the voltage output of tachometer generators 133, 132, and 407 is directly proportional to the speed of longitude motor 117, the polarity of the voltage output of tachometer generators 133, 132, and 407 being maintained constant upon reversal of motor 117 by relay 303. Thus when the speed of longitude motor 117 is greater than that appropriate for the selected speed, the selected azimuth, and the craft's latitude, relay #25 in FIGURE 12 is energized to rotate motor 246 to increase the resistance of variable resistors 247 and 248 connected in series with a constant direct current voltage source to the field winding of generator 186 in FIGURE 7, such that the speed of longitude motor 117 is decreased, and when the speed of longitude motor 117 is less than that appropriate for the selected speed, selected azimuth, and the craft's latitude, relay #26 is energized to rotate motor 246 to decrease the resistance of variable resistors 247 and 248 until the speed of longitude motor 117 is properly decreased. Center-tapped variable resistor 227 is connected in series with the voltage source to the field winding of motor 117 and adjusted by the craft's latitude to a minimum resistance at 0° latitude with the resistance of resistor 227 appropriately increasing with north or south latitude to approximately vary the speed of motor 117 directly in proportion to the secant of the craft's latitude, thus minimizing the required adjustment of variable resistors 247 and 248. Variable resistors 244, 245, 247, 248, 250, and 251 are adjusted in a manner similarly as variable resistors #11 and #12 in FIGURE 7, although the described resistors would preferably be of the type illustrated in FIGURE 35 as described later. It may be noted that variable resistors 250 and 251 might be connected in series with the armature winding of motor 185 rather than in series with the field winding to properly control the speed of motor 185. The present state of art provides many different types of closed loop servo amplifier circuits which could be utilized to operate servo motors 243, 246, and 249 respectively from the signal output of circuits #19, #21, and #23 alone with elimination of circuits #20, #22, and #24 in FIGURE 12, however it would be essential that any such amplifier used have sufficiently high input impedance that the current flow through the input impedance would have a negligible effect on the signal voltages created by circuits #19, #21, and #23. It may also be noted that the adjustment of the described seventh and eighth resistor combinations in circuits #21 and #22 by the craft's latitude might have some effect on the current flow through variable resistors #72 and #73, however the resistance of the seventh and eighth resistor combinations could be made sufficiently large such that the current flow through the seventh and eighth resistor combinations would be negligible compared to the current flow through variable resistors #72 and #73. If it were desired to eliminate the effect of variation in current flow through variable resistors #72 and #73 entirely upon adjustment of the seventh and eighth resistor combinations by the craft's latitude, the signal voltage output of variable resistors #72 and #73 could be respectively connected to auxiliary circuits #19b and #20b (not illustrated) identically as the signal voltage output of resistors #64 and #65 is connected to circuits #19 and #20, relays similar to relays #23 and #24 operating a motor similar to motor 243 to adjust variable resistors similar to resistors 244 and 245 connected in series with the field or armature winding of motor rotating tachometer generators 183b and 184b (not illustrated) similar to tachometer generators 183 and 184, tachometer generators 183b and 184b being connected to circuits #19b and #20b identically as tachometer generators 183 and 184 are connected to circuits #19 and #20, the voltage output of tachometer generators 183b and 184b then being further connected to the seventh and eighth resistor combinations similarly as the voltage output of tachometer generators 188 and 189 are further connected to the previously described third, fourth, fifth, and sixth resistor combinations. Since the voltage output of tachometer generators 183b and 184b would then always be adjusted equal to the signal voltage output of variable resistors #72 and #73, variation in resistance of the seventh and eighth resistor combinations by the craft's latitude would have no effect on the current flow through variable resistors #72 and #73.

It may be noted that provision of motor 185, tachometer generators 188 and 189, generator 186, and generator 187 in FIGURE 7 as previously described provides a minimum of electrical energy loss in the variable resistors controlling the speed of longitude motor 117 and latitude motor 152 of the dead-reckoning computer, since the major controlling resistors are in the field circuits of generators 186 and 187 (supplying operating voltage respectively to motors 117 and 152) rather than in the armature circuits of longitude motor 117 and latitude motor 152, thus only enough voltage is generated to properly control the speed of motors 117 and 152 rather than the more conventional manner of decreasing a constant voltage source by variable resistors in the armature circuits to properly control the speed of motors 117 and 152. Also since tubes 226 may be of a type where there is no grid current when the tubes are negatively biased, utilization of tachometer generators #188 and #189 to provide voltage to terminals #13, #14, #15, and #16 in circuits #19, #20, #21, #22, #23, and #24 of FIGURE 12 as previously described (rather than applying the signal voltage output of potentiometers #80 and #81 directly across terminals #13, #14, #15, and #16) provides no load nor any change in load upon the signal output of potentiometers #80 and #81 with changes in selected azimuth or latitude of the craft, thus maximum efficiency and accuracy is provided in the dead-reckoning computer.

Conventional resolvers might be utilized in a latitude voltage means to provide a signal voltage output equal to $K(\cos A)V$ and in a longitude voltage means to provide a signal voltage output equal to $K(\sin A)(\sec \phi_C)V$ as indicated in FIGURE 29, however it is believed that the longitude and latitude voltage means previously described herein would provide greater accuracy, especially when utilizing a unique linear variable resistance means to be described.

*The azimuth selection means*

An azimuth selection dial is employed upon which is mounted all the necessary variable resistances which are a function of the selected azimuth, the variable resistors being adjusted by gear drives from the azimuth selection dial, the azimuth selection dial further rotating a disc upon which is mounted a series of commutator segments, a series of brushes engaging the commutator segments at pre-determined azimuths to energize rotary relays automatically adapting the automatic guidance system to proper operation at any selected azimuth as described in more detail in the following specification.

Figure 36:
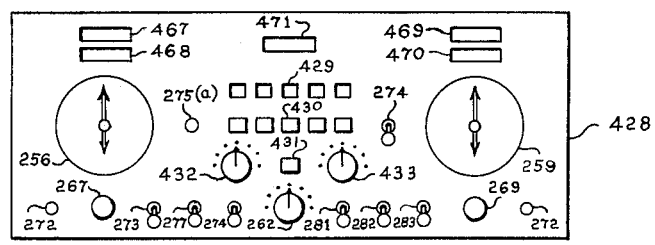
FIGURE 36 illustrates a control panel.

A cross-sectional view of the azimuth selection dial 256 in the control panel of FIGURES 13 or 36 is illustrated in FIGURE 14. Housing 294 contains conventional planetary gearing for operation of the dial indicators and other mechanisms. Gear 285 is rotated by adjusting knob 267 through idler gear 293 to provide rotation of the indicators in the same direction as knob 267. The long indicator is attached to shaft 284 of gear 285 to indicate degrees of arc. Gears 286 rotate on short shafts attached to gear 284, as illustrated, and mesh with gear teeth on the inner periphery of housing 294 to rotate gear 285 at a ratio of 360 to 1 on shaft 284. The short indicator is attached to gear 285 to indicate minutes of arc. If necessary a second planetry gear could be connected in tandem with the illustrated planetary gear to achieve the 360 to 1 gear ratio, gear 285 being attached to a second gear similar to gear 285 except that the second gear would rotate on shaft 284, the short indicator being rotated by a gear in the second planetary gear rotating on shaft 284 similar to gear 285. Gear 287 and similar gears are rotated by a gear attached to shaft 284, as illustrated, at a ratio of 4 to 1 with respect to shaft 284. Direct current, reversible motor 291 rotates adjusting knob 267 through electro-magnetic clutch 290 and also rotates adjusting knob 269 of speed selection dial 259 in FIGURE 36 through bevel gears 292, suitable shafting, and bevel gears and clutches respectively similar to gears 292 and clutch 290 located on adjusting knob 269. Toggle switch 272 moves horizontally to the right or left to turn the rotor of multi-pole, double-throw switch 320 clockwise or counterclockwise through a slotted actuating arm as illustrated in FIGURE 14, a spiral spring attached to the rotor of switch 320 returning toggle arm 272 to a neutral position midway between the right or left position upon release of pressure. A voltage source is connected to the rotor of a single-pole, double-throw section of switch 320 and the double-throw contacts connected to energize clutch 290 when toggle switch 272 is pushed either to the right or left. A direct current voltage source is further connected to double-pole, double-throw reversing contacts of switch 320 in series with motor 291 such that motor 291 rotates the indicators of dial 256 clockwise when toggle switch 272 is pushed to the right and counterclockwise when pushed to the left. Toggle switch 272 of speed selection dial 259 similarly rotates the indicators of dial 259. Thus azimuth selection dial 256 and speed selection dial 259 may be adjusted conveniently and rapidly by use of toggle switches 272, fine adjustment of the dial being respectively made by adjusting knobs 267 and 269 upon release of toggle switches 272. A cross section of FIGURE 14 is illustrated in FIGURE 17 showing the arrangement of assemblies attached to planetary gear housing 294. Assembly 295 contains variable resistors #64, #65, #66, and #67 in circuits #19 and #20 of FIGURE 12 adjusted by gear 287 in FIGURE 14. Assembly 297 contains variable resistors #72, #73, #74, and #75 in circuits #21 and #22 of FIGURE 12 adjusted by a gear identical to gear 287 in FIGURE 14. Assembly 299 contains variable resistors or a precision position transducer adjusted by shaft 284 extended through assembly 299 to provide azimuth computer 46 in FIGURES 21 and 29 with the position of azimuth selection dial 256. Assembly 208 contains variable resistors #7, #8, #17, and #18 of FIGURE 10 adjusted by a gear identical to gear 287 in FIGURE 14. Assembly 296 consists of motor 296, selsyn transmitter 382, and planetary reduction gearing 339 illustrated in FIGURE 21 rotating a gear identical to gear 287 in FIGURE 14 such that azimuth computer 46 may properly operate motor 296 to adjust azimuth selection dial 256 to the required azimuth to maintain a great circle route from the craft's position to a selected destination when switch 274 is turned on, variable resistors #94, #95, #104, and #105 being adjusted to the craft's actual longitude and latitude as illustrated in FIGURE 7, and destination variable resistors being connected to computer 46 through switch 195 as previously described and illustrated in FIGURE 29.

Another cross section of FIGURE 14 is illustrated in FIGURE 18. Mounting plate 300 is secured to the assemblies of FIGURE 17 and serves as a base for the assemblies of FIGURE 18, mounting plate 310 being further secured to the assemblies of FIGURE 18 as illustrated in FIGURE 14. Assembly 307 contains variable resistors #5, #6, #15, and #16 in circuits #1, #2, #3, and #4 of FIGURES 10 and 30, the housing of the resistors being mounted to rotate in bearing supports 322 attached to mounting plates 300 and 310 of FIGURE 14 while the rotors of the resistors are adjusted by shaft 284 extended through assembly 307. The contact arm of the rotors is connected to a slip ring contacting a brush attached to resistor housing 307, connections being made to the two ends of the resistor element and the rotor brush through slip rings and brushes 308 on the external surface of housing 307. Gear 308 is attached to housing 307 and rotated by selsyn signal generator and motor 305 in FIGURE 18 in accordance with the azimuth of the craft's longitudinal axis as determined by computer 55 in FIGURE 6. Thus resistors #5, #6, #15, and #16 are differentially adjusted by azimuth selection dial 256 and the azimuth of the craft's longitudinal axis midway between maximum and minimum resistance when the azimuth of the craft's longitudinal axis equals the selected azimuth and balance circuits #1, #2, #3, and #4 at a zero signal voltage output when the azimuth of the craft's longitudinal axis is properly adjusted to correct any deviation from the selected route established by the dead-reckoning computer. Assemblies 301, 302, 303, 304, and 321 in FIGURE 18 are identical multi-pole, double-throw rotary relays operated by small electro-dynamic torque devices 289 in FIGURE 14 consisting of a multi-pole electro-dynamic armature rotating within a multi-pole electro-dynamic field, such as in miniature electric motors, the field and armature windings having sufficiently large numbers of turns and being connected in either series or parallel to provide the necessary torque with a low current consumption. Rotary relay 301 illustrates the rotor contact which engages either of two other contacts, electrical connection being made to the rotor through either a slip ring and brush or flexible wire. Rotary relay 321 illustrates cogs attached to the relay housing and the rotor which limit the movement of the rotor to either of the two contacts. Rotary relay 303 illustrates a spiral spring attached to the rotor and relay housing which returns the rotors to a counter-clockwise direction to engage one of the sets of contacts when torque devices 289 are not energized, energization of torque devices 289 turning the rotors in a clockwise direction to engage the other sets of contacts. Shaft 284 extended through assembly 307 in FIGURE 14 rotates disc 311, a front view of which is illustrated in FIGURE 19. A voltage source is connected to brush 319 which engages a slip ring electrically connected to commutator segments 312, 313, and 314 on disc 311 as illustrated, brush 319 being attached to mounting plate 310. Brushes 316 and 317 are mounted 90° apart on base 310 to make contact with 180° commutator segment 314. Brush 317 is connected to terminal #55 to energize rotary relay 303 when azimuth selection dial 256 is adjusted clockwise from an azimuth of north through east to south while brush 316 is connected to terminal #56 to energize rotary relay 321 when azimuth selection dial 256 is adjusted clockwise from an azimuth of west through north to east, the purpose of rotary relays 303 and 321 in FIGURES 10 and 30 being previously described. Brushes 318 are mounted 180° apart on base 310 to make contact with 90° commutator segment 313, brushes 318 being connected to terminal #57 operating rotary relay 304 in FIGURE 10, relay 304 being connected to brushes of discs 134 and 173, however it is not believed that discs 134, 173, or relays 304 would be necessary as previously described.

Brushes 315 are mounted 180° apart on base 310 to make contact with 90° commutator segment 312 when azimuth selection dial 256 is adjusted from an azimuth of south to west and from an azimuth of north to east as illustrated, brushes 315 being connected to terminal #54 of torque devices 289 operating rotary relay 301. Sections of rotary relay 301 are respectively connected to linear variable resistors #64 and #65 of circuits #19 and #20 in FIGURE 12 as illustrated in FIGURE 22, contact #1 being the rotor of the resistor, contacts #2 and #3 being the ends of the resistor element and contact #4 being the rotor of rotary relay 301 such that contacts #1 and #4 constitute the terminals of the resistance. When azimuth selection dial 256 is adjusted to an azimuth of true north, relay 301 and the rotors of resistors #64 and #65 are in a position such that resistors #64 and #65 have a minimum resistance. Further sections of relay 301 are respectively connected to linear variable resistors #72 and #73 of circuits #21 and #22 in FIGURE 12 in a similar manner such that resistors #72 and #73 have a maximum resistance when azimuth selection dial 256 is adjusted to an azimuth of true north. Since gear 287 in FIGURE 14 has a ratio of four to one, when azimuth selection dial 256 approaches an azimuth of east, resistors #64 and #65 approach maximum resistance whereas resistors #72 and #73 approach minimum resistance. At an azimuth of due east the rotors of the resistors pass from one end of the resistor elements to the other end and commutator segment 312 disengages brush 315 at the same time to de-energize relay 301 such that resistors #64 and #65 maintain their maximum resistance and resistors #72 and #73 maintain their minimum resistance as azimuth selection dial 256 is adjusted through an azimuth of due east. Further sections of relay 301 are connected to non-linear variable resistors #66 and #67 of circuits #19 and #20 as illustrated in FIGURE 23, contact #1 being the rotor of the resistors and contacts #2 and #3 being taps of the non-linear resistor elements such that contacts #1 and #4 constitute the terminals of the resistance. Non-linear variable resistors #74 and #75 of circuits #21 and #22 are connected in a similar manner to further sections of rotary relay 301. The rotors of non-linear variable resistors #66, #67, #74, and #75 are at one end of their respective resistor elements when azimuth selection dial 256 is adjusted to an azimuth of true north and rotary relay 301 changes connections to their respective taps as their rotors pass from one end of the resistance elements to the other end at an azimuth of due east similarly as previously described for resistors #64, #65, #72, and #73. If necessary, non-linear variable resistors #66, #67, #72, and #73 may each have dual resistance elements, contact #2 in FIGURE 23 then being a tap of one of the dual resistance elements and contact #3 being a tap of the other dual resistance elements such that identical non-linear characteristics are maintained when the rotors of the resistors pass from one end of the resistor elements to the other end. Non-linear variable resistors #66, #67, #72, and #73 thus provide the slight variation in resistance necessary to provide the sine and cosine functions previously described. Linear variable resistors #84, #85, and non-linear tapped variable resistors #86 and #87 in circuits #21 and #22 are connected to sections of multi-pole, double-throw rotary relay 149 in FIGURE 7 similarly as resistors #72, #73, #74, and #75 are connected to sections of relay 301, resistors #84 and #85 having maximum resistance at 0° latitude, relay 149 changing connections from one end to the other end of linear variable resistor elements #84 and #85 and changing connections from a first tap to a second tap of non-linear variable resistor elements #86 and #87 as the rotor of the respective resistors passes from one end of the resistor elements to the other end at 0° latitude, a brush-connected to relay 149 making contact with a 180° commutator segment on gear 145 to energize or de-energize relay 149 at 0° latitude similarly as relay 301 is operated by disc 311. Since the rotors of resistors #11 and #12 of latitude shaft 81 would be rotated through 180° from 0° latitude to 90° latitude, resistors #11 and #12 being adjusted midway between maximum and minimum resistance at 0° latitude, two to one ratio planetary gears 150 are provided to adjust the rotors of resistors #84, #85, #86, and #87 through 360° from 0° latitude to 90° latitude. Thus the slight variation of non-linear variable resistors #86 and #87 provide the secant function previously described. Further sections of relay 301 are connected to relays #1, #2, #3, #4, and #5 in FIGURES 10 and 30 as previously described.

Further sections of rotary relay 301 are connected to variable resistors #7, #8, #17, and #18 in circuits #1, #2, #3, and #4 of FIGURE 10 as illustrated in FIGURE 22 to change connections from one end of the resistor elements to the other end as the rotors of the respective resistor elements pass from one end of the resistor element to the other end at a selected azimuth of north, east, south, and west similarly as previously described for variable resistors #64, #65, #72, and #73. Variable resistors #7, #8, #17, and #18 are non-linear such that resistors #7 and #8 increase slightly in resistance from a minimum resistance at 0° selected azimuth to 45° selected azimuth, then increase greatly in resistance at 45° azimuth, then increase slightly in resistance from 45° azimuth to a maximum resistance at 90° azimuth, whereas resistors #17 and #18 decrease slightly in resistance from a maximum resistance at 0° selected azimuth to 45° selected azimuth, then decrease greatly in resistance at 45° azimuth, then decrease slightly in resistance from 45° azimuth to a minimum resistance at 90° azimuth, the actual value of the various resistances being such that the azimuth of the craft's longitudinal axis is properly adjusted to maintain the craft on a selected route at all selected azimuths. Thus variable resistors #7 and #8 have minimum resistance and variable resistors #17 and #18 have maximum resistance at selected azimuths of north and south whereas variable resistors #7 and #8 have maximum resistance and variable resistors #17 and #18 have minimum resistance at selected azimuths of east and west in FIGURE 10 as previously described, the short-circuiting of fixed resistors #7, #8, #17, and #18 in FIGURE 30 by rotary relay 393 creating a similar variation in resistance in circuits #1, #2, #3, and #4 in FIGURE 30 as previously described. At a selected azimuth of north, it may be noted that deviation of the craft's ground speed from the selected speed would have a negligible effect on the craft's longitude, thus latitude circuits #3 and #4 would produce a signal voltage output to adjust the craft's longitudinal axis under the stated conditions whereupon longitude circuits #3 and #4 would produce a signal voltage output to properly operate relays #2, #3, #4, and #5 in FIGURES 10 and 30 to coordinate the craft's actual ground speed with the selected speed as previously described due to the adjustment of variable resistors #7, #8, #17, and #18. Upon balancing of latitude circuits #3 and #4 at a zero signal voltage output through operation of relay #2 or #3 under the stated conditions, longitude circuits #1 and #2 would then properly adjust the azimuth of the craft's longitudinal axis to maintain the craft on the selected route. The craft's actual ground speed would be similarly properly coordinated with the selected speed at all other selected azimuths due to the described adjustment of variable resistors #7, #8, #17, and #18 in FIGURES 10 and 30.

*Linear variable resistance means*

A unique form of variable resistance means is illustrated in FIGURES 25, 26, and 35 to provide a high degree of accuracy in the described craft guidance system. In FIGURES 25 shaft 349 rotates concentrically within shaft 348 and rotates shaft 348 at an appropriately increased gear ratio through conventional planetary gearing, shaft 348 adjusting a linear variable resistance 346 and shaft 349 adjusting variable resistor 347 in increments of resistance equal to the maximum resistance of resistor 346 at each revolution of shaft 348 when the rotor of resistor 346 passes from one end of the resistance element to the other end, resistors 346 and 347 being connected in series to provide a multi-turn linear variable resistance of very accurate resolution. Rotor 350 is attached to shaft 348 in a conventional manner to make contact with resistor element 346, a brush attached to the resistor housing making contact with a slip ring electrically connected to the rotor contact on rotor 350. A cross sectional view of resistor 347 is illustrated in FIGURE 26. Rotor 351 is bearing mounted on shaft 349 and its position relative to shaft 349 maintained by spring 352 attached to shaft 349 and rotor 351. A series of contacts 355 connected to resistor element 347 are spaced at identical intervals in a circle concentric to shaft 349 such that rotor contact 363 attached to rotor 351 may engage the identically spaced contacts 355, the number of contacts 355 being equal to the gear ratio between shafts 348 and 349 and the resistance between adjacent contacts 355 being equal to the maximum resistance of resistor 346. Brush #4 attached to resistor housing 347 makes contact with slip ring 364 electrically connected to rotor contact 363 of rotor 351. Lever 353 is mounted at its fulcrum by bearing supports 359 attached to the resistor housing, a circular opening being provided in lever 353 through which shaft 349 passes as illustrated. A series of identations are provided on rotor 351 in a ring concentric to shaft 349, the indentations being spaced at identical intervals corresponding to the intervals of identically spaced contacts 355 of resistor element 347 such that when the end of lever 353 is inserted into the indentations, rotor contact 363 is properly positioned on one of the contacts 355. A spring 356 between the resistor housing and one end of lever 353 provides the proper pressure to force the end of lever 353 into the indentations of rotor 351, the end of lever 353 being rounded or chisel edged to match the indentations. An arm on the other end of lever 353 extends through an opening in the resistor housing, a roller being attached to the end of the arm to engage a cam 354 on rotor 350 when rotor 350 passes from one end of resistor element 346 to the other end. Thus rotation of shaft 349 creates a tension in spring 352 which is released upon actuation of lever 353 to rotate contact 363 to engage the next adjacent contact 355 when the rotor of resistor 346 passes from one end of resistor element 346 to the other end. It is to be understood that shaft 348 could be the driven shaft to adjust shaft 349 through planetary or spur reduction gearing. Solenoids 357 and 358 provide automatic adjustment of resistors 346 and 347 to a pre-determined position. Brush #1 attached to resistor housing 347 makes a contact with slip ring 365 electrically connected to contact stop 361 on rotor 351. A voltage source is connected to switch 278 in series with solenoid 357 mounted on housing 347 and brush #1 such that when switch 278 is closed, solenoid 357 is energized to position plunger 362 to engage contact stop 361, plunger 362 being electrically connected to terminal #58 to energize solenoid 358 mounted on resistor housing 346, energization of solenoid 358 operating a plunger to engage a stop on rotor 350 similarly as plunger 362 engages stop 361. Thus resistors 346 and 347 may be accurately positioned to any pre-determined resistance.

Another embodiment of a linear variable resistor utilizing a similar principle of adjustment is illustrated in FIGURE 35. Shaft 348 adjusts linear variable resistor 346 in a conventional manner similarly as illustrated in FIGURE 25 except brush #5 attached to resistor housing 346 further makes contact with a slip ring electrically connected to contact 424 on rotor 350, contact 424 engaging a small commutator segment electrically connected to terminal #4 when rotor 350 passes from one end of resistor element 346 to the other end. Energization of electro-magnetic clutch 422 couples shaft 348 to shaft 349 either directly or through appropriate planetary gearing. Variable resistor 347 is similar to resistor 347 in FIGURES 25 and 26 except spring 352 may have two or more arms to provide better support of rotor 351, and a different mechanism for release of rotor 351 is utilized. Solenoid coil 420 is attached to resistor housing 347 concentric to shaft 349 to operate plunger 418, plunger 418 having two or more arms to engage identically spaced indentations in rotor 351 similarly as lever 353 engages indentations of rotor 351 in FIGURES 25 and 26. Pairs of vanes 419 are attached to resistor housing 347 at each arm of plunger 418 to permit translation of the arms between the pairs of vanes but preventing rotation of plunger 418 with respect to resistor housing 347. Plunger 418 is supported by a bearing on shaft 349 and the cylindrical portion of the plunger sliding within solenoid coil 420. The casing protecting solenoid coil 420 may be aluminum, and might also be soft iron with a low residual magnetic flux such that coil 420 would become a conventional electromagnet. Coil spring 421 within the cylindrical portion of plunger 418 forces the arms of plunger 418 into the indentations of rotor 351 to properly position rotor contact 363 on identically spaced contacts 355. Brush #5 is connected to electro-magnetic clutch 422 and solenoid 420 and a voltage source connected to terminal #4 such that clutch 422 and a solenoid 420 are energized when rotor 350 of resistor 346 passes from one end of resistor element 346 to the other end thus rotating contact 363 to the next adjacent contact 355. If the angle of rotation of rotor 350 from one end of resistor element 346 to the other end were equal to the angle of rotation of contact 363 between adjacent contacts 355, shaft 349 would be coupled directly to shaft 348 by clutch 422, however if the described angles were unequal, appropriate planetary gearing could be provided in unit 422 to properly position contact 363 on adjacent contacts 355. The described operation of plunger 418 accurately orients contact 363 on contacts 355 thus preventing progressive deviation of contact 363 from its proper position. Rotor 351 might be fixed to shaft 349 with elimination of spring 352 in FIGURE 35, however provision of spring 352 would eliminate any possibility of excessive binding of plunger 418 upon rotation of shaft 349. Two sets of brushes and contacts similar to brush #5 and contact 424 might also be provided to make contact with two commutator segments when rotor 350 passes from one end of resistor element 346 to the other end, one brush being connected to clutch 422 and one brush being connected to solenoid 420 such that solenoid 420 would be energized slightly before clutch 422 and de-energized slightly after clutch 422, rotor 351 then being fixed to shaft 349 with elimination of spring 352 in FIGURE 35.

Resistors #11 and #12 in FIGURE 7 may be adjusted similarly as resistors 346 and 347 in FIGURES 25 and 26, cam 387 on disc 385 attached to shaft 80 operating a lever arm 386 in FIGURE 7 similarly as cam 354 operates lever arm 353 in FIGURE 25. All similar pairs of resistors illustrated as being connected in series and adjusted by two geared shafts are operated in a similar manner and it is to be understood that all such resistors could be operated by concentric shafts identically as resistors 346 and 347 in FIGURE 25 or operated identically as illustrated in FIGURE 35. In FIGURES 25 and 35 further resistors similar to resistor 346 may be adjusted by shaft 348 and further resistors similar to resistor 347 may be adjusted by shaft 349, a connecting link being provided from lever arm 353 to operate similar levers of the additional resistors similar to resistor 347 in FIGURE 25 and brush #5 being connected to energize solenoids similar to solenoid 420 in the additional resistor similar to resistor 347 in FIGURE 35. The previously described non-linear variable resistors in assemblies 295 and 297 may be adjusted by shaft 349 in FIGURE 25, however in FIGURE 35 a shaft concentric to shaft 348 driven by planetary reduction gearing from shaft 348 would be provided to adjust the non-linear variable resistors, the linear variable resistors in assemblies 295 and 297 being adjusted as described above and illustrated in FIGURES 25 and 35.

It is to be understood that if multi-turn linear variable resistances are utilized in the azimuth selection assembly of FIGURES 14 and 17, appropriate gearing would be provided for adjustment of such multi-turn resistances. For example, if a 10 turn linear variable resistance were utilized in resistor assembly 295 of FIGURE 17, planetary gear 288 in FIGURE 14 could rotate shaft 348 in FIGURE 25 or 35 at ten times the speed of gear 287 in FIGURE 14, the shaft of gear 287 of course being coupled to planetary gear 288. When utilizing the linear variable resistance of FIGURE 35 in the resistor assembly 295, the non-linear variable resistances could then be properly adjusted by the shaft of gear 287, the non-linear variable resistances being single turn resistors. If the shaft of gear 287 in FIGURE 14 is coupled directly to shaft 348 in FIGURE 35, gear 287 might then have a gear ratio of forty to one with respect to gear 284 (for a ten turn linear variable resistance), the shaft of gear 287 being coupled to planetary reduction gear 288 to rotate one-turn non-linear variable resistors in assembly 295 at a ratio of four to one with respect to gear 284 (the rotor shaft of the non-linear variable resistors being concentric to and rotating on shaft 348).

It may be noted that if identically spaced contacts 355 were placed at one degree intervals in variable resistor 347 of FIGURES 25 and 35, a 360 turn linear variable resistor would be provided which would be smaller in dimension than a conventional 10 turn helical variable resistor and which would provide an accuracy in the guidance system of a fraction of a mile. Pairs of vanes 419 might be replaced by pairs of rollers attached to resistor housing 347 in FIGURE 35, the arms of plunger 418 passing between the respective pairs of rollers to provide greater precision without undue friction on plunger 418. It is to be understood that the described resistance between adjacent contacts 355 could be externally connected fixed resistances. Another variable resistor similar to resistor 347 and connected in series with resistors 346 and 347 could further be adjusted by resistor 347 when rotor 351 passes from one end of resistor element 347 to the other end identically as resistor 346 adjusts resistor 347, and further variable resistors could be similarly connected and adjusted to provide any desired degree of accuracy in the guidance system.

*Aerodynamic guidance of a craft leaving and re-entering the earth's atmosphere*

In the guidance circuits of FIGURES 10 and 30, longitude Wheatstone bridge circuits #1 and #2 and latitude Wheatstone bridge circuits #3 and #4 adjust the azimuth control 223 of a conventional auto-pilot through motors 220 and 221 to maintain the craft on a route selected by the dead-reckoning computer, however in FIGURE 33 longitude Wheatstone bridge guidance circuits #1 and #2 and latitude Wheatstone bridge guidance circuits #3 and #4 have been modified to also be the azimuth control circuits of a conventional auto-pilot by the addition of a variable resistor #126 adjusted by the craft's rudder as indicated by circuit #1a, motors 220 and 221 then directly adjusting the craft's rudder. Auxiliary longitude and latitude positioning circuits as indicated by circuit #1b may be activated to maintain the longitude and latitude as determined by the dead-reckoning computer identically equal to the longitude and latitude as determined by the navigation system. Prior to re-entering the earth's atmosphere, switch 195 is automatically adjusted to energize relay #42 or #43 causing calibration resistors in the longitude and latitude Wheatstone bridge guidance circuits to be short-circuited, as indicated by resistors #7, and causing activation of the auxiliary longitude and latitude positioning circuits which convert the longitude and latitude Wheatstone bridge guidance circuits to conventional azimuth control circuits of an auto-pilot. The azimuth selection dial of the dead-reckoning computer then becomes the azimuth control of an auto-pilot which is homed on a selected destination by an azimuth computer as described previously, the azimuth selection dial of the dead-reckoning computer and the aircraft's azimuth differentially adjusting resistor #5 in circuit #1a and similar resistors in the longitude and latitude Wheatstone bridge guidance circuits as described previously in the specification and drawings. When atmospheric pressure is sufficient for normal aerodynamic guidance of the craft within the design limits of the guidance system, atmospheric pressure operated switch 415 de-energizes relays #42 and #43 to de-activate the auxiliary positioning circuits and return the longitude and latitude Wheatstone bridge guidance circuits to their original circuitry. An automatic guidance switch 275a may thus energize relay #42 or #43 when the guidance switch is turned off, similarly as switch 195 energizes relay #42 or #43, such that the longitude and latitude Wheatstone bridge guidance circuits are simply converted to the normal azimuth control circuits of a conventional auto-pilot when the automatic guidance system is turned off, the auxiliary positioning circuits maintaining the dead-reckoning computer in a proper position for immediate automatic guidance whenever the guidance switch is turned back on.

A craft upon leaving the earth's atmosphere in a ballistic trajectory without means of guidance other than normal aerodynamic control surfaces would go into an orbit or partial orbit around the earth with the earth rotating with respect to the craft's orbit. Therefore the modifications indicated in FIGURE 32 are provided to adjust one of the longitude destination selection discs of FIGURE 29 when no means are provided for complete guidance of the craft while out of the earth's atmosphere. Device 409 may be any conventional static atmospheric pressure sensing element activating contacts such as contacts 411 and 412 to close an electrical circuit to a voltage source operating chronometer motor 413 when the atmospheric pressure or density is no longer sufficient to provide normal aerodynamic guidance of the craft. The illustrated pressure sensing element 409 consists of a bellows 410 within an air tight sealed chamber, the interior of the bellows being connected to the static atmospheric pressure to engage contacts 411 and 412 when atmospheric pressure is insufficient to maintain normal aerodynamic guidance of the craft. The speed of chronometer motor 413 might in addition be controlled by an electronic speed control similar to that previously described and illustrated for longitude motor 117 and latitude motor 152, a variable resistance being adjusted by a static atmospheric pressure sensing element similarly as variable resistor 392 in FIGURE 6 is adjusted by dynamic atmospheric pressure sensing element 389, the variable resistance controlling the speed of chronometer motor 413 similarly as variable resistors #80 and #81 in circuits #23 and #24 of FIGURE 12 control the speed of longitude motor 117 and latitude motor 152, the speed of chronometer motor 413 appropriately increasing to a constant speed as the craft leaves the earth's atmosphere. Thus as the craft gradually lost normal aerodynamic control, the corresponding adjustment of the longitude destination selection means in accordance with the earth's rotation with respect to the craft's orbit would enable azimuth computing means 46 in FIGURE 29 to properly adjust the azimuth selection means 256 in FIGURE 14 while the craft was out of the earth's atmosphere to maintain a great circle route to the craft's varying earthly destination to properly adjust dead-reckoning computer 482 in FIGURE 6 to properly transfer navigation to different stars when necessary. At some appropriate destination where transfer of navigation to different stars prior to re-entering the earth's atmosphere is no longer required, switch 195 in FIGURE 29 may be adjusted as previously described to connect a new pre-selected destination to azimuth computing means 46, however a static atmospheric pressure operated switch similar to switch 409 making electrical contact upon an increase in pressure could be connected in series with the destination selection discs causing the described adjustment of switch 195 such that switch 195 would not be adjusted to the new selected destination until sufficient atmospheric pressure was available for aerodynamic guidance of the craft. The destination selection discs providing the described adjustment of switch 195 upon re-entry of the craft into the earth's atmosphere could simply be adjusted in degrees of longitude and latitude with elimination of minute discs 70, 74, 72, and 76 in FIGURE 8, thus sufficiently long contact could be maintained with commutator segment 194 of the destination selection discs to provide the described adjustment of switch 195 to a new selected destination when atmospheric pressure was sufficient for aerodynamic guidance of the craft. A system of guidance reaction jets could be activated by static atmospheric pressure sensing elements when atmospheric pressure was insufficient for normal aerodynamic guidance to provide partial guidance of the craft while out of the earth's atmosphere sufficient to properly adjust the longitudinal, lateral, and yaw attitude of the craft and adjust the position of the craft to maintain a great circle route to the selected destination as determined by the longitude disc adjusted by chronometer motor 413 such that the craft's aerodynamic control surfaces would be approximately in a neutral position upon the craft's re-entering the earth's atmosphere to minimize control surface loads. Conventional auxiliary control circuit responsive to the vertical reference means of FIGURE 6 would operate reaction jets to properly control the longitudinal and lateral attitude of the craft, conventional auxiliary control circuits responsive to the azimuth of the craft's longitudinal axis and azimuth selection dial 256 would operate reaction jets to properly control the yaw attitude of the craft, and conventional auxiliary control circuits responsive to the craft's actual position as determined by the navigation means and the craft's desired position to maintain a great circle route as determined by the dead-reckoning computer would operate reaction jets to properly control the position of the craft.

Azimuth computing means 46 in FIGURE 29 would provide proper adjusting speed of azimuth selection dial 256 to prevent excessive aerodynamic loads when switch 195 connected a new selected destination to azimuth computer 46 upon the craft's re-entering the earth's atmosphere.

The craft upon re-entering the earth's atmosphere at high speed might encounter extensive skidding in the upper limits of the earth's atmosphere, especially if switch 195 were adjusted to the new selected destination while the craft were in the extreme upper limits of the earth's atmosphere, therefore FIGURE 33 illustrates modifications of the guidance system to provide proper aerodynamic guidance of the craft upon re-entering the earth's atmosphere. In FIGURES 10 and 30 device 223 becomes the craft's rudder or other azimuth adjusting means rather than the azimuth control of a conventional auto-pilot, and variable resistors #126 adjusted by the craft's rudder or other azimuth adjusting means are connected into longitude circuits #1a, #2a and latitude circuits #3a, #4a as illustrated in circuit #1a of FIGURE 33; circuits #1a, #2a, #3a, and #4a being identically as previously described in FIGURE 10 and 30 except for the described addition of variable resistors #126 and the elimination of operation of longitude motor 117 and latitude motor 152 respectively by longitude circuits #1a, #2a and latitude circuits #3a, #4a when guidance switch 275 is turned off. Variable resistors #126 are adjusted midway between maximum and minimum resistance when the craft's rudder or other azimuth adjusting means is in a neutral position, resistors #126 appropriately varying in resistance to properly balance circuits #1a, #2a, #3a, and #4a at a zero signal output when the craft's rudder or other azimuth adjusting means is properly adjusted to correct any deviation of the craft from a selected route. Rotary relays 393 are connected to short circuit resistors #7, #8, #17, and #18 as previously described and illustrated in FIGURE 30, however further relay means are provided to energize relays 393 as illustrated in FIGURE 33. A voltage source is connected to the rotor of a section of switch 195, the rotor of switch 195 being adjusted to a contact connected to one terminal of relay #42 when switch 195 connects a new selected destination to azimuth computer 46 upon re-entering the earth's atmosphere. The other terminal of relay #42 is connected to closed contacts of static atmospheric pressure operated switch 415, similar to atmospheric pressure operated switch 409, which thus energizes relay #42 upon the craft's re-entry into the earth's atmosphere. One of the energizing terminals of relay 393 is connected in series with normally closed contact #5 of relay #42 in series with normally closed contact #4 of relay #43 to terminal #69 of tube 226 in FIGURE 30 such that energization of relay #42 or #43 prevents operation of relay 393 by tube 226. A voltage source is connected to normally open contact #3 of relay #42 to energize relay 393 upon energization of relay #42. The operating voltage source of latitude circuits #3a and #4a is connected in series with normally closed contact #4 of relay #42 such that energization of relay #42 disconnects the operation of latitude circuits #3a and #4a. The operating voltage source of longitude circuits #1a and #2a is connected in series with normally closed contact #3 of relay #43 such that energization of relay #43 disconnects the operation of longitude circuits #1a and #2a. Circuit #1b in FIGURE 33 is a conventional Wheatstone bridge circuit capable of energizing relay #44 similarly as previously described. Variable resistors #1b and #3b in circuit #1b are respectively identical to variable resistors #1a and #3a in circuit #1a, variable resistors #1a and #1b being identically adjusted to the actual longitude of the craft as determined by the navigation system, and variable resistors #3a and #3b being identically adjusted to the desired longitude of the craft as determined by the dead-reckoning computer as previously described. Normally open contacts #1 and #2 of relay #44 are connected to a direct current voltage source and the armature of longitude motor 117 to rotate motor 117 upon energization of relay #44 as illustrated. A corresponding circuit #2b similar to circuit #1b is provided to rotate longitude motor 117 in the opposite direction to that provided by energization of relay #44, variable resistors #2b and #4b in circuit #2b being respectively identical to variable resistors #2a and #4a in circuit #2a, variable resistors #2a, #2b and #4a, #4b being respectively adjusted similarly as variable resistors #1a, #1b and #3a, #3b. Similar latitude circuits #3b and #4b similarly operate latitude motor 152 as longitude circuits #1b and #2b operate longitude motor 117. Terminal #71 in FIGURE 30 is connected to normally closed contact #1 of relay #42 in series with normally closed contact #1 of relay #43 to one armature terminal of motor 117 and terminal #70 in FIGURE 30 is connected to normally closed contact #2 of relay #42 in series with normally closed contact #2 of relay #43 to the other armature terminal of motor 117, switch 275b in FIGURE 30 then being eliminated and contacts #7 and #9 of switch 275b then being operated by guidance switch 273. Terminals #72 and #73 in FIGURE 30 are similarly connected through normally closed contacts of relays #42 and #43 to the armature terminals of latitude motor 152, switch 275c in FIGURE 30 then being eliminated and contacts #7 and #9 of switch 275c then being operated by guidance switch 273. A direct current voltage source is connected through normally open contact #6 of relay #42 and normally open contact #5 of relay #43 to Wheatstone bridge circuits #1b, #2b, #3b, and #4b such that energization of relay #42 or #43 provides operation of circuits #1b, #2b, #3b, and #4b. Thus when relay #42 is energized upon the craft's re-entry into the earth's atmosphere, longitude motor 117 and latitude motor 152 are disconnected from operation by the dead-reckoning computer and are respectively operated by longitude circuits #1b, #2b and latitude circuits #3b, #4b to balance circuits #1b, #2b, #3b, and #4b at a zero signal voltage output which in effect maintains a constant resistance in the upper legs of Wheatstone bridge circuits #1a, #2a, #3a, and #4a. Since energization of relay #42 also short circuits resistors #7 and #8 in circuits #1a and #2a, circuits #1a and #2a thus become conventional azimuth control circuits similar to that of a conventional auto-pilot, adjusted by azimuth selection dial 256 to the proper azimuth for a great circle route from the craft's instantaneous position to the selected destination. Thus the craft upon entering the low density upper limits of the earth's atmosphere at high speed may skid a considerable distance in maneuvering toward the selected destination without exceeding the limit of adjustment of the guidance circuits, the guidance circuits merely serving to home the craft on the selected destination regardless of the craft's position. When the atmospheric pressure or density is sufficient to maintain normal aerodynamic guidance without excessive skidding, the contacts of atmospheric pressure switch 415 open to de-energize relay #42 to convert circuits #1a, #2a, #3a, and #4a to normal guidance circuits preventing any deviation of the craft from a great circle route to the selected destination. A manually operated double-throw switch 275a, similar to switch 195, could also be provided which when in a neutral position energizes neither relay #42 nor #43. Further normally open contacts of switch 275a could either be provided to short circuit atmospheric pressure switch 415 upon operation of switch 275a, or atmospheric pressure switch 415 could be eliminated in a craft which did not leave the earth's atmosphere. Thus switch 275a could be operated to either energize relay #42 to convert longitude circuits #1a and #2a to conventional azimuth control circuits of an auto-pilot or energize relay #43 to convert latitude circuits #3a and #4a to conventional azimuth control circuits of an auto-pilot, energization of relay #43 causing de-energization of relay 393 to short circuit resistors #17 and #18 in circuits #3a and #4a. Further contacts of guidance switch 273 in FIGURE 6 could also be similarly provided to energize relay #42 in FIGURE 33 when guidance switch 273 was turned off, thus maintaining longitude motor 117 and latitude motor 152 in a proper position for immediate automatic guidance when guidance switch 273 was turned on, and further contacts of guidance switch 273 could also disconnect motors 220 and 221 in FIGURES 10 and 30 as previously mentioned, disconnect servo means adjusting the craft's ailerons from device 223, and disconnect servo means adjusting the craft's elevators from the auto-pilot system when guidance switch 273 was turned off, thus permitting normal manual operation of the craft's controls when guidance switch 273 was turned off. Further rotor contacts of switch 195, switch 275(a), or switch 273 could also be connected to circuits #1a, #2a, #3a, and #4a to replace resistor combinations #1a and #3a, #2a and #4a, #11a and #13a, and #12a, and #14a respectively by appropriate fixed resistances upon energization of relay #42 or #43 by switch 195, 275(a), or 273 thus perhaps eliminating some error in adjustment of the said resistor combinations to a constant resistance by circuits #1b, #2b, #3b, and #4b.

*Position and route indicator*

In some cases it is necessary that a pilot have at his disposal a selection of different maps or types of maps, perhaps some of a limited area in magnified detail, etc., therefore an apparatus is illustrated in FIGURE 29 enabling a pilot to conveniently and rapidly select such maps. A translucent projection screen is provided in the pilot's compartment upon which conventional projection means may project a series of maps, the projector being positioned on the opposite side of the screen from the pilot. Conventional precision positioning means may be utilized to accurately position the map film in the projector through chart selection means. A craft position projector 379 and route projector 380 are further located on the opposite side of the projection screen from the pilot, the position projector and route projector being adjustable horizontally and vertically with respect to the projection screen by longitude and latitude servo means responsive to the craft's actual longitude and latitude as determined by the navigation system. The chart selection means further adjusts multi-pole, multi-position switch 262 in accordance with the selected chart to connect appropriate scale and calibration resistances into the longitude and latitude servo means, the scale and calibration resistance means being pre-adjusted such that position projector 379 properly indicates the craft's position on the selected chart and route projector 380 properly indicates the craft's route from the indicated position on the selected chart, azimuth selection means 256 rotating the route projector 380 in accordance with the selected route.

In determining a selected route to a selected destination without the aid of azimuth computer 46, it would simply be necessary for the pilot to adjust azimuth selection dial 256 until the craft's projected route intersected the desired destination on the projected map selected by map selector switch 262.

The mechanism for adjustment of position projector 379 and route projector 380 with respect to the projected map is illustrated in more detail in FIGURES 27 and 28. Assembly 367 is adjustable horizontally on supporting frame 366 by selsyn signal generator and motor 370 attached to the under side of assembly 367 to rotate gears meshing with gear racks 369 on the upper and lower channels of frame 366, bearings attached to the under side of assembly 367 supporting the adjusting shafts of motor 370. Assembly 367 is supported on frame 366 by rollers attached to assembly 367 rolling on the upper and lower channels of frame 366 and the gears meshing with gear racks 369. Assembly 374 is adjustable vertically on assembly 367 by selsyn signal generator and motor 377 attached to the upper side of assembly 374 rotating gears meshing with gear racks 378 on each side of assembly 367, the adjusting shaft being supported by bearings attached to the under side of assembly 374 and rotated either directly or through appropriate gears, such as gears 375 and 376, by motor 377. Assembly 374 is supported on assembly 367 by rollers 372 attached to assembly 374 rolling on the under side of assembly 367, rollers 373 attached to assembly 374 rolling on parallel bars 371 attached perpendicular to the under surface of assembly 367 as illustrated, and the gears meshing with gear racks 378. The rollers attached to assembly 367 are arranged to support assembly 367 on frame 366 similarly as the rollers attached to assembly 374 are arranged to support assembly 374 on assembly 367. Position projector 379 is attached to the upper surface of assembly 374 and may consist of conventional projection means such as a conventional light source, conventional reflector, and conventional lens system to focus light rays in a small diameter circle on the projected map to indicate the craft's position. Route projector 380 is supported on the upper surface of assembly 374 by bearings and rotated by selsyn signal generator and motor 381 similarly as frame 33 is supported and rotated on mounting plate 47 in FIGURE 4, brushes making contact with slip rings attached to the adjusting shaft to provide a voltage to the light source in a conventional manner, the axis of rotation of route projector 380 intersecting the craft's indicated position on the projected map. Route projector 380 may consist of conventional projection means such as a conventional light source, conventional reflector and lenses to provide parallel rays of light through a radial slit extending from the axis of rotation of route projector 380 to the cylindrical housing of projector 380, and a conventional lens system to project the radial slit on the projected map with appropriate magnification to indicate the craft's route from the craft's position on the projected map. The maps might be projected on the projection screen in color and the craft's position and route projected on the screen in a contrasting color to clearly indicate the craft's position and route on the projected map.

Positioning circuits #15 and #16 in FIGURE 24 are similar to positioning computer circuits #7 and #8 in FIGURE 12 and serve to properly position assembly 367 on frame 366 in FIGURES 27 and 28, circuits #15 and #16 operating motor 342 to adjust linear variable resistors #98 and #99 to balance circuits #15 and #16 at a zero signal output, motor 342 further rotating selsyn signal transmitter 343 to properly adjust selsyn signal generator and motor 370 through phase sensitive amplifying means in a conventional manner. Linear positioning variable resistors #94 and #95 in circuits #15 and #16 are adjusted by the craft's longitude as determined by the navigation means, identical scale variable resistors #96 and #97 are identically adjusted by scale selection means in accordance with the scale of a selected map and connected into circuits #15 and #16 by multi-pole, multi-position switch 262 as illustrated, and linear calibration variable resistors #92 and #93 are connected into circuits #15 and #16 by switch 262 as illustrated, rotor contacts of switch 262 being connected to circuits #15 and #16 such that each position of switch 262 connects a different set of pre-adjusted scale and calibration variable resistances into circuits #15 and #16. Scale variable resistances #96 and #97 appropriately decrease in resistance with increasing scale of the selected maps.

Positioning circuits #17 and #18 in FIGURE 24 are similar to circuits #15 and #16 and serve to properly position assembly 374 on assembly 364, circuits #17 and #18 operating motor 344 to adjust linear variable resistors #110 and #111 to balance circuits #17 and #18 at a zero signal output, motor 344 further rotating selsyn signal transmitter 345 to properly adjust selsyn signal generator and motor 377 in a conventional manner, however identical scale variable resistors #108 and #109 are connected into the lower legs of circuits #17 and #18 as illustrated, resistors #108 and #109 being center-tapped and adjusted by the craft's latitude as determined by the navigation means to provide minimum resistance at 0° latitude and appropriately increase in resistance with latitude to properly position assembly 374 on assembly 367 in accordance with rectangular coordinates of longitude and latitude. Linear positioning variable resistors #104 and #105 are adjusted by the craft's latitude as determined by the navigation means, identical scale variable resistors #106 and #107 are identically adjusted in accordance with the scale of the selected maps and connected into circuits #17 and #18 by switch 262, and linear calibration variable resistors #102 and #103 are connected into circuits #17 and #18 by switch 262 similarly as previously described for circuits #15 and #16. Thus the different sets of calibration and scale variable resistances may be respectively pre-adjusted to the selected maps such that the craft's actual position and route are properly indicated on any selected map.

The control panel

A control panel 428 with a central selective system for setting various values into the navigation control is illustrated in FIGURE 36. Azimuth selection dial 256 and speed selection dial 259 have dial pointers as illustrated and previously described for convenient and rapid establishment of a selected azimuth and speed, toggle switches 272 operating an electric motor 291 as previously described to rapidly adjust dials 256 and 259, knobs 267 and 269 respectively providing fine adjustment of dials 256 and 259 upon release of toggle switches 272. Speed selection dial 259 may be coupled to directly adjust speed selection resistors #80 and #81 in FIGURE 7 as previously described. Rectangular openings 469 and 470 in panel 428 respectively provide visual indication of the craft's latitude in degrees and minutes on horizontal drum dials 472 and 473 in FIGURE 37, drums 472 and 473 being rotated by two concentric shafts from planetary gearing 434 in accordance with the craft's latitude as determined by the navigation system. Rectangular openings 467 and 468 in panel 428 similarly provide visual indication of the craft's longitude in degrees and minutes as determined by the navigation system. If desired, conventional computing means could be provided to indicate the distance to a selected destination through rectangular opening 471 in a similar manner. Toggle switch 273 provides for turning the automatic guidance system on or off, toggle switch 277 provides for turning the automatic navigation system on or off, toggle switch 274 provides for initial orientation of the star tracker to the selected star as previously described and might also be used for dead reckoning navigation when turned on. Toggle switch 281 provides for turning the position projector 379 on or off, toggle switch 282 provides for turning the route projector 380 on or off, and toggle switch 283 provides for either automatic adjustment of speed selection dial 259 to the craft's actual ground speed or automatic adjustment of the craft's ground speed to that selected by dial 259. Toggle switch 275(a) provides for conversion of the automatic guidance circuits to azimuth control circuits of a conventional auto-pilot as previously described, and toggle switch 274 provides for turning azimuth computer 46 on or off. Normally open contacts of switch 275(a) could be connected to relay #39 and contact #2 of relay #38, similarly as illustrated for switch 273 in FIGURE 6, such that when switch 275(a) were operated to convert the guidance circuits to azimuth control circuits of a conventional auto-pilot, relay #39 would be energized upon temporary interception of radiant energy to the star tracker to properly maintain navigation and orientation of the star tracker with the selected star through the dead-reckoning computer as previously described. Normally closed contacts of relay #39, similar to contacts #4, would be provided to disconnect longitude motor 117 and latitude motor 152 from respective operation by longitude circuits #1b, #2b and latitude circuits #3b, #4b in FIGURE 33, and normally open contacts of relay #39, similar to contacts #3, would be provided to connect terminals #70, #71 and terminals #72, #73 respectively to the armature winding of longitude motor 117 and latitude motor 152 upon energization of relay #39 such that normal dead-reckoning computer operation of motors 117 and 152 would be provided upon energization of relay #39 to properly maintain navigation and orientation of the star tracker with the selected star. If a star tracker similar to that illustrated in FIGURE 34 were utilized, normally closed contacts of a first relay operated by photo-cell 238 would be connected in series with normally closed contacts of a second relay operated by photo-cell 239 to a voltage source and relays 202 and #38 such that de-energization of both the described first and second relays upon temporary interception of radiant energy to the star tracker would cause energization of relays 202 and #38 as indicated in FIG. 6. Thus regardless of the position of switches 275(a) or 273, proper navigation and orientation of the star tracker with the selected star would be maintained by the dead-reckoning computer upon temporary interception of radiant energy to the star tracker.

Figure 37:
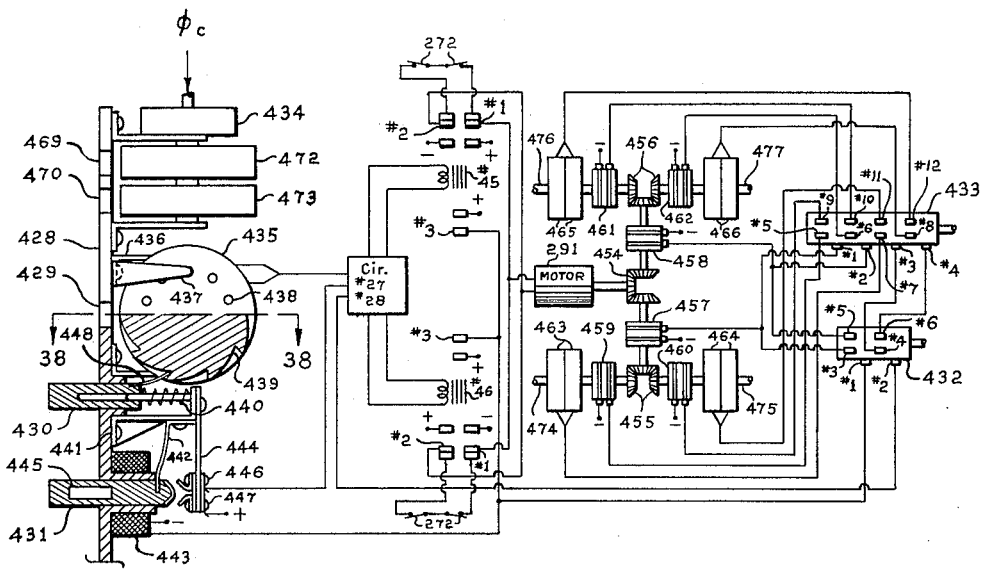
FIGURE 37 illustrates the mechanism by which various data is inserted into the navigation and guidance system through the control panel of FIGURE 36.
Figure 38:
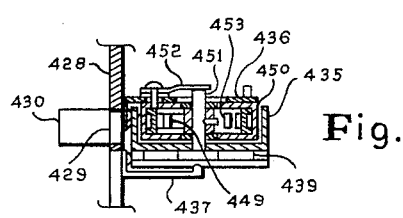
FIGURE 38 is a cross-sectional view of the mechanism of FIGURE 37.

A partial cross-sectional view of control panel 428 illustrating details of the central selective system is illustrated in FIGURE 37. Rectangular push button 430 slides in a rectangular opening of panel 428 to operate a pawl 448 engaging teeth 439 in a ratchet wheel on vertical drum dial 435 to rotate dial 435, digital numbers 0 through 9 being provided on the surface of drum 435 which are visible through rectangular opening 429 in panel 428, rotation of drum dial 435 adjusting a variable resistance in a manner to be described. Bracket 441 is attached to panel 428 to support a guiding rod upon which push button 430 slides as illustrated, spring 440 returning push button 430 to an outward limiting position when pressure is released from push button 430 such that pawl 448 engages the next tooth in the ratchet wheel. A semispherically rounded end of spring 437 fits into matching semi-spherical depressions in the side of drum dial 435, spring 437 being attached to panel 428 such that spring 437 properly positions the digits on drum dial 435 within the rectangular opening 429. A partial cross section through the drum dial 435 and variable resistor 450 is illustrated in FIGURE 38. Bracket 436 is attached to panel 428 to support variable resistor 450 and drum dial 435 in proper position on panel 428 such that the digits on drum dial 435 are visible through rectangular opening 429. Rotor shaft 451 of variable resistor 450 is attached to the center of drum dial 435, spring contact 452 being attached to the resistor housing or bracket 436 to make contact with the end of rotor shaft 451, spring contact 452 being properly insulated from its mounting to constitute the rotor terminal of variable resistor 450. Rotor brush 449 is attached to rotor shaft 451 to make contact with identically spaced contacts 453 connected to the resistance element of resistor 450 such that push button 430 may adjust resistor 450 in identically equal increments of resistance. Depressions 438 might be located on drum dial 435 to provide respective contact of brush 449 on one, two, three, or more adjacent contacts 453, corresponding to a similar number of digits, with a single push of push button 430 thus providing convenient and rapid adjustment of resistor 450. A similar push button 430, rectangular opening 429, drum dial 435, and variable resistor 450 is provided for each digit of selected degrees and minutes as illustrated in FIGURE 36, all the variable resistances being connected in series and appropriately varying respectively in units of 10, 100, 1,000, 10,000, and 100,000 ohms resistance. For example, a setting of 156 degrees, 30 minutes might be represented by a total adjusted resistance of 156,500 ohms, the degrees being represented by thousands of ohms, 30 minutes being one half a degree, and therefore 30 minutes being represented by the corresponding fraction of 1000 or 500 ohms. Obviously the minute resistance drums could appropriately vary in fractional increments of resistance such that the digits on the minute drums would read directly in minutes of angle, the digits on the degree resistance drums of course reading directly in degrees of angle. Rows of push buttons operated similarly as the keys of an adding machine might be utilized to make electrical connection to appropriate fixed resistances, however the described selection means would occupy a minimum of space on the control panel. The total resistance of the selection dials is then connected into Wheatstone bridge positioning circuits #27 and #28 to accurately position any desired device similarly as previously described circuits #27 and #28 respectively operating relays #45 and #46 to respectively rotate motor 291 in opposite directions of rotation through double-pole, double-throw contacts #1 and #2 of the said relays. The armature of direct current motor 291 is connected to the movable contacts #1 and #2 of relays #45 and #46, the normally closed contacts #1 and #2 of the said relays being short circuited through normally closed contacts of toggle switch 272 of dial 256 in series with normally closed contacts of toggle switch 272 of dial 259 to provide electro-dynamic braking of motor 291 upon de-energization of relay #45 or #46, operation of motor 291 by toggle switches 272 as previously described disconnecting the described electro-dynamic braking of motor 291 until toggle switches 272 are released to their neutral position. A normally closed single-pole single-throw contact operated by relay #45 would be connected in series with the short-circuiting of motor 291 by relay #46, and a normally closed single-pole single-throw contact operated by relay #46 would be connected in series with the short-circuiting of motor 291 by relay #45 (similarly as indicated by the normally closed contacts of switch 272 in FIGURE 37) to disconnect the electro-dynamic braking of motor 291 whenever either relay #45 or #46 is energized by circuit #27–#28. Rectangular push button 431 slides in a rectangular opening of panel 428 to short circuit terminals 446 and 447 when depressed, spring 442 being attached to bracket 441 to return push button 431 to an outward limiting position, contact arm 444 also being attached to bracket 441 as illustrated. An operating voltage source is connected through terminals 446 and 447 to operate circuits #27 and #28 when push button 431 is depressed, the resulting energization of relays #45 or #46 closing normally open contacts #3 of relay #45 or #46 to connect a voltage source energizing solenoid 443 to lock push button 431 in a depressed position until circuits #27 and #28 are properly balanced at a zero signal output. Soft iron core 445 embedded in push button 431 provides the described locking of push button 431 in a depressed position by a solenoid 443. Motor 291 may respectively rotate bevel spur gears 455 or 456 through bevel spur gears 454 and either electromagnetic clutches 457 or 458, spur gears 455 adjusting either linear variable resistors 463 and shaft 474 or linear variable resistors 464 and shaft 475 respectively through electromagnetic clutches 459 or 460, and spur gears 456 adjusting either linear variable resistors 465 and shaft 476 or linear variable resistors 466 and shaft 477 respectively through electro-magnetic clutches 461 or 462. Normally open contacts #3 of relays #45 and #46 are connected to rotor contact #1 of a section of multi-pole, multi-position selector switch 432, contact #3 of switch 432 being connected to clutch 457 and rotor contact #1 of multi-pole, multi-position selector switch 433, contact #5 of switch 433 being connected to clutch 459, contact #9 of switch 433 being connected to clutch 460, contact #5 of switch 432 being connected to clutch 458 and rotor contact #2 of switch 433, contact #6 of switch 433 being connected to clutch 462, and contact #10 of switch 433 being connected to clutch 461 as illustrated. Rotor contact #1 of switch 432 engages either contact #3 or #5, rotor contact #1 of switch 433 engages either contact #5 or #9, and rotor contact #2 of switch 433 engages either contact #6 or #10, therefore when switch 432 is adjusted counterclockwise to energize clutch 457 upon energization of relay #45 or #46, shaft 474 and resistors 463 are adjusted by motor 291 when switch 433 is adjusted counter-clockwise to energize clutch 459, and shaft 475 and resistors 464 are adjusted by motor 291 when switch 433 is adjusted clockwise to energize clutch 460. Similarly when switch 432 is adjusted clockwise to energize clutch 458 upon energization of relay #45 or #46, shaft 477 and resistors 466 are adjusted by motor 291 when switch 433 is adjusted counter-clockwise to energize clutch 462, and shaft 476 and resistors 465 are adjusted by motor 291 when switch 433 is adjusted clockwise to energize clutch 461. Resistors 463, 464, 465, and 466 are similarly connected into positioning circuits #27 and #28, rotor contacts of switch 432 similar to contact #2 being connected to circuits #27 and #28, rotor contacts of switch 433 similar to contacts #3 and #4 being respectively connected to contacts of switch 432 similar to contacts #4 and #6, and contacts of switch 433 similar to contacts #7, #11, #8, and #12 being respectively connected to resistors 463, 464, 477, and 476 such that the set of resistors being adjusted by motor 291 are connected into positioning circuits #27 and #28 to balance circuits #27 and #28 at a zero signal output when the resistance of said resistors equals the total resistance of the selection dials 435. Thus switch 432 may be utilized for setting the longitude and latitude of a selected destination, and switch 433 may be utilized to set any number of selected destinations into the control system, linear variable resistors of the type illustrated in FIGURE 35 being adjusted by the desired parameter, the described linear variable resistors being connected into positioning circuits #27 and #28 of FIGURE 37 and adjusted to a desired value by the central selective system of FIGURES 36 and 37 similarly as variable resistors 463, 464, 465, and 466 in FIGURE 37. Any other desired variable such as sidereal hour angle and declination of various selected stars may be set into the control in a similar manner, the selection dials 435 being adjusted to the desired value, switches 432 and 433 being adjusted to the desired variable, and push button 431 then being depressed to set the desired variable into the navigation control, push button 431 popping out when the desired variable has been properly set into the control system.

Selection dials 435 may be also used to select desired altitudes at selected destinations through utilization of positioning circuits #13 and #14 in FIGURE 20. Since computer 55 in FIGURE 6 determines a horizontal reference with respect to the earth's surface, conventional computing means may be utilized in computer 55 to determine the attitude of the craft's longitudinal axis with respect to the earth's surface and adjust linear variable resistor 328 in circuits #13 and #14 accordingly, resistor 328 being adjusted midway between maximum and minimum resistance when the craft's longitudinal axis is parallel to the earth's surface. Linear variable resistors 327 or any similar resistors may be connected into circuits #13 and #14 by switch 195 at selected destinations, rotor contacts of switch 195 being connected to circuits #13 and #14. Circuits #13 and #14 operate relays #32 and #33 as previously described to rotate motor 329 in the proper direction to properly adjust variable resistors #90, #91, and the horizontal control surfaces of the craft through shaft 388. Circuits #13 and #14 are then properly balanced by resistors #90 and #91 as the craft's longitudinal axis is adjusted to an attitude with respect to the earth's surface determined by resistors 327 or similar resistors whereupon the elevator control surfaces will have a zero angle of attack. In the guidance of a craft in a ballistic trajectory, resistances 327 may be connected into circuits #13 and #14 by switch 195 at take-off which are adjusted by conventional computing means in accordance with a proper function of the craft's acceleration, velocity, and selected range, while at some pre-determined destination as the craft re-enters the earth's atmosphere switch 195 may connect resistors into circuits #13 and #14 adjusted by conventional computing means to maintain a proper glide path to reach the selected destination at a selected altitude. In the guidance of a conventional aircraft, any conventional altitude determining means may be used in conjunction with positioning circuits #13a and #14a (not illustrated) similar to circuits #13 and #14 such that circuits #13a and 14a are balanced by linear variable resistors adjusted to a selected altitude and by linear variable resistors adjusted to the actual altitude of the craft, circuits #13a and #14a operating relays #32a and #32a (not illustrated) similarly as circuits #13 and #14 operate relays #32 and #33. Normally closed double-pole, double-throw contacts of relay #32a are connected in series with normally closed double-pole, double-throw contacts of relay #33a to connect proper fixed resistances into circuits #13 and #14 which maintain the craft's longitudinal axis parallel to the earth's surface when relays #13a and #14a are de-energized. Normally open double-pole, double-throw contacts of relay #13a connect fixed resistances into circuits #13 and #14 upon energization of relay #13a to maintain the craft's longitudinal axis in a proper angle of climb, and normally open double-pole, double-throw contacts of relay #14a connect fixed resistances into circuits #13 and #14 upon energization of relay #14a to maintain the craft's longitudinal axis in a proper angle of glide until the craft's actual altitude equals the craft's selected altitude, switch 195 being utilized to connect variable resistors pre-adjusted to selected altitudes into circuits #13a and #14a rather than into circuits #13 and #14 at selected destinations.

Variable resistors #1 and #2 in FIGURE 7 could be initially adjusted to a midway position between maximum and minimum resistance by the central selective system of FIGURE 36, variable resistors #3 and #4 then being also initially adjusted to a midway position between maximum and minimum resistance upon operation of switch 275(a) in FIGURE 36. However, it would be more appropriate that variable resistors #1, #2, #45, #46, #11, #12 and all similar resistors be of the type illustrated in FIGURE 35, gear 113 in FIGURE 7 then adjusting the rotor of resistors #45 and #46 and gear 130 adjusting the resistor housing of resistors #45 and #46 similarly as previously described and illustrated, gear 180 adjusting the rotor of resistors #1 and #2 and gear 130 also adjusting the resistor housing of resistors #1 and #2 similarly as described for resistors #45 and #46, gear 144 adjusting the rotor of resistors #11 and #12 and gear 165 adjusting the resistors housing of resistors #11 and #12 similarly as described for resistors #45 and #46. Variable resistors #3, #4, #13, and #14 would then be eliminated, clutches 91 would be eliminated, and the rotor of resistors #1 and #2 would simply be adjusted to the initial longitude of the craft, variable resistors #1, #2, #11, and #12 then being initially adjusted midway between maximum and minimum resistance upon operation of switch 275(a) when such described variable resistors were utilized in circuits #1a, #2a, #3a, #4a, #1b, #2b, #3b, and #4b of FIGURE 33 similarly as previously described and illustrated. Variable resistors #1 #2, #11, and #12 would then continue to be adjusted midway between maximum and minimum resistance at all times when the craft were on the selected route as determined by the dead-reckoning computer and the craft's ground speed equalled the selected speed. Since gear 130 in FIGURE 7 would then adjust the resistor housing of resistors #45 and #46 to the craft's longitude, gear 113 in FIGURE 7 adjusting the rotor of variable resistors #45 and #46 would then also adjust the rotor of a linear variable resistor of the type illustrated in FIGURE 35 connected into positioning circuits #27 and #28 in FIGURE 37 by the central selective system of FIGURES 36 and 37, such that the central selective system of FIGURES 36 and 37 could be utilized to initially adjust gear 113 to Greenwich Meridian Time at the start of the operation, chronometer motor 108 in FIGURE 7 maintaining proper adjustment of gear 113 with respect to time as previously described. Variable resistors #45 and #46 would then be properly adjusted in resistance such that positioning circuits #9 and #10 in FIGURES 6 and 12 would properly orient the star follower 5 with the Sun or any selected star upon initial operation of the system or during automatic transfer of navigation to a different star as previously described. The hours of Greenwich Meridian Time would then simply be represented by digits of from 0 to 24 and the hour and minutes set by push buttons 430. The hours of the day would then simply be represented by digits of from 0 to 24 and the hour and minutes set by push buttons 430. The resistor housing of resistors #45 and #46 could also be adjusted by gear 180 rather than by gear 130 thus perhaps eliminating some error in the adjustment of resistors #45 and #46 since the craft's desired longitude as determined by gear 130 would not always be precisely equal to the craft's actual longitude as determined by gear 180. Shaft 69 in FIGURE 6 could then also be initially adjusted to Greenwich Meridian Time similarly as gear 113 in FIGURE 7, although adjustment of gear 113 to Greenwich Meridian Time would be the preferred manner of operation as previously described.

It may be noted that in the event a series of artificial satellites orbiting in the equatorial plane of the earth at a constant position with respect to the longitudinal rotation of the earth were utilized for navigation as previously described, differentiation of the position of gimbal ring 8 in the star tracker of FIGURE 6 with respect to time to determine longitude would be unnecessary, therefore under the stated conditions all elements adjusted by chronometer motor 108 in FIGURES 6 and 7 would remain stationary or fixed in position, such that chronometer motor 108 could simply be stopped or eliminated.

Some modification of the present invention might be made without departing appreciably from the basic fundamental principle of the invention. For example, the earth's magnetic lines of force might be replaced as a reference for determining true north by a second tracking mechanism similar to FIGURES 1 and 2 tracking a polar star such as the north star. A star tracking device similar to tracking device 5 would then be mounted in a second tracking mechanism similar to FIGURES 1 and 2 with gimbal ring 6 being replaced by the second star tracking device such that the second star tracking device could simply be aligned in azimuth and altitude to the north star. A positioning circuit similar to circuits #9 and #10 in FIGURE 12 would then be employed to initially adjust the altitude of the second star tracking device with despect to gimbal ring 2b in accordance with the craft's latitude, the second star tracking device thus being adjusted parallel to the plane of ring 2b at 0° latitude and perpendicular to the plane of ring 2b at 90° latitude. The earth's magnetic field and computer 55 would serve to initially orient the frame of the second tracking mechanism with respect to true north identically as frame 1 in FIGURE 6 is oriented after which a tracking apparatus similar to tracking apparatus 56 in FIGURE 6 would track the north star through the use of appropriate relays similarly as tracking device 5 in FIGURE 6 is initially oriented with a selected star. Thus the dead-reckoning computer would also serve to properly orient the second star tracking device with respect to the north star when radiant energy from the north star were temporarily interrupted in a manner similarly as tracking device 5 is properly oriented with its selected star under similar conditions. An auxiliary computer memory would be employed providing the deviation in azimuth of the north star from true north as a function of time and the craft's longitude and latitude to properly orient frame 1 in FIGURE 6 with respect to true north when the north star were used as a bearing reference similarly as the memory unit of computer 55 is utilized to orient frame 1 when the earth's magnetic field is used as a bearing reference.

The memory unit in computer 55 might be a cubical memory unit with access to appropriate memory elements in three dimensional X, Y, and Z coordinates, the X and Y coordinates providing values of the earth's magnetic field as a function of the craft's longitude and latitude, and the Z coordinate providing values of the earth's magnetic field as a function of the craft's altitude above the surface of the earth's magnetic field were used as a bearing reference. The auxiliary memory unit utilized when a second star were used as a bearing reference might also be a similar cubical memory unit, the X and Y coordinates providing the azimuth of the second star as a function of the craft's longitude and latitude and the Z coordinate providing the azimuth of the second star as a function of time. Conventional interpolating means could provide intermediate values not specifically stored in the computer memory. Thus three such memory units would be required, one for deviation of magnetic north from true north, one for inclination of the earth's magnetic lines of force in an east-west direction, and one for inclination of the earth's magnetic lines of force in a north-south direction as previously described, in addition to the auxiliary memory unit used in the astrocompass. Diurnal variation in azimuth and inclination of the earth's magnetic field at the selected destination could be properly compensated for by non-linear variable resistors or other conventional resolvers in computer 55 properly adjusted by a chronometer motor to properly orient frame 1 and gimbal ring 2b in FIGURE 6 as previously described. If it were desired to compensate for diurnal variation of the earth's magnetic field over the entire route of the craft and the diurnal variation differed significantly over various portions of the route, a series of non-linear variable resistors or other conventional resolvers could be adjusted by a chronometer motor with switch 195 of FIGURE 29 connecting the appropriate resolvers into the positioning circuits of computer 55 at appropriate destinations to precisely orient frame 1 and gimbal ring 2b as previously described over the entire route of the craft.

Since many changes could be made in the aforesaid construction and many apparently widely different embodiments of this invention could be made without departure from the scope thereof, it is intended that all matter contained in the above description or shown in the accompanying drawings shall be interpreted as illustrative and not in a limiting sense, the following claims being intended to cover any modifications of structure or use of mechanical equivalents which may reasonably be included within their scope.

What is claimed is:

1. A craft guidance system comprising: automatic navigation means to determine a craft's actual position with respect to a reference point, dead-reckoning computer means to determine the craft's desired position with respect to said reference point at any instant, said dead-reckoning computer means responsive to azimuth selection means and speed selection means to establish the craft's desired route and speed, differential means responsive to said automatic navigation means and said dead-reckoning computer means to determine the difference between the craft's actual position and the craft's desired position, means responsive to said differential means to maintain the craft on the desired route established by said dead-reckoning computer means, means responsive to said differential means further automatically coordinating said speed selection means with the actual speed of the craft on desired route.

2. The apparatus of claim 1 wherein said automatic navigation means and said dead-reckoning computer means determine the craft's position in longitude and latitude, said differential means being comprised of longitude and latitude Wheatstone bridge means to differentiate between the craft's actual and desired position, means to determine the azimuth of the craft's longitudinal axis, means responsive to said longitude and latitude Wheatstone bridge means to adjust the azimuth of the craft's longitudinal axis, said longitude and latitude Wheatstone bridge means further responsive to said means determining the azimuth of the craft's longitudinal axis and said azimuth selection means such that said longitude and latitude Wheatstone bridge means are properly balanced when the azimuth of the craft's longitudinal axis is properly adjusted to maintain the craft on the route determined by said dead-reckoning computer means.

3. The apparatus of claim 1 wherein azimuth computing means responsive to destination selection means and said automatic navigation means determine the proper azimuth at any instant to maintain the craft on a direct route from its actual position to a selected destination, means responsive to said azimuth computing means to automatically adjust said azimuth selection means to said proper azimuth.

4. The apparatus of claim 1 wherein a rotatable member is rotated in accordance with the azimuth selected by said azimuth selection means, electrical contact means responsive to the rotated position of said rotatable member, relay means responsive to said electrical contact means to automatically adapt said automatic guidance system to proper operation at any selected azimuth.

5. The apparatus of claim 1 wherein first relay means responsive to said differential means activates speed increasing means to increase the effective operating speed of said dead-reckoning computer means until the craft's said desired position equals the craft's said actual position when the craft's actual speed along the selected route is greater than the operating speed of said dead-reckoning computer means, and second relay means responsive to said differential means activates speed decreasing means to decrease the effective operating speed of said dead-reckoning computer means until the craft's desired position equals the craft's actual position when the craft's actual speed along the selected route is less than the operating speed of said dead-reckoning computer means.

6. The apparatus of claim 5 wherein third relay means are operated in response to said differential means when the craft's actual speed along a selected route is greater than the operating speed of said dead-reckoning computer means, fourth relay means are operated in response to said differential means when the craft's actual speed along a selected route is less than the operating speed of said dead-reckoning computer means, timing means activated by operation of either said third or fourth relay means under said conditions, torque producing means to adjust said speed selection means, said torque producing means responsive to said third relay means and said timing means to incrementally increase the operating speed of said dead-reckoning computer means, said torque producing means responsive to said fourth relay means and said timing mean to incrementally decrease the operating speed of said dead-reckoning computer means, said timing means responsive to the time interval between successive operations of said third or fourth relay means to provide an incremental adjustment of said speed selection means whose magnitude is inversely proportional to said time interval.

7. The apparatus of claim 1 wherein torque producing means are provided to adjust said speed selection means through a first clutch means, said torque producing means capable of adjusting the craft's throttle through a second clutch means, double-throw switch means provided to activate either said first clutch means or said second clutch means, said torque producing means responsive to said differential means to either adjust the operating speed of said dead-reckoning computer means to the craft's actual speed along a selected route or adjust the actual speed of the craft to the operating speed of said dead-reckoning computer means depending upon the position of said switch means.

8. The apparatus of claim 1 wherein said dead-reckoning computer means is responsive to said automatic navigation means to maintain the craft's position as determined by said dead-reckoning computer means equal to the craft's position as determined by said automatic navigation means when the automatic guidance portion of said craft guidance system is turned off.

9. The apparatus of claim 1 wherein switching means may convert said longitude and latitude Wheatstone bridge circuits to azimuth control circuits of a conventional auto-pilot.

10. A first element, means mounting said first element with two degrees of rotational freedom permitting orientation of a principal axis of said first element with respect to a celestial body, means responsive to the angular position of said first element to align said first element with a celestial body, a second element, means mounting said second element with two degrees of rotational freedom permitting orientation of a principal axis of said second element with respect to the magnetic lines of force of the earth, means responsive to the earth's magnetic field to align said second element with the magnetic lines of force of the earth, timing means, computing means responsive to said timing means and the angular position of said first element with respect to the angular position of said second element to determine geographical location and the direction of true north and the direction of a true vertical at the location of said first and second elements.

11. A gimbal mounted element, means responsive to said gimbal mounted element to align a principal axis of said gimbal mounted element with respect to a celestial body, said gimbal mounted element responsive to proper orientation with respect to true north and a true vertical to indicate geographical location, first computing means to determine the known deviation of magnetic north from true north as a function of geographical location, means to provide said first computing means with the true direction of magnetic north at the true location of said gimbal mounted element, said first computing means responsive to the geographical location determined by said gimbal mounted element to properly orient said gimbal mounted element with respect to true north, second computing means to determine the known deviation of the earth's magnetic field from a true vertical as a function of geographical location, means to provide said second computing means with the true inclination of the earth's magnetic field at the true location of said gimbal mounted element, said second computing means responsive to the geographical location determined by said gimbal mounted element to properly orient said gimbal mounted element with respect to a true vertical, resulting convergent orientation of said gimbal mounted element with respect to true north and a true vertical by said computing means enabling said gimbal mounted element to determine true geographical location and the direction of true north and the direction of a true vertical.

12. Navigation means to determine geographical location, first computing means to determine the known deviation of magnetic north from true north as a function of geographical location, means to provide said first computing means with the true direction of magnetic north at the true location of said navigation means, said first computing means responsive to the geographical location determined by said navigation means to determine the direction of true north at the location of said navigation means, second computing means to determine the known deviation of the earth's magnetic field from a true vertical as a function of geographical location, means to provide said second computing means with the true inclination of the earth's magnetic field at the true location of said navigation means, said second computing means responsive to the geographical location determined by said navigation means to determine the direction of a true vertical at the location of said navigation means, course selection means, automatic guidance means responsive to said navigation means and said determined direction of true north and said determined direction of a true vertical and said course selection means to properly orient a guided craft.

13. Navigation means to determine geographical location, a supporting frame, means mounting said supporting frame with a single degree of rotational freedom on a first vertical axis permitting orientation of said supporting frame with respect to true north, a first gimbal platform, first gimbal means mounting said first gimbal platform with two degrees of rotational freedom in said supporting frame permitting orientation of said gimbal platform with respect to a true vertical, a magnetic inclination seeking element, second gimbal means mounting said magnetic inclination seeking element with two degrees of rotational freedom within said first gimbal platform permitting orientation of a principal axis of said magnetic inclination seeking element with respect to said first gimbal platform in two directions perpendicular to each other, means responsive to the earth's magnetic field to align said magnetic inclination seeking element with the earth's magnetic field through adjustment of said second gimbal means until said principal axis of said magnetic inclination seeking element in parallel or tangent to the magnetic lines of force of the earth, first computing means to determine the known deviation of magnetic north from true north as a function of geographical location, means to provide said first computing means with the true direction of magnetic north at the true location of said navigation means, said first computing means responsive to the geographical location determined by said navigation means to properly orient said supporting frame with respect to true north such that said magnetic inclination seeking element determines the true inclination of the earth's magnetic field in a north-south and east-west direction at the true location of said navigation means, second computing means to determine the known deviation of the earth's magnetic field from a true vertical in a north-south and east-west direction as a function of geographical location, said second computing means responsive to the geographical location determined by said navigation means and said inclination of the earth's magnetic field determined by said magnetic inclination seeking element to properly orient said first gimbal platform with respect to a true vertical, the position of said first gimbal platform indicating the direction of true north and the direction of a true vertical, course selection means, automatic guidance means responsive to said navigation means, said determined direction of true north, said determined direction of a true vertical and said course selection means to properly orient a guided craft.

References Cited by the Examiner

UNITED STATES PATENTS

| | | | |
|---|---|---|---|
| 1,070,597 | 8/1913 | Gaulke | 200—12 |
| 1,441,399 | 1/1923 | Clark | 338—123 |
| 1,562,070 | 11/1925 | Baltzley | 74—798 |
| 1,658,866 | 2/1928 | Thordarson | 338—123 |
| 2,444,933 | 7/1948 | Jasperson | 318—489 |

(Other references on following page)

UNITED STATES PATENTS

| | | | |
|---|---|---|---|
| 2,479,390 | 8/1949 | McNairy | 318—452 |
| 2,532,402 | 12/1950 | Herbold | 318—489 |
| 2,542,018 | 2/1951 | Ferrill | 33—204 |
| 2,593,642 | 4/1952 | Wolverton | 200—12 |
| 2,597,125 | 5/1952 | Noxon | 33—224 |
| 2,697,195 | 12/1954 | Courtney | 318—452 |
| 2,745,298 | 5/1956 | Braunagel | 74—798 |
| 2,839,921 | 6/1958 | Wood | 73—178 |
| 2,847,855 | 8/1958 | Berger | 73—178 |
| 2,922,224 | 1/1960 | Gray | 33—1 |
| 2,951,639 | 9/1960 | McKenney | 235—187 |
| 2,961,191 | 11/1960 | Jasperson | 244—14 |
| 2,969,184 | 1/1961 | Miner | 235—187 |
| 3,001,289 | 9/1961 | Carbonara | 33—61 |
| 3,048,352 | 8/1962 | Hansen | 244—14 |

FERGUS S. MIDDLETON, *Primary Examiner.*

CHESTER L. JUSTUS, RALPH D. BLAKESLEE,
*Examiners.*